US012409950B2

United States Patent
McGeehan et al.

(10) Patent No.: US 12,409,950 B2
(45) Date of Patent: Sep. 9, 2025

(54) AIRCRAFT HANDLERS AND RELATED METHODS

(71) Applicant: The Boeing Company, Chicago, IL (US)

(72) Inventors: Daniel R. McGeehan, St. Charles, MO (US); Rebecca Michelle Ryan, Lake Saint Loius, MO (US); Iavor Boykov, St. Charles, MO (US); Yashlay Sinha, Bangalore (IN)

(73) Assignee: The Boeing Company, Arlington, VA (US)

( * ) Notice: Subject to any disclaimer, the term of this patent is extended or adjusted under 35 U.S.C. 154(b) by 448 days.

(21) Appl. No.: 17/918,306

(22) PCT Filed: Apr. 14, 2021

(86) PCT No.: PCT/US2021/027290
§ 371 (c)(1),
(2) Date: Oct. 11, 2022

(87) PCT Pub. No.: WO2021/211712
PCT Pub. Date: Oct. 21, 2021

(65) Prior Publication Data
US 2023/0322408 A1 Oct. 12, 2023

Related U.S. Application Data

(60) Provisional application No. 63/010,230, filed on Apr. 15, 2020.

(51) Int. Cl.
*B64F 1/227* (2024.01)
*B64F 1/22* (2024.01)

(52) U.S. Cl.
CPC .............. *B64F 1/227* (2013.01); *B64F 1/22* (2013.01)

(58) Field of Classification Search
CPC ......... B64F 1/22; B64F 1/227; Y10S 180/904
(Continued)

(56) References Cited

U.S. PATENT DOCUMENTS 2,980,270 A * 4/1961 Elliott ...................... B64F 1/22
414/537
3,119,502 A * 1/1964 Paul ......................... B60P 3/11
414/427

(Continued)

FOREIGN PATENT DOCUMENTS

| EP | 0739813 A1 | 4/1996 |
|---|---|---|
| GB | 520051 | 4/1940 |
| WO | 2011030140 A1 | 3/2011 |

OTHER PUBLICATIONS

European Patent Office, Examination Report in related application EP 21 723 549.8, Jan. 17, 2025.

*Primary Examiner* — Kaitlin S Joerger
(74) *Attorney, Agent, or Firm* — Kolitch Romano Dascenzo Gates LLC

(57) ABSTRACT

Aircraft handlers include a plurality of undercarriage support assemblies. Each undercarriage support assembly includes a body, a translation assembly operably attached to the body, and a support member operably coupled to and extending from the body. The support member comprises a support region configured to engage and operably support at least a portion of an undercarriage of an aircraft. The translation assembly is configured to support the undercarriage support assembly on a ground surface and permit the undercarriage support assembly to translate along the ground surface. The aircraft handlers further include one or more drive assemblies configured to move the aircraft handler along the ground surface, in which each drive assembly comprises the translation assembly of an undercarriage support assembly. Methods comprise supporting the (Continued)

undercarriage of the aircraft with the aircraft handler and moving the aircraft along the ground surface with the aircraft handler.

26 Claims, 16 Drawing Sheets

(58) Field of Classification Search
USPC .......................................................... 414/426
See application file for complete search history.

(56) References Cited

U.S. PATENT DOCUMENTS

| | | | | | |
|---|---|---|---|---|---|
| 3,211,425 | A | * | 10/1965 | Greulich | B64F 1/22 |
| | | | | | 414/592 |
| 4,895,319 | A | * | 1/1990 | Bardsen | B64F 1/22 |
| | | | | | 244/50 |
| 4,911,603 | A | * | 3/1990 | Pollner | B64F 1/227 |
| | | | | | 414/428 |
| 4,911,604 | A | * | 3/1990 | Pollner | B64F 1/227 |
| | | | | | 414/428 |
| 5,562,388 | A | * | 10/1996 | Le Gall | B64F 1/22 |
| | | | | | 414/427 |
| 5,860,785 | A | * | 1/1999 | Eberspacher | B64F 1/227 |
| | | | | | 244/50 |
| 2010/0254791 | A1 | | 10/2010 | Hwu et al. | |
| 2012/0215393 | A1 | * | 8/2012 | Schiedegger | B60P 3/11 |
| | | | | | 701/23 |
| 2017/0001511 | A1 | * | 1/2017 | Kulkarni | B60L 50/40 |
| 2020/0298999 | A1 | * | 9/2020 | Azaña Robles | B60T 8/266 |

* cited by examiner

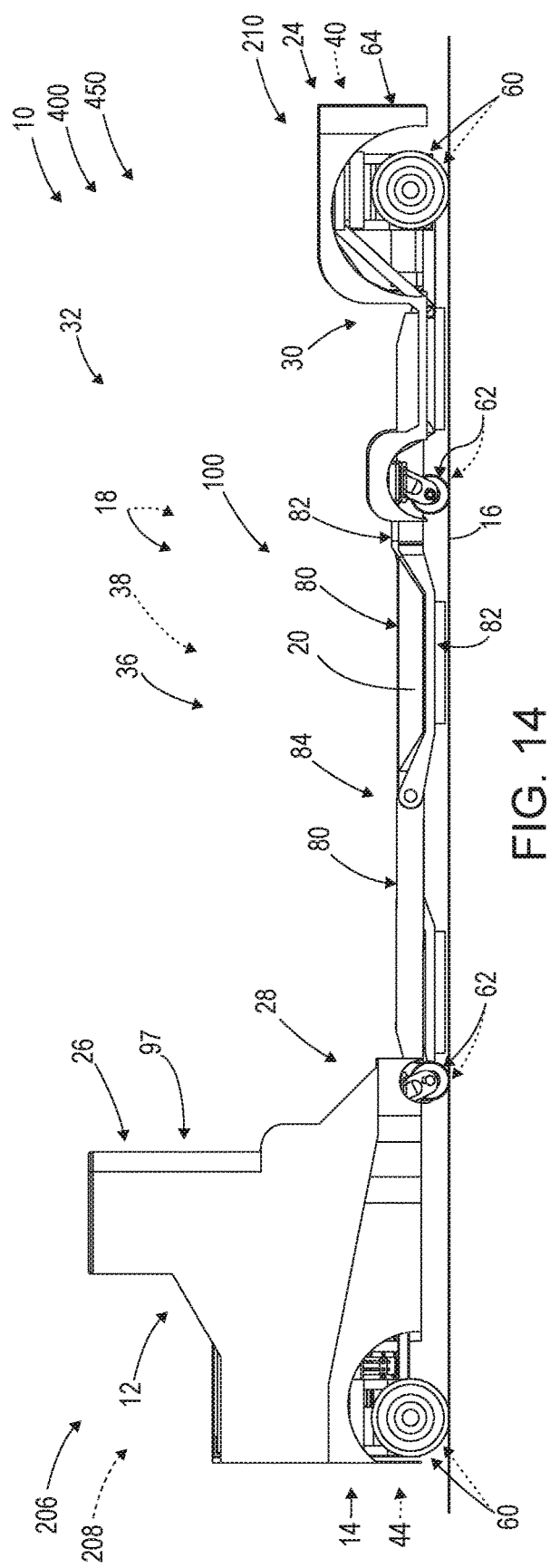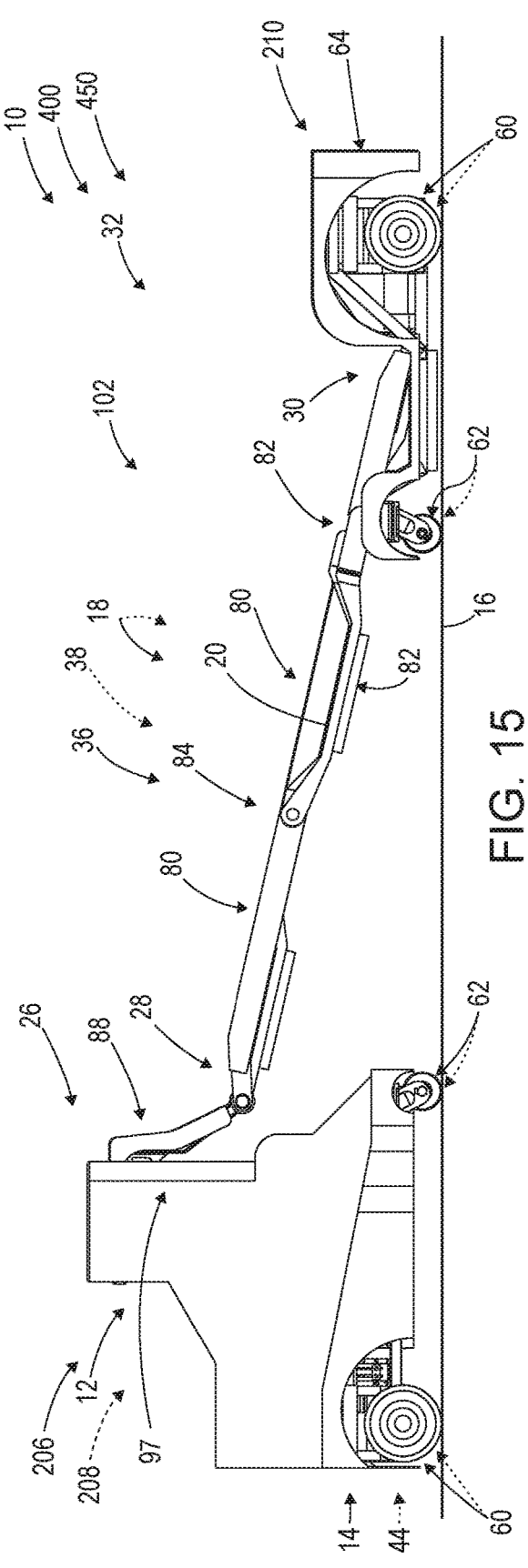

AIRCRAFT HANDLERS AND RELATED METHODS

RELATED APPLICATIONS

The present application claims priority to U.S. Provisional Patent Application No. 63/010,230, which is titled AIRCRAFT HANDLERS AND RELATED METHODS and was filed on Apr. 15, 2020. The entire disclosure of this patent application is hereby incorporated by reference.

FIELD

The present disclosure relates to aircraft handlers and related methods.

BACKGROUND

Often, aircraft need to be relocated while on the ground, such as before, after, or between airborne operations. Conventionally, ground relocation of aircraft is achieved by taxiing or by towing the aircraft with an aircraft tug. However, navigating aircraft within spatially confined or congested environments with these techniques can be difficult due to the large amount of ground space that is required for reorienting, turning, or rotating the aircraft with taxiing or towing. Additionally, it is sometimes necessary during ground relocation to move aircraft through or to within a confined volume, such as a stowage space, a shipping container, or an elevator. Generally, when one or more dimensions of an aircraft exceed that of the confined volume, the aircraft must be disassembled or reconfigured to be moved through or fit within the confined volume, which can be time consuming and impose otherwise unnecessary requirements on the design of the aircraft. Thus, a need exists for devices and methods that improve aircraft ground mobility, such as relocation of aircraft within spatially confined spaces and movement of aircraft through or to within confined volumes.

SUMMARY

Aircraft handlers and related methods are disclosed herein. The aircraft handlers are mobile, and are configured to engage and support, to thereby move, an aircraft relative to a ground surface. The aircraft handlers discussed herein include a plurality of undercarriage support assemblies. Each undercarriage support assembly includes a body, a translation assembly operably coupled to the body, and a support member operably coupled to and extending from the body. The support member comprises at least one support region configured to engage and operably support at least a respective portion of an undercarriage of an aircraft. The translation assembly is configured to support the respective undercarriage support assembly on a ground surface and permit the respective undercarriage support assembly to translate along the ground surface. The aircraft handlers further include one or more drive assemblies configured to move the aircraft handler along the ground surface, and each drive assembly comprises the translation assembly of an undercarriage support assembly. The aircraft handlers are thus configured to move (e.g., translate, rotate relative to one or more axes, etc.) an aircraft along the ground surface. In some examples, the aircraft handlers are controlled remotely by an operator, or operate autonomously or semi-autonomously. In some examples, the aircraft handlers are configured to support the aircraft in a level aircraft orientation and among a plurality of tilted aircraft orientations. The methods comprise supporting the undercarriage of the aircraft with the aircraft handler and moving the aircraft along the ground surface with the aircraft handler.

BRIEF DESCRIPTION OF THE DRAWINGS

FIG. 14 is a side view of the example aircraft handler of FIG. 11, with the support arms of the aircraft handler illustrated in a level orientation.

FIG. 15 is a side view illustrating the example aircraft handler of FIG. 11, with the support arms illustrated in a tilted orientation.

DESCRIPTION

Figure 1:
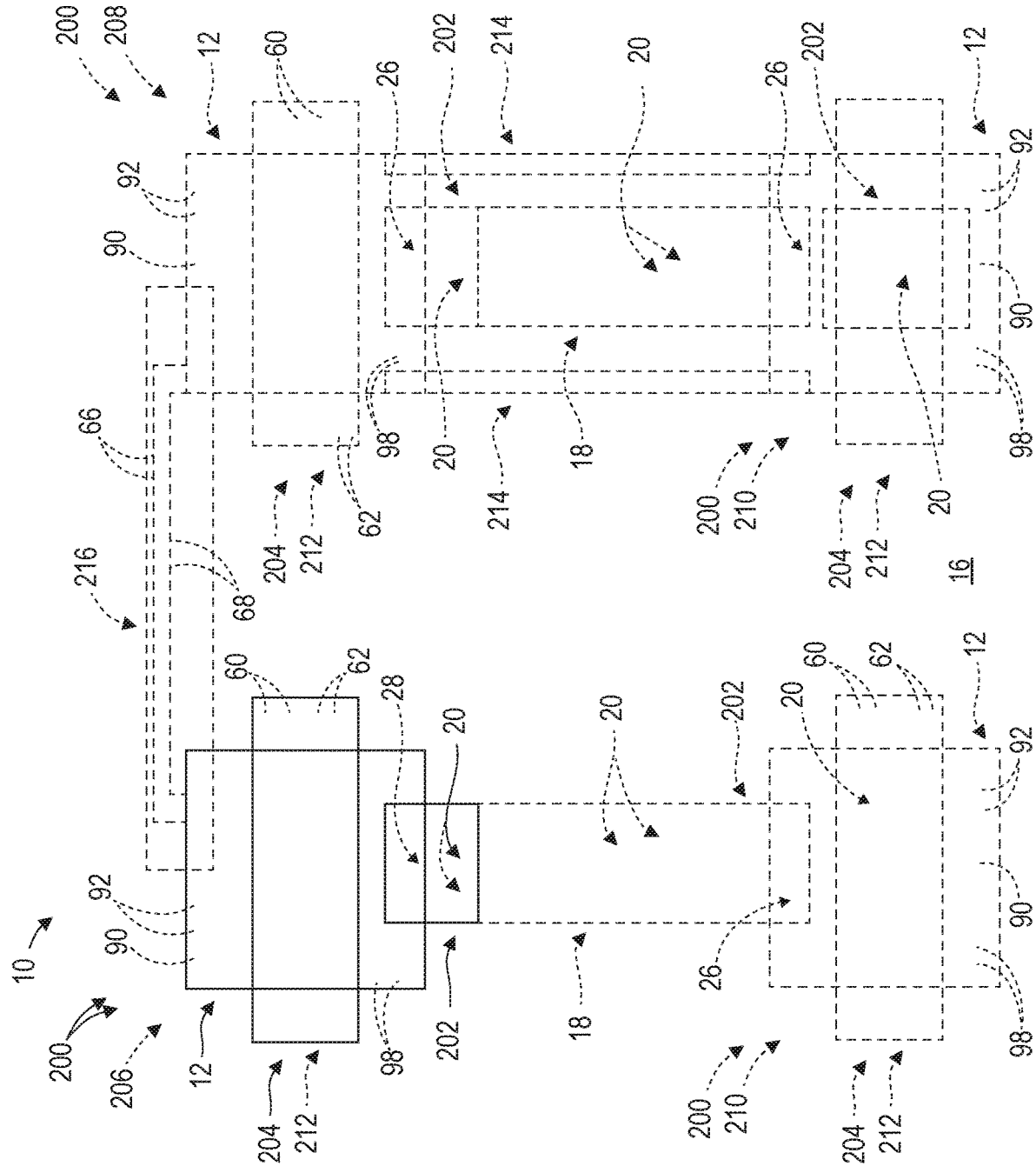
FIG. 1 is a schematic plan view representing examples of aircraft handlers, according to the present disclosure.

Aircraft handlers and related methods are disclosed herein. FIGS. 1-17 provide examples of aircraft handlers 10, and related methods 500 for utilizing aircraft handlers 10, according to the present disclosure. Elements that serve a similar, or at least a substantially similar, purpose are labeled with like numbers in each of FIGS. 1-17, and these elements may not be discussed in detail herein with reference to each of FIGS. 1-17. Similarly, all elements may not be labeled in each of FIGS. 1-17, but reference numerals associated therewith may be utilized herein for consistency. Elements, components, and/or features that are discussed herein with reference to one or more of FIGS. 1-17 may be included in and/or utilized with any of FIGS. 1-17 without departing from the scope of the present disclosure.

Figure 2:
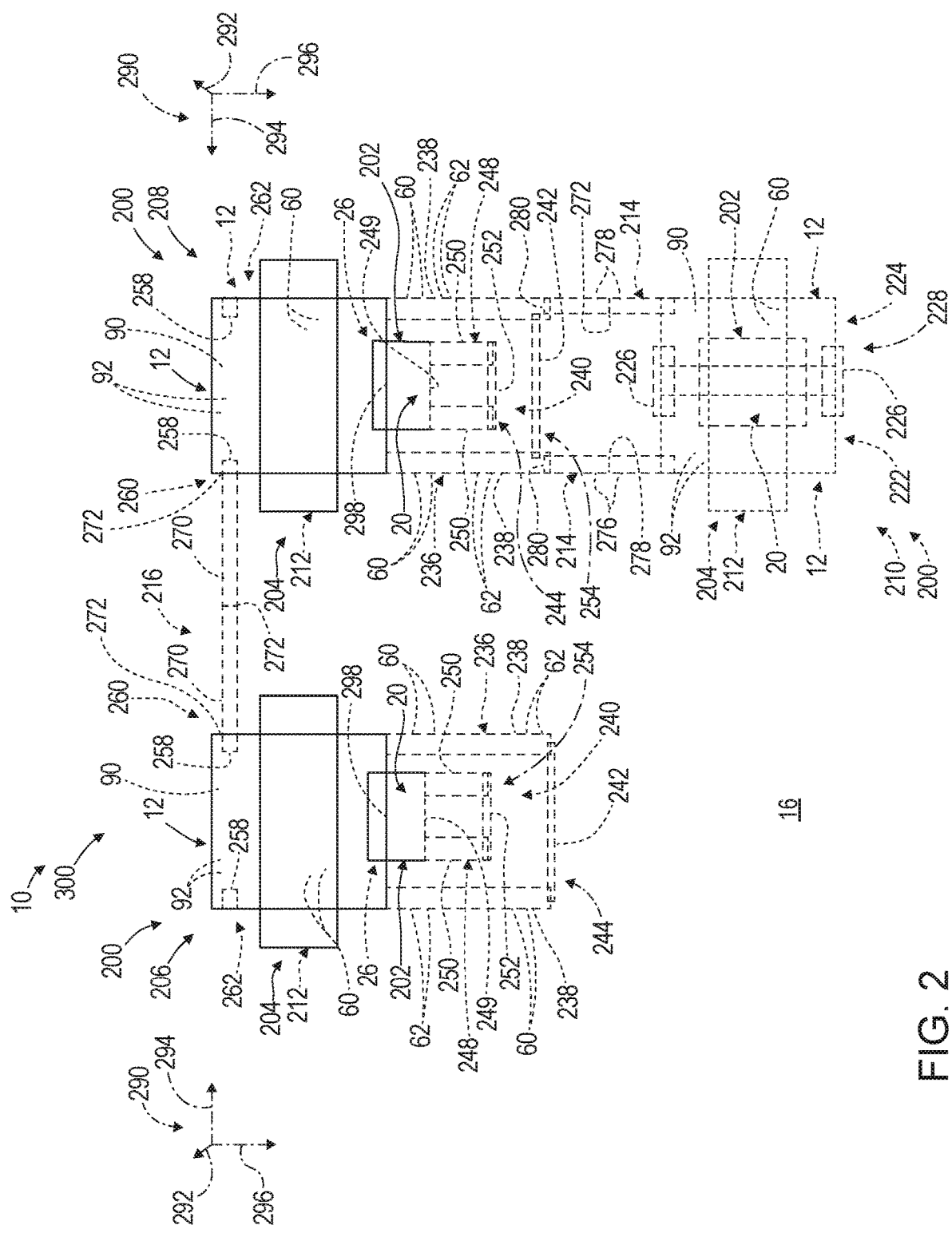
FIG. 2 is a schematic plan view representing more examples of aircraft handlers, according to the present disclosure.
Figure 3:
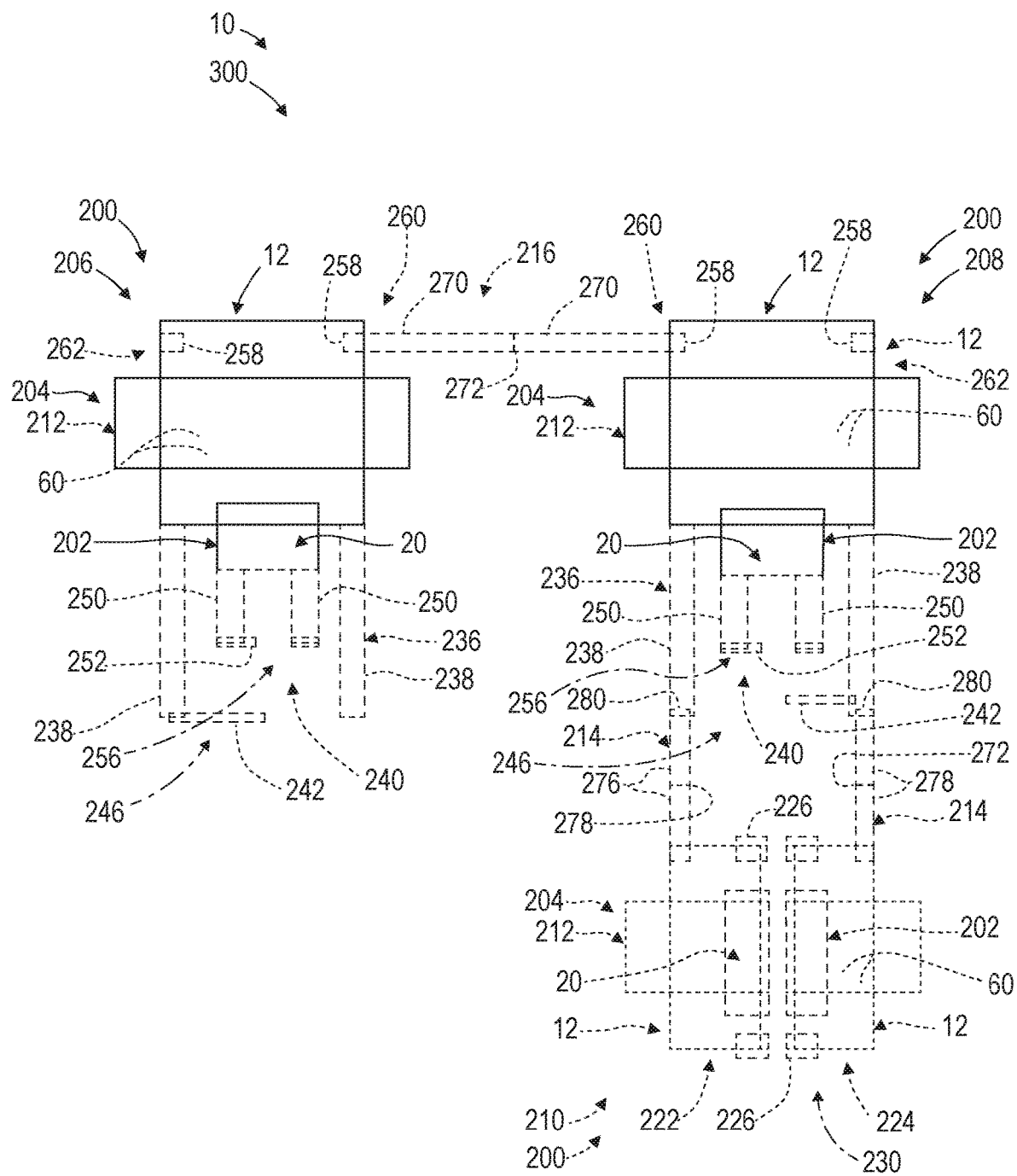
FIG. 3 is a schematic plan view of the example aircraft handlers of FIG. 2 in various configurations.
Figure 4:
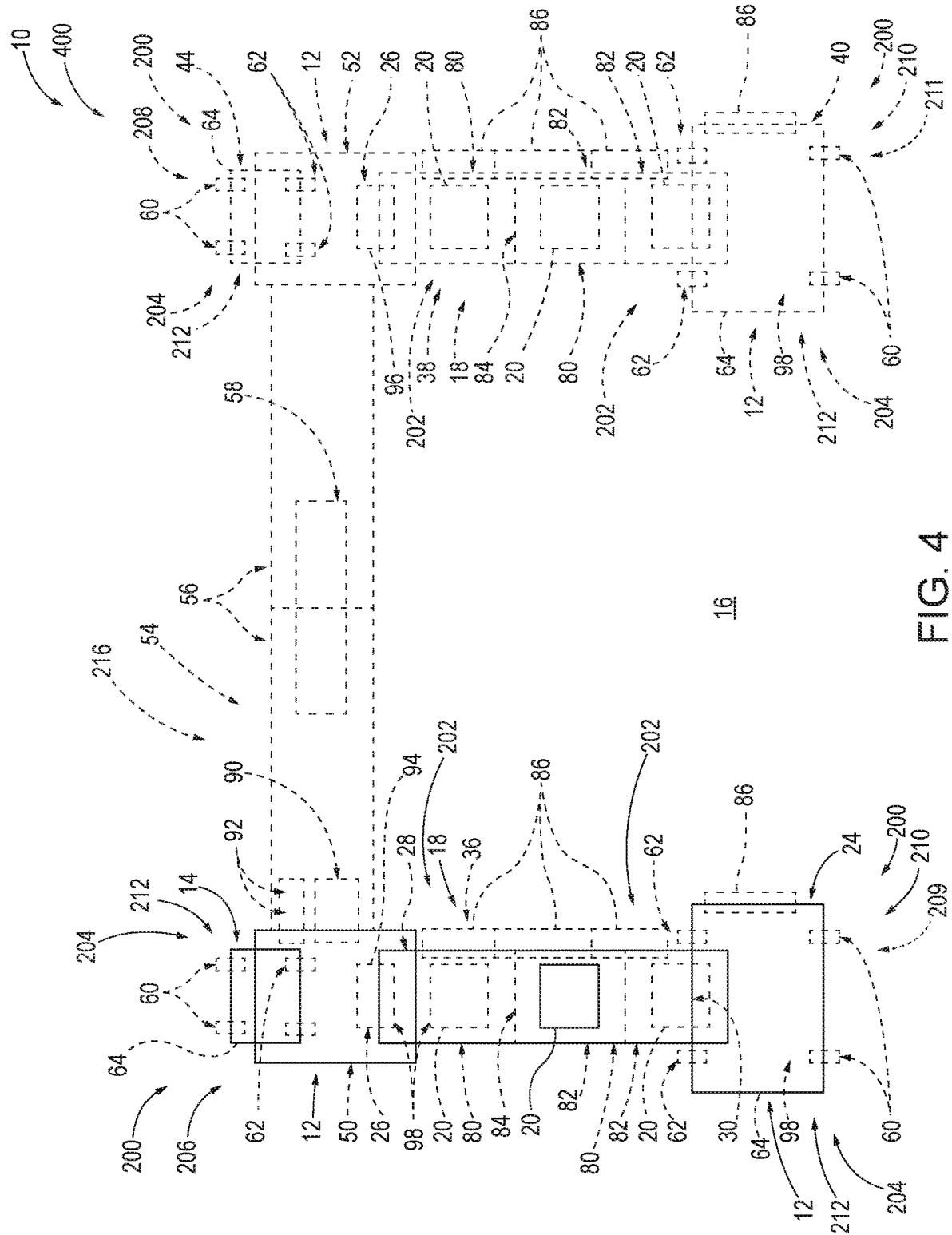
FIG. 4 is a schematic plan view representing additional examples of aircraft handlers according to the present disclosure.
Figure 5:
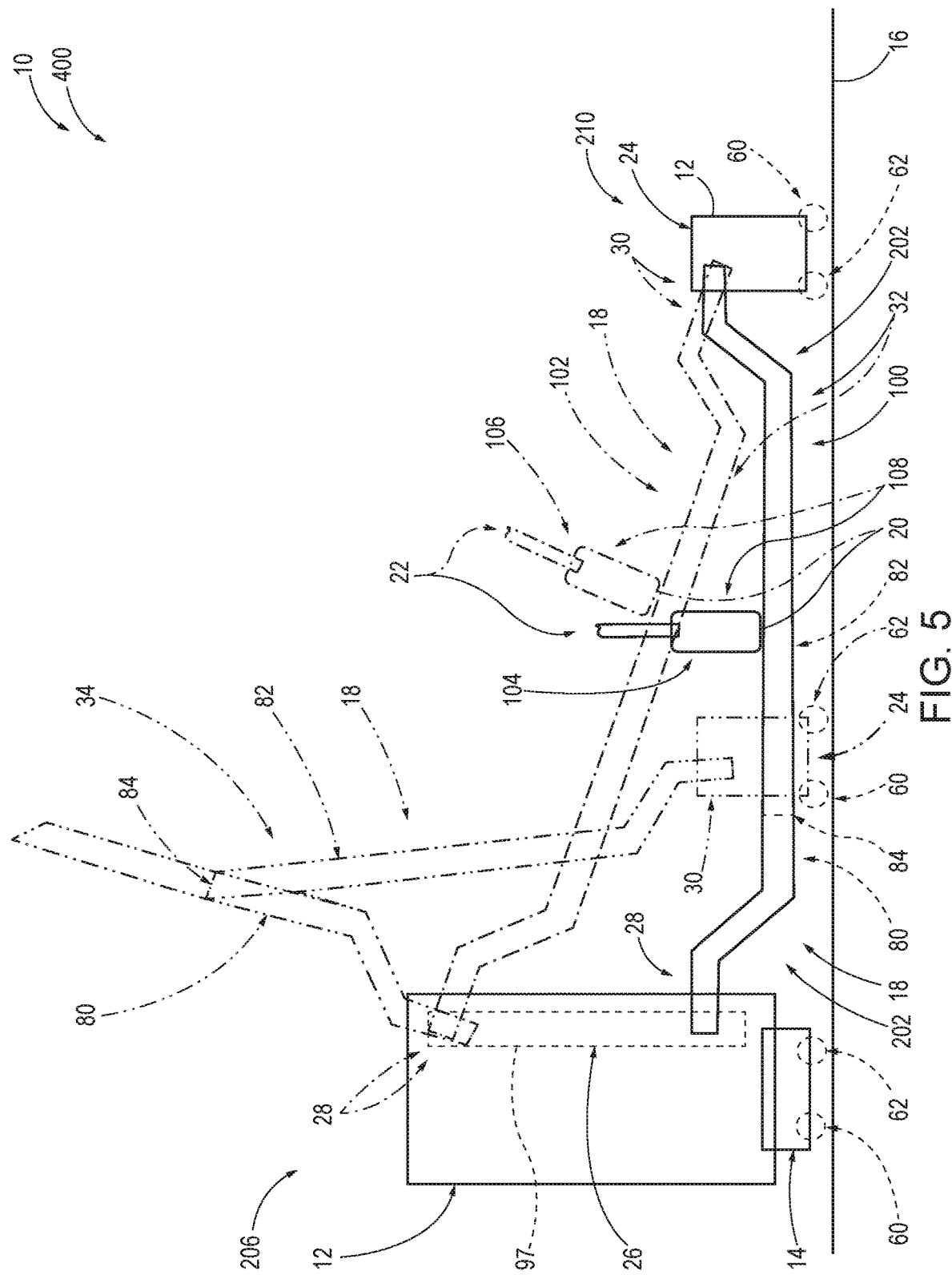
FIG. 5 is a schematic side view representing the example aircraft handlers of FIG. 4 in various configurations.

FIG. 1 schematically represents examples of aircraft handlers according to the present disclosure, which are generally indicated with the reference number 10. The disclosure and drawings also present specific examples of aircraft handlers 10, which are designated with other reference numbers. For example, FIGS. 2-3 schematically represent examples of aircraft handlers 10 that are indicated at, and referred to herein as, aircraft handlers 300. FIGS. 4-5 schematically represent examples of aircraft handlers 10 that are indicated at, and referred to herein, as aircraft handlers 400. FIGS. 6-10 illustrate a more specific example of aircraft handlers 300 indicated at, and referred to herein as, aircraft handler 350, and FIGS. 11-16 illustrate a more specific example of aircraft handlers 400 indicated at, and referred to herein as, aircraft handler 450 according to the present disclosure. Generally, in FIGS. 1-5, elements that are likely to be included in a given (i.e., particular) example of an aircraft handler 10 are illustrated in solid lines, while elements, orientations, and/or configurations that are optional to a given example of an aircraft handler 10 are illustrated in broken lines. However, elements that are illustrated in solid lines in FIGS. 1-5 are not essential to all examples of aircraft handlers 10 of the present disclosure, and an element shown in solid lines in FIGS. 1-5 may be omitted from a particular example of an aircraft handler 10 without departing from the scope of the present disclosure. In schematic FIGS. 1-5, dot-dash and dot-dot-dash lines are utilized to illustrate various optional configurations of aircraft handlers 10. Dot-dash lines also may be utilized to indicate axes.

The following discussion concentrates on the schematic representation of aircraft handler 10 in FIG. 1; however, where appropriate and to facilitate understanding of aircraft handler 10, reference to the illustrative, non-exclusive examples of aircraft handlers 300 in FIGS. 2-3 and 6-10 and of aircraft handlers 400 in FIGS. 4-5 and 11-16 are made. Example aircraft handlers 300 and 400 are non-exclusive and do not limit aircraft handler 10 to the illustrated embodiments of FIGS. 2-16. That is, aircraft handler 10 according to the present disclosure may incorporate any number of the various aspects, configurations, characteristics, properties of aircraft handlers 10 that are illustrated and discussed herein with reference to FIG. 1 and/or the embodiments of FIGS. 2-16, as well as variations thereof, without requiring the inclusion of all such aspects, configurations, properties, etc. For the purpose of brevity, each discussed component, part, portion, aspect, region, etc. or variants thereof may not be discussed, illustrated, and/or labeled with respect to aircraft handlers 300 and 400; however, it is within the scope of the present disclosure that the discussed features, variants, etc. of aircraft handler 10 may be utilized with aircraft handlers 300 and 400. Likewise, the specific illustrated and discussed aspects of aircraft handlers 300 and 400 may be utilized with other aircraft handlers 10 according to the present disclosure.

With initial reference to FIG. 1, aircraft handlers 10 comprise a plurality of undercarriage support assemblies 200. Each undercarriage support assembly 200 comprises a body 12 and a support member 202 operably coupled to and extending from body 12. Each support member 202 comprises at least one support region 20 configured to engage and operably support at least a respective portion of an undercarriage 108 of an aircraft. Stated differently, aircraft handler 10 comprises a plurality of support members 202, each being configured to support a respective portion of an undercarriage of an aircraft. In some examples, support members 202 collectively are configured to support the entire undercarriage of the aircraft spaced apart from the ground surface 16. Stated differently, in some examples, aircraft handlers 10 are configured to suspend the entire undercarriage of the aircraft spaced apart from the ground surface 16 when support member 202 of each undercarriage support assembly 200 supports at least the respective portion of the undercarriage of the aircraft.

Each undercarriage support assembly 200 further includes a translation assembly 204 operably coupled to body 12. Translation assembly 204 is configured to support the respective undercarriage support assembly 200 on a ground surface 16 and permit the respective undercarriage support assembly 200 to translate along ground surface 16. Stated differently, aircraft handlers 10 comprise a plurality of translation assemblies 204 that support aircraft handler 10 on ground surface 16 and permit the aircraft handler 10 to translate along the ground surface 16.

Aircraft handlers 10 further include one or more drive assemblies 212 configured to move the aircraft handler 10 along the ground surface 16, in which each drive assembly 212 comprises the translation assembly 204 of an undercarriage support assembly 200. Put in slightly different terms, at least one undercarriage support assembly 200 comprises a respective drive assembly 212 and is configured to move aircraft handler 10 along ground surface 16. In some examples, at least two undercarriage support assemblies 200, and optionally each undercarriage support assembly 200 comprises a respective drive assembly 212. Stated differently, in some examples, aircraft handler 10 comprises a plurality of drive assemblies 212.

Aircraft handlers 10 are configured to move an aircraft along ground surface 16. More specifically, the one or more drive assemblies 212 are configured to move aircraft handler 10 along ground surface 16 while each support member 202 operably supports at least the respective portion of the undercarriage of the aircraft, such as to move aircraft handler 10, together with the aircraft, along ground surface 16.

Aircraft handler 10 also may be referred to as an aircraft relocation cart, an aircraft dolly, aircraft lift cart, an aircraft handling assembly, and/or an aircraft relocation assembly. Aircraft handler 10 may be configured to move any suitable type of aircraft along ground surface 16 such as fixed wing aircraft, rotorcraft, helicopters, commercial aircraft, military aircraft, and/or private aircraft. Aircraft handler 10 also may be configured to move along any suitable ground surface 16, such as while supporting the undercarriage of the aircraft spaced apart from ground surface 16. For example, aircraft handler 10 may be configured to move along a ground surface 16 that is included in a runway, on a road, in an aircraft hangar, on a nautical ship, on an aircraft carrier, within a confined volume, within the trailer of a driven vehicle, within a shipping container, and/or within an elevator. Aircraft handler 10 also may be configured to move along a ground surface 16 that is level, sloped, even, and/or uneven.

Each support member 202 and/or support region(s) 20 thereof is configured to support any suitable region of the undercarriage of the aircraft. In some examples, the undercarriage includes a landing gear assembly and support region 20 is configured to support at least a portion of the landing gear assembly, such as one or more wheels of the landing gear assembly. Additionally or alternatively, the undercarriage, such as the undercarriage of a helicopter, may include one or more landing skids, and support region 20 may be configured to support at least a portion of the one or more landing skids. As shown in FIG. 1, in some examples, support member 202 comprises more than one support region 20, such as at least two support regions 20, at least three support regions 20, at least four support regions 20, at least six support regions 20, and/or at most ten support regions 20. In some such examples, each support region 20 is configured to support a discrete or separate portion of the undercarriage of the aircraft. For example, each support region 20 may support one or more separate wheels of a landing gear assembly.

Each support region 20 comprises any suitable structure for supporting at least the respective portion of the undercarriage of the aircraft in any suitable manner. For example, each support region 20 may comprise a platform, a surface, a prong, a fork, a ledge, a saddle, a basin, a recess, a notch, a slot, a clamp, a receiver, a friction fit, and/or combinations thereof. Each support region 20 may be configured to support, compliment, and/or operably engage with at least a portion of one or more types of undercarriages and/or with a specific portion of an undercarriage of one or more types of aircraft.

As mentioned, in some examples, support members 202 are configured to support and/or suspend a substantial portion of, or the entirety of, the undercarriage of the aircraft spaced above ground surface 16. Stated differently, in some examples, aircraft handler 10 is configured to support or suspend the entire weight of the aircraft above ground surface 16. In some such examples, each support member 202 is operably positioned, oriented, and/or configured to translate laterally beneath at least the respective portion of the undercarriage of the aircraft, such as to be positioned to lift at least the respective portion of the undercarriage of the aircraft from direct contact with the ground surface. In some examples, each support member 202 is configured to lift at least the respective portion of the undercarriage of the aircraft from direct contact with the ground surface.

In some examples, aircraft handler 10 further includes one or more lift mechanisms 26 each being included in an undercarriage support assembly 200. Stated differently, in some examples, one or more undercarriage support assemblies 200 each comprise a respective lift mechanism 26. When included, lift mechanism 26 operably couples a support member 202 of the respective undercarriage support assembly 200 to body 12 of the respective undercarriage support assembly 200. Lift mechanism 26 is configured to selectively raise and lower the respective support member 202 relative to the ground surface 16. In some examples, each support member 202 defines a proximal end that is positioned nearest body 12, and lift mechanism 26 operably couples the proximal end of support member 202 to body 12 and selectively raises and lowers the proximal end to selectively raise and lower support member 202. As discussed in more detail herein, in some examples, each lift mechanism 26 is configured to support the respective support member 202 in, and selectively raise and lower the respective support member 202 between two or more of a translation position, a lowered position, and a plurality of raised positions. In the translation position, support member 202 is positioned to translate laterally beneath at least the respective portion of the undercarriage of the aircraft. In the lowered position, support member 202 is positioned to support the respective portion of the undercarriage of the aircraft. In the raised position, support member 202 is spaced further away from the ground surface than in the lowered position and/or the translation position and is positioned to support the respective portion of the undercarriage of the aircraft spaced further away from ground surface 16 than in the lowered position.

In some examples, each lift mechanism 26 is configured to selectively raise the respective support member 202 from the translation position to the lowered position and/or to among the plurality of raised positions, such that the respective support member 202 engages at least the portion of the undercarriage of the aircraft, and lifts at least the respective portion of the undercarriage of the aircraft from direct contact with ground surface 16. In some examples, each lift mechanism 26 is configured to selectively raise the respective support member 202 from the lowered position to among the plurality of raised positions, such that support member 202 supports the respective portion of the undercarriage of the aircraft spaced further apart from the ground surface than in the lowered position.

In some examples, aircraft handlers 10 are configured to support the aircraft in a level orientation, in which the aircraft may be oriented generally horizontally relative to ground surface 16, and among a plurality of tilted aircraft orientations, in which the aircraft is tilted relative to the ground surface 16 or the level aircraft orientation. In some such examples, aircraft handler 10 is configured to selectively tilt, or transition the aircraft between the level aircraft orientation and the plurality of tilted aircraft orientations. In some examples, lift mechanism(s) 26 are configured to selectively transition the aircraft between the level aircraft orientation and the plurality of tilted aircraft orientations by selectively raising and lowering the respective support member(s) 202 relative to ground surface 16. More specifically, in some examples, aircraft handlers 10 are configured to support the aircraft in the level aircraft orientation when the support member 202 of each undercarriage support assembly supports at least the respective portion of the undercarriage of the aircraft and each lift mechanism 26 positions the respective support member 202 in the lowered position. In some examples, aircraft handlers 10 are configured to support the aircraft among the plurality of tilted aircraft orientations when each support member 202 supports the respective portion of the undercarriage of the aircraft and at least one lift mechanism 26, and optionally each lift mechanism 26, supports the respective support member 202 among the plurality of raised positions.

Lift mechanism 26 includes any suitable structure and/or any suitable mechanism for raising and lowering support member 202, and/or tilting the aircraft. As examples, lift mechanism 26 may include a jack mechanism, a hydraulic jack mechanism, a pneumatic jack mechanism, a mechanical jack mechanism, an electromechanical jack mechanism, a screw jack mechanism, a telescopic jack mechanism, and/or a chain driven lift mechanism. In some examples, lift mechanism 26 includes a pillar that extends upwardly from the respective translation assembly 204 and/or upwardly relative to ground surface 16, and lift mechanism 26 is configured to move support member 202 up and down along the pillar.

With continued reference to FIG. 1, the one or more drive assemblies 212 comprise any suitable set of structures and/or mechanisms for moving aircraft handler 10 along ground surface 16. In some examples, at least one drive assembly 212, and optionally each drive assembly 212, comprises one or more driven wheels 60 that support the respective undercarriage support assembly 200 on ground surface 16. When included, driven wheels 60 are configured to receive power from one or more power sources 92 and facilitate movement of aircraft handler 10 along ground surface 16. In some examples, drive assemblies 212 are configured to steer aircraft handler 10, such as while moving aircraft handler 10 along ground surface 16. In particular, drive assemblies 212 may be configured to rotate, turn, and/or move aircraft handler 10 and/or the aircraft 22 in a forward or in a reverse direction. In some examples, aircraft handler 10 comprises a plurality of drive assemblies 212, in which each drive assembly 212 is configured to operate independently of one another, such as to steer and/or rotate aircraft handler 10 and/or the aircraft 22. Additionally or alternatively, drive assemblies 212 are configured to operate in unison. More specifically, in some examples, at least one, some, or each driven wheel 60 is configured to pivot to steer, turn, and/or rotate aircraft handler 10 and/or the aircraft. Similarly, in some examples, at least one driven wheel 60 is configured to selectively and operably rotate in clockwise and counterclockwise directions such as to move aircraft handler 10 and/or the aircraft 22 in the forward and reverse directions along ground surface 16. With this in mind, in some examples, driven wheel(s) 60 are configured to operate in unison, and in some examples, one or more driven wheels 60 are configured to operate independently.

In some examples, one or more translation assemblies 204 each comprise one or more non-driven wheels 62. Stated differently, in some examples, translation assembly 204 of at least one undercarriage support assembly 200 comprises one or more non-driven wheels 62. Additionally or alternatively, one or more drive assemblies 212 each comprise one or more non-driven wheels 62. When included, non-driven wheels 62 are configured to support a respective translation assembly 204 and/or drive assembly 212 on ground surface 16 and rotate to permit the respective undercarriage support assembly 200 to translate along ground surface 16. When non-driven wheels 62 are included in a drive assembly 212, non-driven wheels 62 may provide additional support, stability, load bearing capacity, and/or improved steering to the respective drive assembly 212. In some examples, drive assembly 212 and the respective undercarriage support assembly 200 comprises a chassis for supporting, arranging, and/or orienting driven wheels 60 and/or non-driven wheels 62. Examples of suitable non-driven wheel 62 include caster wheels, rollers, and/or ball transfers.

When aircraft handler 10 comprises lift mechanism(s) 26, drive assembly(s) 212 may be configured to move aircraft handler 10 along ground surface 16 when lift mechanisms 26 position or support support members 202 in the translation position, in the lowered position, and among the lifted positions. Likewise, in some examples, drive assembly(s) 212 are configured to move aircraft handler 10 along ground surface 16 when support members 202 support the aircraft in the level aircraft orientation and when support members 202 support the aircraft among the tilted aircraft orientations. In some examples, drive assembly(s) 212 are configured to facilitate lifting of the aircraft from ground surface 16. In particular, in some examples, drive assemblies 212 are configured to move aircraft handler 10 to translate support members 202 laterally beneath at least the respective portion of the undercarriage of the aircraft. When aircraft handler 10 includes lift mechanism(s) 26, each lift mechanism 26 may be included in an undercarriage support assembly 200 that includes or that does not include a drive assembly 212.

As discussed in more detail herein, an aircraft may occupy or define an envelope, which is defined herein as a rectangular prism that encompasses the aircraft. The bottom side of the base of the rectangular prism is defined by ground surface 16, and each other side of the rectangular prism includes at least one point that is contacted by, abuts, or is defined by, a maximal extent of the aircraft in that particular direction. For example, in some fixed wing aircraft, two opposed lateral sides of the rectangular prism are contacted by, or defined by two wing tips of the aircraft, a top or upper side of the rectangular prism is defined by an empennage of the aircraft, and the front and rear sides of the aircraft are defined by the nose and empennage of the aircraft. In some examples, aircraft handler 10 is configured to fit fully within the envelope of the aircraft when the plurality of undercarriage support assemblies support the respective portions of the undercarriage of the aircraft.

Also as discussed in more detail herein, in some examples, aircraft handler 10 is configured to rotate the aircraft about a yaw axis of the aircraft. In some examples, aircraft handler 10 is configured to rotate the aircraft within a cylindrical volume having a radius that is less than a threshold fraction of a distance between the yaw axis of the aircraft and a maximum extend of the aircraft from the yaw axis.

With continued reference to FIG. 1, aircraft handler 10 comprises any suitable number of undercarriage support assemblies 200, with examples including at least two undercarriage support assemblies 200, at least three undercarriage support assemblies 200, at least four undercarriage support assemblies 200, at least five undercarriage support assemblies 200, at least six undercarriage support assemblies 200, at least eight undercarriage support assemblies 200, at most three undercarriage support assemblies 200, at most four undercarriage support assemblies 200, at most five undercarriage support assemblies 200, at most six undercarriage support assemblies 200, at most eight undercarriage support assemblies 200, and/or at most ten undercarriage support assemblies 200. Each undercarriage support assembly 200 may include one or more of the same components, features, and/or functions as one or more other undercarriage support assembly 200. Additionally or alternatively, each undercarriage support assembly 200 may include one or more components, features, and/or functions that are different from that of one or more other undercarriage support assemblies 200. In some examples, each undercarriage support assembly 200 is configured to support and/or engage a specific portion of the undercarriage of the aircraft.

As shown in FIG. 1, in some examples, the plurality of undercarriage support assemblies 200 comprises a front undercarriage support assembly 206, a rear undercarriage support assembly 208, and/or one or more distal undercarriage support assemblies 210. In some examples, each of front undercarriage support assembly 206 and rear undercarriage support assembly 208 comprise a respective lift mechanism 26. In such examples, each of front undercarriage support assembly 206 and rear undercarriage support assembly 208 are configured to selectively raise and lower the respective portions of the undercarriage of the aircraft relative to ground surface 16. In some such examples, front undercarriage support assembly 206 and rear undercarriage support assembly 208 are configured to selectively raise and lower the respective portions of the undercarriage of the aircraft relative to support member(s) 202 of distal undercarriage support assembly(s) 210. In such examples, aircraft handler 10 selectively tilts the aircraft between the level aircraft orientation and among the tilted aircraft orientations when each support member 202 supports the respective portion of the undercarriage of the aircraft, and support members 202 of front undercarriage support assembly 206 and rear undercarriage support assembly 208 are selectively raised and lowered by lift mechanisms 26 such as relative to support member(s) 202 of distal undercarriage support assembly(s) 210.

In some examples, at least some of the undercarriage support assemblies 200 are interconnected with one another. In some such examples, each undercarriage support assembly 200 is operably interconnected with at least one other undercarriage support assembly 200. Stated differently, in some examples, the plurality of undercarriage support assemblies 200 are operably interconnected with one another. For some examples in which the plurality of undercarriage support assemblies 200 are operably interconnected with one another, fewer than all of the undercarriage support assemblies 200 comprise a respective drive assembly 212.

Undercarriage support assemblies 200 may be interconnected one another in any suitable manner. In some examples, each distal undercarriage support assembly 210 is operably coupled to front undercarriage support assembly 206 or rear undercarriage support assembly 208. In some examples, front undercarriage support assembly 206 and rear undercarriage support assembly 208 are interconnected with one another. More specifically, in some examples, aircraft handler 10 comprises a connecting member 216 that is configured to operably interconnect front undercarriage support assembly 206 and rear undercarriage support assembly 208. In some such examples, connecting member 216 supports and/or positions front undercarriage support assembly 206 and rear undercarriage support assembly 208 spaced apart from one another along ground surface 16. As discussed in more detail herein, in some examples, front undercarriage support assembly 206 is operably coupled to a distal undercarriage support assembly 210 by a support arm 18. In some examples, rear undercarriage support assembly 208 is operably interconnected to a distal undercarriage support assembly 210 by a support arm 18. In some examples, each support arm 18 supports and/or positions distal undercarriage support assembly 210 spaced apart along ground surface 16 from front undercarriage support assembly 206 and/or rear undercarriage support assembly 208. In other examples, aircraft handler 10 comprises one or more connecting arms 214 that are configured to operably interconnect rear undercarriage support assembly 208 with a distal undercarriage support assembly 210. In some such examples, connecting arm(s) 214 are configured to support distal undercarriage support assembly 210 spaced apart from rear undercarriage support assembly 208 along ground surface 16.

In some examples, connecting member 216 comprises one or more communication conduits 66 that are configured to transmit data, communication signals, and/or control signals, between front undercarriage support assembly 206 and rear undercarriage support assembly 208. Additionally or alternatively, in some examples, connecting member 216 comprises one or more power supply conduits 68 that are configured to transmit power, such as electrical power, between front undercarriage support assembly 206 and rear undercarriage support assembly 208. In some examples, communication conduit(s) 66 are in communication with controller 90. In some examples, power supply conduits 68 are in communication with power source(s) 92.

Additionally or alternatively, in some examples, at least one undercarriage support assembly 200, and optionally each undercarriage support assembly 200, is configured to move independently of the other undercarriage support assemblies 200 along ground surface 16 and/or is mechanically disconnected from the other undercarriage support assemblies 200. For some examples in which undercarriage support assemblies 200 are mechanically disconnected from one another, each undercarriage support assembly 200 comprises a respective drive assembly 212 to permit each undercarriage support assembly 200 to move along the ground surface independently of one another. In some such examples, each undercarriage support assembly 200 comprises one or more respective power sources 92 configured to supply power to various components of the respective undercarriage support assembly 200. In some such examples, front undercarriage support assembly 206, rear undercarriage support assembly 208, and optionally each distal undercarriage support assembly 210, comprises a respective controller 90 configured to control the respective drive assembly 212 and/or synchronize the operation of the undercarriage support assemblies 200. In some such examples, controllers 90 are configured to communicate with one another wirelessly.

With continued reference to FIG. 1, aircraft handler 10 occupies a footprint on ground surface 16 that is defined herein as the total area on ground surface 16 occupied by undercarriage support assemblies 200 as well as the area of ground surface 16 between undercarriage support assemblies 200. As a more specific example, for some examples in which aircraft handler 10 comprises four undercarriage support assemblies 200, aircraft handler 10 occupies a generally rectangular footprint encompassing each undercarriage support assembly 200 and the area therebetween. In some examples, aircraft handler 10 comprises a deployed configuration, in which aircraft handler 10 is configured to support an aircraft, and a stowed configuration in which aircraft handler 10 is configured to be stowed. In some examples, aircraft handler 10 is configured to occupy a footprint in the stowed configuration that is smaller than the footprint that the aircraft handler 10 occupies in the deployed configuration. In some examples, two or more undercarriage support assemblies 200 are positioned further apart from one another in the deployed configuration than in the stowed configuration, such that the area along ground surface 16 between the at least two undercarriage support assemblies 200 is smaller in the stowed configuration. In this way, the stowed configuration permits aircraft handler 10 to be stored in a smaller storage area. In some examples, aircraft handler 10 is configured to move undercarriage support assembles 200 relative to one another to transition aircraft handler 10 between the stowed and deployed configurations.

In some examples, aircraft handler 10 is configured to selectively transition between the deployed configuration and the stowed configuration. For some examples in which aircraft handler 10 comprises support arm(s) 18, each support arm 18 is configured to selectively permit the undercarriage support assemblies 200, that the support arm 18 interconnects to, to translate relative to one another along ground surface 16 and permit aircraft handler 10 to transition between the stowed configuration and the deployed configuration. Similarly, for some examples in which aircraft handler 10 comprises connecting member 216, connecting member 216 is configured to selectively permit front undercarriage support assembly 206 and rear undercarriage support assembly 208 to translate relative to one another along ground surface 16 and permit aircraft handler 10 to transition between the stowed configuration and the deployed configuration. Likewise, for some examples in which aircraft handler 10 comprises connecting arm(s) 214, connecting arms 214 are configured to selectively permit rear undercarriage support assembly 208 and distal undercarriage support assembly 210 to translate relative one another along ground surface 16 and permit aircraft handler 10 to transition between the stowed configuration and the deployed configuration.

As mentioned, in some examples, aircraft handler 10 comprises one or more power sources 92 that are configured to selectively supply power to one or more components, assemblies, and/or elements of aircraft handler 10 to facilitate or power the one or more functions, operations, and/or actions that the one or more components, assemblies, and/or elements of aircraft handler 10 are configured to perform. In some examples, each component, assembly, and/or element of aircraft handler 10 that receives power from power source(s) 92 may be referred to as an actuator and/or a powered component, powered assembly, and/or powered element. Power source(s) 92 comprise any suitable type, number, and/or combination of power sources 92 for powering the one or more powered elements, powered assemblies, and/or powered components of aircraft handler 10. In some examples, power source(s) 92 are configured to selectively store power and selectively distribute power to one or more powered element(s), powered part(s), and/or powered component(s) of aircraft handler 10.

Power source(s) 92 are configured to supply any suitable type of power to the more powered element(s), powered part(s), and/or powered component(s) of aircraft handler 10 such as mechanical power, electromechanical power, pneumatic power, hydraulic power, electrical power, and/or combinations thereof. In some examples, one or more powered element(s), powered assembly(s), and/or powered component(s) of aircraft handler 10 are configured to receive electrical power. In such examples, power source(s) 92 may include one or more batteries for selectively storing electrical power and distributing electrical power. In some such examples, the one or more batteries are rechargeable and may be selectively recharged by an external power source. Additionally or alternatively, in some examples, power source(s) 92 are configured to receive one or more fuels, such as liquid petroleum based fuels and/or gaseous fuels such as propane and/or hydrogen, and convert the one or more fuels to useable power. As another example, power source(s) 92 may comprise an internal combustion engine for converting the one or more fuels to mechanical power, pneumatic power, and/or hydraulic power, which power source(s) 92 in turn selectively distribute to the one or more powered element(s), powered part(s), and/or powered component(s) of aircraft handler 10.

As more specific examples, each drive assembly 212 may be a powered assembly, and one or more components thereof, such as driven wheels 60, are configured to receive power from power source(s) 92 to move, steer, and/or rotate aircraft handler 10 and/or the aircraft along ground surface 16 and/or to facilitate lifting of at least a portion of the undercarriage of the aircraft from ground surface 16. In some examples, each lift mechanism 26 is a powered lift mechanism 26 and configured to receive power from power source(s) 92 to facilitate raising and lowering of the respective support member 202 and/or tilting of the aircraft.

When included, power source(s) 92 are positioned along and/or within aircraft handler 10 in any suitable one or more locations. In some examples, power source(s) 92 are positioned along and/or within a body 12 of at least one undercarriage support assembly 200 and/or within connecting member 216. Additionally or alternatively, in some examples, one or more power source(s) 92 are positioned proximate or within the component, element, and/or assembly that each of the one or more power source(s) 92 are configured to power.

With continued reference to FIG. 1, in some examples, aircraft handler 10 comprises a controller 90 that is programmed to control various actuators of aircraft handler 10 (e.g., the drive assembly(s) 212 and/or lift mechanism(s) 26). When included, controller 90 is in communication (e.g., electrical communication and/or wired or wireless communication) with power source(s) 92 and one or more actuators of aircraft handler 10. Controller 90 receives power (e.g., electrical power) from power source(s) 92 and selectively distributes the power provided by power source(s) 92 to the one or more actuators according to a control scheme. In particular, methods 500 discussed below in relation to FIG. 17 describe an example control scheme that may be utilized by controller 90 to regulate the amount of power supplied to the one or more actuators of aircraft handler 10.

Controller 90 may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer-readable media suitable for storing computer-executable instructions for implementing aspects of systems and/or methods according to the present disclosure.

Additionally or alternatively, controller 90 may include one or more computer(s), which may include, or be configured to read, non-transitory computer-readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

More generally, controller 90 sends command signals (e.g., digital signals and/or electrical signals) to the one or more actuators of aircraft handler 10 to adjust operation thereof. In some examples, controller 90 is configured to perform various actions, such as to control the one or more actuators, based on input. In particular, controller 90 may comprise computer-readable instructions stored in non-transitory memory, in which the computer-readable instructions comprise instructions for controlling the one or more actuators of aircraft handler 10. Controller 90 also may comprise a processing unit that is configured to execute the stored computer-readable instructions to control operation of the one or more actuators of aircraft handler 10.

In some examples, aircraft handler 10 is configured to be operated by an operator, such as one or more people, in which controller 90 is configured to receive input (such as directly or wirelessly) from the operator to control the one or more actuators of aircraft handler 10 and/or the operation of aircraft handler 10. In some such examples, aircraft handler 10 is configured for remote control, and controller 90 is configured to receive input from the operator at a remote location, such as via wireless communication (e.g., digital) between one or more remote devices controlled by the operator and a receiver included in controller 90. Additionally or alternatively, in some examples, aircraft handler 10 is autonomous or semi-autonomous and controller 90 is configured to control operation of the one or more actuators of aircraft handler 10 and/or the operation of aircraft handler 10 without input or with limited input from an operator. In some such examples, aircraft handler 10 comprises one or more sensors 98, that are in digital communication (e.g., wired or wireless communication) with controller 90. In particular, aircraft handler 10 may comprise one or more sensors 98 that are configured to collect sensor data respective to a position, speed, acceleration, rotation and/or orientation of aircraft handler 10, one or more sensors 98 that are configured to collect sensor data respective to one or more entities within the environment of aircraft handler 10, such as the location thereof, and/or one or more sensors 98 that may be associated with each actuator of aircraft handler 10 and configured to collect sensor data respective to the operation of the actuator. In such examples, controller 90 is configured to receive sensor data input from each sensor 98 and issue control outputs to the one or more actuators of aircraft handler 10 based on the sensor data and the control scheme. In this way, controller 90 is configured to utilize input from sensor(s) 98 to control the various actions that aircraft handler 10 is configured to perform without or with limited input from an operator. Examples of suitable sensors 98 that may be included in aircraft handler 10 include one or more displacement sensors (e.g., non-linear displacement sensors) that are configured to collect sensor data respective to the movement of lift mechanism 26 and/or a respective support member 202. As another example, aircraft handler 10 may include one or more alignment sensors (such as laser-based sensors) positioned proximate each support region 20 that are configured to detect the position or alignment of the undercarriage of the aircraft relative to each support region 20. As yet another example, aircraft handler 10 may comprise a steering angle sensor that may be installed in one or more of the drive assemblies 212 that is configured to detect the steering angle of the respective drive assembly 212 and/or aircraft handler 10. As yet more examples, aircraft handler 10 may comprise one or more sonar sensors, one or more infrared sensors, one or more laser sensors, and/or one or more GPS sensors, that are configured to detect entities within the environment of aircraft handler 10 and/or location of aircraft handler 10 within its environment and/or one or more speedometers and/or one or more accelerometers that are configured to detect movement of aircraft handler 10, in which data from each of these sensor types may be utilized by controller 90 to navigate or control movement of aircraft handler 10 along ground surface 16 in any suitable environment.

FIGS. 2 and 3 schematically represent examples of aircraft handlers 10 that are indicated at and referred to herein as aircraft handlers 300. With initial reference to the examples of FIG. 2, aircraft handlers 300 include a front undercarriage support assembly 206 that is configured to support a forward portion of an undercarriage 108 of an aircraft, and a rear undercarriage support assembly 208 that is configured to support an aft portion of an undercarriage of the aircraft. At least one of front undercarriage support assembly 206 and rear undercarriage support assembly 208 includes a respective drive assembly 212. In some examples, front undercarriage support assembly 206 and rear undercarriage support assembly 208 each comprise a respective drive assembly 212.

In some examples, aircraft handler 300 further includes a distal undercarriage support assembly 210 and at least one connecting arm 214 that operably couples distal undercarriage support assembly 210 to rear undercarriage support assembly 208. In some such examples, rear undercarriage support assembly 208 is configured to engage and support a first aft portion of the undercarriage of the aircraft and distal undercarriage support assembly 210 is configured to support a second aft portion of the undercarriage of the aircraft. In some examples, the undercarriage of the aircraft comprises a front wheel assembly, a first rear wheel assembly, and a second rear wheel assembly laterally spaced apart from the first rear wheel assembly. In some such examples, front undercarriage support assembly 206 is configured to support the front wheel assembly, rear undercarriage support assembly 208 is configured to support the first rear wheel assembly, and distal undercarriage support assembly 210 is configured to support the second rear wheel assembly.

In some examples, front undercarriage support assembly 206 and rear undercarriage support assembly 208 each comprise a lift mechanism 26. Each lift mechanism 26 is configured to selectively position the respective support member 202 in the lowered position, among the plurality of raised positions, and optionally in the translation position, as discussed herein. In some examples, aircraft handler 10 is configured to support the aircraft in the level aircraft orientation when support member 202 of front undercarriage support assembly 206 and support member 202 of rear undercarriage support assembly 208 are in the lowered position, and aircraft handler 300 is configured to support the aircraft among the plurality of tilted aircraft orientations when the support member 202 of front undercarriage support assembly 206 and support member 202 of rear undercarriage support assembly 208 are among the plurality of raised positions.

In some examples, aircraft handlers 300 further comprise one or more ground support chasses 236 each being operably coupled to, or defining a portion of, body 12 of an undercarriage support assembly 200. In some examples, ground support chassis 236 is configured to provide additional stability to aircraft handler 300 and/or the respective undercarriage support assembly 200. Additionally or alternatively, in some examples, ground support chassis 236 is configured to distribute the weight of the aircraft over a larger area of ground surface 16 when aircraft handler 300 supports the aircraft. In some examples, front undercarriage support assembly 206 comprises a ground support chassis 236 of the one or more ground support chasses 236 that is referred to herein as a front ground support chassis 236. Additionally or alternatively, in some examples, rear undercarriage support assembly 208 comprises a ground support chassis 236 of the one or more ground support chasses 236 that is referred to herein as a rear ground support chassis 236.

Each ground support chassis 236 comprises a pair of projections 238 that extend from body 12 laterally spaced apart from one another and that form an open region 240 therebetween. In some examples, the pair of projections 238 are positioned such that support member 202 of the respective undercarriage support assembly 200 is positioned within open region 240. Stated differently, in some examples, support member 202 is positioned between the pair of projections 238. In some examples, a portion of translation assembly 204 and/or drive assembly 212 of the respective undercarriage support assembly 200 supports projections 238 on and/or above ground surface 16. In some such examples, one or more driven wheels 60 and/or non-driven wheels 62 are positioned along a ground surface-facing region of each projection 238 and support projection 238 on and/or above ground surface. When ground support chassis 236 is included in front undercarriage support assembly 206, each projection 238 is referred to herein as a front projection 238 and the pair of projections 238 is referred to herein as front pair of projections 238. When ground support chassis 236 is included in rear undercarriage support assembly 208, each projection 238 is referred to herein as a rear projection 238 and pair of projections 238 is referred to herein as rear pair of projections 238.

In some examples, ground support chassis 236 comprises a gate 242 that is operably coupled to and/or extends from a distal region of ground support chassis 236, which is positioned furthest from support member 202 of the respective undercarriage support assembly 200. As shown in FIG. 2, in some examples, gate 242 comprises a closed configuration 244, in which gate 242 is operably coupled to and interconnects the pair of projections 238. As shown in FIG. 3, in some examples, gate 242 comprises an open configuration 246, in which gate 242 does not interconnect projections 238, provides access to the front open region 240. In some examples, gate 242 is only operably coupled to one projection 238 in open configuration 246. Alternatively, gate 242 comprises two segments, each being operably coupled to a respective projection 238, and configured to selectively interconnect with and disconnect from one another. In such examples, the two segments of gate 242 are disconnected from one another to provide access to the open region 240 in open configuration 246 and interconnected with one another in closed configuration 244. In some examples, the respective undercarriage support assembly 200 is configured to translate laterally beneath the respective portion of the undercarriage of the aircraft when gate 242 is in open configuration 246 and is configured to support the respective portion of the undercarriage of the aircraft when gate 242 is in the closed configuration 244.

As shown in FIG. 2, either or both of front undercarriage support assembly 206 and rear undercarriage support assembly 208 may include a respective gate 242. Gate 242 is configured to operably and selectively interconnect projections 328 in any suitable manner. In some examples, gate 242 is hingedly coupled to one projection 238 and the other projection 238 comprises a coupler that is configured to selectively couple to a corresponding coupler included in gate 242. In some such examples, ground support chassis 236 and/or gate 242 comprises an actuator that is configured to selectively couple and release gate 242 from the other projection and/or an actuator that is configured selectively to pivot gate 242 about the hinged coupling to transition gate 242 between closed configuration 244 and open configuration 246.

With continued reference to FIG. 2, in some examples, support member 202 of front undercarriage support assembly 206 and/or rear undercarriage support assembly 208 comprises a fork assembly 248. Each fork assembly 248 comprises a plurality of prongs 250 that project outwardly from the respective body 12 laterally spaced apart from one another. In the examples shown in FIG. 2, each fork assembly 248 comprises a pair of prongs 250 that are laterally spaced apart from one another. Prongs 250 collectively form support region 20 of the respective support member 202, with each prong 250 forming a respective portion of support region 20. Stated differently, in some examples, prongs 250 collectively are configured to support the respective portion of the undercarriage of the aircraft. For examples in which front undercarriage support assembly 206 and/or rear undercarriage support assembly 208 comprise lift mechanism 26 together with fork assembly 248, lift mechanism 26 is configured to selectively raise and lower fork assembly 248 relative to ground surface 16.

In some examples, the lateral separation between prongs 250 permits fork assembly 248 to translate laterally beneath the respective portion of the undercarriage of the aircraft, such as when lift mechanism 26 positions fork assembly 248 in the translation position. In some examples, prongs 250 engage the portion of the undercarriage of the aircraft when lift mechanism 26 raises fork assembly 248 from the translation position to the lowered position and/or to among the raised positons. As a more specific example, for some examples in which the respective portion of the undercarriage of the aircraft comprises a wheel or a wheel assembly, prongs 250 of fork assembly 248 are configured to be positioned on opposing sides of and below the wheel or wheel assembly in the translation position, and engage the opposing sides of the wheel or wheel assembly when fork assembly 248 is raised to the lowered position and/or among the raised positions.

In some examples, fork assembly 248 is configured to adjust the lateral spacing between prongs 250. In some examples, the lateral spacing between prongs 250 is adjusted to accommodate aircraft undercarriages having different dimensions and/or configurations. Additionally or alternatively, in some examples, fork assembly 248 is configured to adjust lateral spacing between prongs 250 to translate laterally beneath, and engage the respective portion of the undercarriage of the aircraft. In some more specific examples, fork assembly 248 is configured to widen the lateral spacing between prongs 250, such as when fork assembly 248 is in the translation position and/or to configure fork assembly 248 to translate laterally beneath the respective portion of the undercarriage of the aircraft. In some examples, fork assembly 248 is configured to narrow the lateral spacing between prongs 250 once prongs 250 are positioned laterally beneath the respective portion of the undercarriage of the aircraft such that prongs 250 engage the portion of the undercarriage of the aircraft, and optionally lift the portion of the undercarriage of the aircraft from direct contact with ground surface 16. In this way, fork assembly 248 also may be described as being configured to transition prongs 250 from the translation position to the lowered position, in which prongs 250 support the respective portion of the undercarriage spaced above the ground surface 16. As shown in FIG. 2, in some examples, fork assembly 248 comprises a lateral translation actuator 249 that is configured to adjust the lateral spacing between prongs 250, as discussed herein.

In some examples, each fork assembly 248 further comprises a prong gate 252 that may be configured to reinforce fork assembly 248 and/or selectively retain the respective portion of the undercarriage of the aircraft on fork assembly 248. In some examples, prong gate 252 is operably coupled to, or extends from a distal region of fork assembly 248 that is positioned furthest from body 12. As shown in FIG. 2, in some examples, prong gate 252 comprises a prong gate closed configuration 254, in which prong gate 252 is operably coupled to and interconnects the plurality of prongs 250. As shown in FIG. 3, in some examples, prong gate 252 comprises a prong gate open configuration 256, in which prong gate 252 does not interconnect prongs 250 and provides access to the lateral spacing between prongs 250. In some examples, prong gate 252 is operably coupled to only one prong 250 of the plurality of prongs 250 in prong gate open configuration 256. In some examples, gate 242 is only operably coupled to one projection 238 in open configuration 246. Alternatively, prong gate 252 comprises two segments, each being operably coupled to a respective prong 250, and configured to selectively interconnect with and disconnect from one another. In such examples, the two segments of prong gate 252 are disconnected from one another to provide access to the lateral spacing between prongs 250 in prong gate open configuration 256 and interconnected with one another in the prong gate closed configuration 254.

In some examples, fork assembly 248 is configured to translate laterally beneath the respective portion of the undercarriage of the aircraft when prong gate 252 is in prong gate open configuration 256. More specifically, in some such examples, prong gate 252 provides access to the lateral separation between prongs 250 in prong gate open configuration 256 to permit fork assembly 248 to translate laterally beneath the respective portion of the undercarriage of the aircraft. In some examples, prong gate 252 is configured to reinforce fork assembly 248 and/or selectively retain the respective portion of the undercarriage of the aircraft on fork assembly 248 when prong gate 252 is in prong gate closed configuration 254. More specifically, in some examples, prong gate 252 provides a brace against lateral movement of the respective portion of the undercarriage of the aircraft from fork assembly 248 when prong gate 252 is in prong gate closed configuration 254. In some examples, prong gate 252 is configured to selectively transition to prong gate open configuration 256 to permit fork assembly 248 to adjust the lateral spacing between prongs 250 as discussed herein.

Prong gate 252 is configured to selectively and operably interconnect prongs 250 in any suitable manner, such as in a manner similar to that discussed herein for gate 242. More specifically, for some examples in which fork assembly 248 comprises a pair of prongs, prong gate 252 is hingedly coupled to one prong 250 is configured selectively couple to and release from the other prong 250. In some examples, prong gate 252 is configured to selectively pivot between prong gate closed configuration 254 and prong gate open configuration 256. In some such examples, fork assembly 248 comprises one or more actuators for selectively pivoting prong gate 252 and/or for selectively coupling and releasing one prong 250 from the other prong 250.

As shown in FIG. 2, in some examples, each undercarriage support assembly 200 defines a respective coordinate system 290 that includes a vertical axis 292 which extends at least substantially transverse to, or perpendicular to, ground surface 16 when undercarriage support assembly 200 is positioned on ground surface 16, a lateral axis 294 which extends perpendicular to vertical axis 292, and a longitudinal axis 296 which extends perpendicular to both vertical axis 292 and lateral axis 294. When aircraft handler 300 is supported on ground surface 16, lateral axis 294 and longitudinal axis 296 extend at least substantially parallel to ground surface 16. Lateral axis 294 extends at least substantially transverse to the direction which the respective support member 202 extends from body 12, and a longitudinal axis 296 extends at least substantially parallel to the direction which the respective support member 202 extends from body 12.

The origin of coordinate system 290 is positioned at a center point 298 of an interface between body 12 and support member 202 when support member 202 is in the translation position or positioned nearest to ground surface 16. For example, when support member 202 comprises a pair of prongs 250, the origin of coordinate system 290 is positioned centrally between the pair of prongs 250 and along body 12 where prongs 250 extend from body 12 in the translation position. Coordinate systems 290 are illustrated as spaced apart from center point 298 on front undercarriage support assembly 206 and rear undercarriage support assembly 208 in FIG. 2 for sake of clarity. Thus, as discussed herein, when two components of aircraft handler 300 are described as being "laterally spaced apart from one another" the two components may be spaced apart along lateral axis 294. Likewise, lift mechanism 26 may be described as being configured to move support member 202 along vertical axis 292.

With continued reference to FIGS. 2-3, in some examples, front undercarriage support assembly 206 and rear undercarriage support assembly 208 are spaced apart from one another along ground surface 16. As mentioned, in some examples, aircraft handler 300 comprises connecting member 216 that is configured to operably interconnect front undercarriage support assembly 206 with rear undercarriage support assembly 208. In some examples, connecting member 216 is configured to position front undercarriage support assembly 206 and rear undercarriage support assembly 208 relative to one another. More specifically, in some examples, connecting member 216 is configured to position front undercarriage support assembly 206 and rear undercarriage support assembly 208 with a desired lateral spacing therebetween. Additionally or alternatively, in some examples, connecting member 216 is configured to support front undercarriage support assembly 206 and rear undercarriage support assembly 208 aligned with, or offset from, one another.

Front undercarriage support assembly 206 and rear undercarriage support assembly 208 are described herein as being "aligned" with one another when lateral axis 294 of front undercarriage support assembly 206 is at least substantially aligned with, or collinear with, lateral axis 294 of rear undercarriage support assembly 208. Similarly, front undercarriage support assembly 206 and rear undercarriage support assembly 208 are described herein as being "offset" from one another when lateral axis 294 of front undercarriage support assembly 206 is offset from, or not at least substantially aligned with, lateral axis 294 of rear undercarriage support assembly 208.

In some examples, connecting member 216 supports front undercarriage support assembly 206 and rear undercarriage support assembly 208 offset from one another such that front undercarriage support assembly 206 and rear undercarriage support assembly 208 are positioned to support a region of an undercarriage of an aircraft that are offset from one another along a transverse axis of the aircraft. Additionally or alternatively, in some examples, connecting member 216 supports front undercarriage support assembly 206 and rear undercarriage support assembly 208 laterally spaced apart from one another such that front undercarriage support assembly 206 and rear undercarriage support assembly 208 are positioned to support regions of an undercarriage of an aircraft that are spaced apart from one another along a longitudinal axis of the aircraft.

In some examples, front undercarriage support assembly 206 and rear undercarriage support assembly 208 each comprise a connecting member receiver 258 that is configured to selectively interconnect with and disconnect from connecting member 216. In some such examples, front undercarriage support assembly 206 and rear undercarriage support assembly 208 each comprise a respective plurality of connecting member receivers 258. In some more specific examples, front undercarriage support assembly 206 includes a first connecting member receiver 258 positioned on a first side 260 of front undercarriage support assembly 206 and a second connecting member receiver 258 positioned on a second side 262 of front undercarriage support assembly 206 that is opposed to first side 260 of front undercarriage support assembly 206. Likewise, in some examples, rear undercarriage support assembly 208 includes a first connecting member receiver 258 positioned on a first side 260 of rear undercarriage support assembly 208 and a second connecting member receiver 258 positioned on a second side 262 of rear undercarriage support assembly 208 that is opposed to first side 260 of rear undercarriage support assembly 208.

In some examples, connecting member 216 is configured to interconnect front undercarriage support assembly 206 with rear undercarriage support assembly 208 via first connecting member receiver 258 of the front undercarriage support assembly 206 and the first connecting member receiver 258 of the rear undercarriage support assembly 208. Likewise, in some examples, connecting member 216 is configured to interconnect front undercarriage support assembly 206 with rear undercarriage support assembly 208 via second connecting member receiver 258 of front undercarriage support assembly 206 and the second connecting member receiver 258 of the rear undercarriage support assembly 208.

In some examples, aircraft handler 300 is configured to translate laterally beneath, and engage, the undercarriage of an aircraft from a first lateral side of the aircraft when connecting member 216 interconnects front undercarriage support assembly 206 and rear undercarriage support assembly 208 via the first connecting member receivers 258. In some such examples, aircraft handler 300 is configured to translate laterally beneath, and engage, the undercarriage of the aircraft from a second lateral side of the aircraft that is opposed to the first lateral side of the aircraft when connecting member 216 interconnects front undercarriage support assembly 206 and rear undercarriage support assembly 208 via the second connecting member receivers 258. In some examples, the first lateral side of the aircraft corresponds to a right side of the aircraft and the second lateral side of the aircraft corresponds to a left side of the aircraft. In this way, connecting member 216 and the plurality of connecting member receivers 258 collectively may be described being configured to permit aircraft handler 300 to translate laterally beneath, and engage, the undercarriage of an aircraft from either lateral side of the aircraft.

In some examples, connecting member 216 is configured to permit adjustment of the lateral spacing between front undercarriage support assembly 206 and rear undercarriage support assembly 208. As shown in FIG. 2, in some examples, connecting member 216 is an articulated connecting member and comprises two or more sections 270 and a plurality of articulated connections 272 that interconnect adjacent sections 270 to one another and that interconnect connecting member 216 to each of front undercarriage support assembly 206 and rear undercarriage support assembly 208. Articulated connections 272 are configured to selectively permit sections 270 to pivot relative to one another and relative to front undercarriage support assembly 206 and rear undercarriage support assembly 208 to adjust the lateral spacing therebetween. Stated differently, articulated connections 272 may be described as being configured to permit sections 270 to fold relative to one another to adjust the lateral spacing between front undercarriage support assembly 206 and rear undercarriage support assembly 208. Similarly, in some examples, articulated connections 272 are configured to permit front undercarriage support assembly 206 and rear undercarriage support assembly 208 to move longitudinally relative to one another to permit adjustment of the offset or alignment between front undercarriage support assembly 206 and rear undercarriage support assembly 208. In some examples, articulated connections 272 are configured to secure or retain each section 270 at a desired pivotal angle relative to one another and/or undercarriage support assemblies 200, such that connecting member 216 supports and/or secures front undercarriage support assembly 206 and rear undercarriage support assembly 208 at a desired lateral spacing relative to one another and/or at a desired offset and/or in alignment.

Additionally or alternatively, in some examples, connecting member 216 is disconnected from connecting member receivers 258 of front undercarriage support assembly 206 and rear undercarriage support assembly 208 to stow aircraft handler 300. In such examples, front undercarriage support assembly 206 and rear undercarriage support assembly 208 are moved closer to one another once disconnected from connecting member 216.

As mentioned, in some examples, aircraft handler 300 comprises distal undercarriage support assembly 210 and at least one connecting arm 214 that operably couples distal undercarriage support assembly 210 to rear undercarriage support assembly 208. In some such examples, aircraft handler 300 includes a first connecting arm 214 and a second connecting arm 214 that operably couple distal undercarriage support assembly 210 to rear undercarriage support assembly 208. More specifically, in some examples, distal undercarriage support assembly 210 comprises a first portion 222 that is operably coupled to first connecting arm 214 and a second portion 224 of distal undercarriage support assembly 210. For some examples in which rear undercarriage support assembly 208 comprises ground support chassis 236, first connecting arm 214 is operably coupled to one projection 238 and second connecting arm 214 is connected to the other projection 238.

In some examples, first portion 222 and second portion 224 collectively comprise support member 202 and support region 20 of distal undercarriage support assembly 210. In some examples, first portion 222 and second portion 224 of distal undercarriage support assembly 210 are configured to selectively couple to and uncouple from one another. More specifically, in some examples, distal undercarriage support assembly 210 comprises a distal coupling mechanism 226 that is configured to selectively couple first portion 222 and second portion 224 to one another. In some examples, first portion 222 and second portion 224 collectively are configured to support the second aft portion of the undercarriage of the aircraft when distal coupling mechanism 226 operably couples first portion 222 and second portion 224 to one another. In some examples, first portion 222 and second portion 224 are configured to translate relative to one another when distal coupling mechanism 226 disengages first portion 222 and second portion 224 from one another.

In some examples, connecting arms 214 are configured to move first portion 222 and second portion 224 of distal undercarriage support assembly 210 relative to one another, such as when distal coupling mechanism 226 disengages first portion 222 and second portion 224 from one another. More specifically, as shown in FIG. 2, in some examples, aircraft handler 300 further comprises a first connecting arm actuator 280 that operably couples the first connecting arm 214 to rear undercarriage support assembly 208, and a second connecting arm actuator 280 that operably couples the second connecting arm 214 to rear undercarriage support assembly 208. In some examples, the first connecting arm actuator 280 is configured to move the first connecting arm 214, together with first portion 222, along ground surface 16, and the second connecting arm actuator 280 is configured to move second connecting arm 214, together with second portion 224, along ground surface 16. In this way, first connecting arm actuator 280 and second connecting arm actuator 280 may be configured to adjust the spacing between first portion 222 and second portion 224 along ground surface 16. In some examples, first connecting arm actuator 280 and/or second connecting arm actuator 280 is a rotary actuator that is configured to selectively pivot the respective connecting arm 214, together with the respective portion of distal undercarriage support assembly 210 along ground surface 16.

As shown in FIG. 2, in some examples, distal undercarriage support assembly 210 comprises a supporting configuration 228 in which distal coupling mechanism 226 operably couples first portion 222 and second portion 224 to one another for operative support of the second aft portion of the undercarriage of the aircraft. As shown in FIG. 3, in some examples, distal undercarriage support assembly 210 also comprises a positioning configuration 230 in which distal coupling mechanism 226 disengages first portion 222 from second portion 224, and first connecting arm actuator 280 and second connecting arm actuator 280 position first portion 222 and second portion 224 spaced apart from one another along ground surface 16. In some examples, distal undercarriage support assembly 210 is configured to translate laterally beneath the second aft portion of the undercarriage of the aircraft in the positioning configuration 230. In some such examples, distal undercarriage support assembly 210 also is configured to permit rear undercarriage support assembly 208 to translate laterally beneath the first aft portion of the undercarriage of the aircraft in positioning configuration 230. More specifically, in some examples, the lateral spacing between first portion 222 and second portion 224 provides a path for distal undercarriage support assembly 210 to move around the first and second portions of the undercarriage of the aircraft during operative positioning of aircraft handler 300.

As discussed in more detail herein, in some examples, when distal undercarriage support assembly 210 is operably positioned relative to the second aft portion in the positioning configuration 230, distal undercarriage support assembly 210 is configured to lift the second portion of the undercarriage of the aircraft from contact with ground surface 16 by transitioning from the positioning configuration 230 to supporting configuration 228. In some such examples, distal coupling mechanism 226 is configured to pull first portion 222 and second portion 224 of distal undercarriage support assembly 210 towards one another to lift the second aft portion of the undercarriage of the aircraft from contact with ground surface 16.

When included, distal coupling mechanism 226 includes any suitable mechanism for selectively coupling first portion 222 and second portion 224 to one another. In some examples, distal coupling mechanism 226 comprises a pair of hydraulic cylinders that are configured to selectively couple first portion 222 and second portion 224 to one another and move first portion 222 and second portion 224 relative to one another to lift the second aft portion of the undercarriage of the aircraft from contact with ground surface 16. In such examples, distal coupling mechanism 226 may be described as having a lift-spoon mechanism. In some examples, the hydraulic cylinders are operably coupled to and extend between first portion 222 and second portion 224 in supporting configuration 228 and disconnect first portion 222 from second portion 224 in positioning configuration 230. More specifically, in such examples, each hydraulic cylinder is operably coupled to only one of first portion 222 and second portion 224 in positioning configuration 230. In some such examples, one hydraulic cylinder extends from first portion 222 and the other hydraulic cylinder extends from second portion 224 in positioning configuration 230. In some examples, each hydraulic cylinder comprises a coupling member that is configured to selectively couple to and disconnect from one of first portion 222 and second portion 224. In some examples, the hydraulic cylinders are positioned on either side of support region 20 of distal undercarriage support assembly 210.

As mentioned, in some examples, only one of front undercarriage support assembly 206 and rear undercarriage support assembly 208 comprise a respective drive assembly 212. In other examples, front undercarriage support assembly 206 and rear undercarriage support assembly 208 each comprise a respective drive assembly 212. As referred to herein, a drive assembly 212 that is included in front undercarriage support assembly 206 may be referred to as a front drive assembly 212, and a drive assembly 212 that is included in rear undercarriage support assembly 208 may be referred to as a rear drive assembly 212.

For examples in which aircraft handler 300 only includes front drive assembly 212, front drive assembly 212 is configured to move aircraft handler 300 and the aircraft along ground surface 16. Likewise, for examples in which aircraft handler 300 only includes rear drive assembly 212, rear drive assembly 212 is configured to move aircraft handler 300 along ground surface 16. In particular, aircraft handler 300 may include only one of front drive assembly 212 and rear drive assembly 212 for examples in which front undercarriage support assembly 206 and rear undercarriage support assembly 208 are interconnected via connecting member 216, and distal undercarriage support assembly 210 is interconnected with rear undercarriage support assembly 208 via connecting arm(s) 214.

In some examples, front undercarriage support assembly 206 and rear undercarriage support assembly 208 are mechanically disconnected from one another. In such examples, front undercarriage support assembly 206 comprises front drive assembly 212 and rear undercarriage support assembly 208 comprises rear drive assembly 212. In some such examples, front drive assembly 212 and rear drive assembly 212 are configured to move front undercarriage support assembly 206 and rear undercarriage support assembly 208 independently of one another. In some such examples, rear drive assembly 212 is configured to move rear undercarriage support assembly 208 together with distal undercarriage support assembly 210. In some examples, distal undercarriage support assembly 210 is mechanically disconnected from rear undercarriage support assembly 208 and comprises a respective drive mechanism 212 that is configured to move distal undercarriage support assembly 210 along ground surface 16 independently of front undercarriage support assembly 206 and rear undercarriage support assembly 208.

As shown in FIG. 2, in some examples, aircraft handlers 300 comprise one or more power sources 92 for supplying power to various actuators and/or powered components of 300. In some examples, aircraft handler 300 further comprises controller 90 for regulating the various actuators and/or powered components such as by controlling the amount of power supplied to each component by power source(s) 92. Examples of actuators and/or powered components of aircraft handler 300 that may be supplied power by power source(s) and/or regulated by controller 90 include lift mechanism(s) 26, drive assembly(s) 212, gates 242, prong gate(s) 252, connecting member 216, articulated connection(s) 272, connecting arm(s) 214, connecting arm actuator(s) 280, connecting arm articulated connection(s) 278, and/or distal coupling mechanism 226.

FIG. 4 schematically represents examples of aircraft handlers 10 that are indicated at and referred to herein as aircraft handlers 400. As shown in the examples of FIG. 4, aircraft handlers 400 include a front undercarriage support assembly 206 and a distal undercarriage support assembly 210 that are operably coupled to front undercarriage support assembly 206. Support member 202 of front undercarriage support assembly 206 and support member 202 of distal undercarriage support assembly 210 collectively comprise a support arm 18 that is operably coupled to body 12 of front undercarriage support assembly 206 and body 12 of distal undercarriage support assembly 210. Distal undercarriage support assembly 210 is configured to support support arm 18 on ground surface 16.

Aircraft handlers 400 further include a plurality of drive assemblies 212, including a first drive assembly 14 that includes translation assembly 204 of front undercarriage support assembly 206, and a second drive assembly 24 that includes translation assembly 204 of distal undercarriage support assembly 210. First drive assembly 14 and second drive assembly 24 are configured to move aircraft handler 400 along ground surface 16. More specifically, first drive assembly 14 and second drive assembly 24 are configured to move aircraft handler 400 along ground surface 16 while support arm 18 operably supports at least the respective portion of the aircraft, such as to move aircraft handler 400, together with aircraft, along ground surface 16.

Support arm 18 comprises at least one, and optionally a plurality of support regions 20. Each support region 20 is positioned along any suitable region of support arm 18. In some examples, support regions 20 are positioned along regions of support arm 18 that correspond to ground contacting portions of the undercarriage of the aircraft. As shown in FIG. 4, in some examples, support arm 18 comprises a proximal end 28 that is operably coupled to body 12 of front undercarriage support assembly 206, and a distal end 30 that is opposed to proximal end 28 and operably coupled to body 12 of distal undercarriage support assembly 210. In some examples, second drive assembly 24 includes a chassis 64, and distal end 30 of support arm 18 is at least partially overlapping with chassis 64. In some such examples, support region 20 is positioned along support arm 18 proximate or abutting distal end 30, such as to at least partially overlap with chassis 64 of second drive assembly 24.

As discussed herein, support arm 18 may be referred to as lift arm 18, support prong 18, support platform 18, and/or support boom 18. In some examples, support arm 18 is configured to support and/or suspend at least a portion of the undercarriage of the aircraft spaced apart from, spaced from direct contact with, and/or spaced above ground surface 16. Support arm 18 also may be configured to support and/or suspend a substantial portion of, or the entirety of the undercarriage of the aircraft spaced above ground surface 16.

In some examples, support arm 18 is configured to selectively lift at least a portion of the undercarriage of the aircraft from direct contact with ground surface 16. In some such examples, support arm 18 is configured to translate laterally beneath at least a portion of the undercarriage of the aircraft to lift at least a portion of the undercarriage from direct contact with ground surface 16. As shown in FIG. 4, in some examples, support arm 18 comprises one or more transition portions 86 that are configured to facilitate lifting and/or transferring of at least a portion of the undercarriage of the aircraft onto support arm 18. For example, each transition portion 86 may be configured to facilitate lifting of at least a portion of the undercarriage of the aircraft onto a respective support region 20. In some such examples, each transition portion 86 is positioned proximate, abutting, or overlapping with the respective support region 20 and is configured to lift at least a portion of the undercarriage of the aircraft onto the respective support region 20 when support arm 18 translates laterally beneath the undercarriage of the aircraft. Each transition portion 86 also may extend beyond a respective support region 20 to define an overhang, a peripheral portion, and/or an edge region of support arm 18. As discussed herein, in some examples, support region 20 is positioned along support arm 18 to at least partially overlap with chassis 64 of second drive assembly 24. In such examples, aircraft handler 400 may include a transition portion 86 that is positioned along chassis 64 proximate, or aligned with, support region 20 and is configured to facilitating lifting of at least a portion of the undercarriage of the aircraft onto the support region 20 that overlaps with chassis 64 of second drive assembly 24.

When included, transition portions 86 comprise any suitable structure or combination of structures for facilitating lifting and/or transitioning of at least a portion of the undercarriage of the aircraft from ground surface 16 onto support arm 18. As examples, each transition portion 86 may include one or more of a ramp, a wedge, roller(s), a knuckle, and/or combinations thereof.

In some examples, front undercarriage support assembly 206 comprises lift mechanism 26 that operably couples proximal end 28 of support arm 18 to body 12 of front undercarriage support assembly 206. When included, lift mechanism 26 is configured to selectively raise and lower proximal end 28 of support arm 18 relative to ground surface 16 to operably pivot support arm 18 relative to ground surface 16. Stated another way, in some examples, lift mechanism 26 is configured to pivot support arm 18 among a level orientation and a plurality of tilted orientations relative to ground surface 16. In some such examples, lift mechanism 26 also is configured to selectively retain and orient support arm 18 in each of the level orientation and the plurality of tilted orientations. Lift mechanism 26 also may be described as being configured to pivot support arm 18 among a plurality of tilt angles relative to the ground surface 16, in which the plurality of tilt angles may be from −5° to 25°. In some examples, proximal end 28 of support arm 18 is pivotally or hingedly coupled to lift mechanism 26 to permit lift mechanism 26 to pivot support arm 18. Similarly, in some examples, distal end 30 of support arm 18 is pivotally or hingedly coupled to body 12 of distal undercarriage support assembly 210 to permit lift mechanism 26 to pivot support arm 18.

In some examples, aircraft handlers 400 include one or more tilt sensors installed in support arm 18 that are configured to collect sensor data respective to the tilt angle of support arm 18, and send the sensor data to controller 90. Correspondingly, controller 90 may be configured to control lift mechanism 26 at least partially based on the sensor data received from the tilt sensor(s) installed in support arm 18.

As mentioned, in some examples, aircraft handlers 400 are configured to support an aircraft in the level aircraft orientation, and among a plurality of tilted aircraft orientations. In some such examples, aircraft handlers 400 are configured to selectively tilt or transition the aircraft between the level aircraft orientation and the plurality of tilted aircraft orientations. More specifically, for some examples in which aircraft handler 400 comprises lift mechanism 26, lift mechanism 26 is configured to selectively raise and lower proximal end 28 of support arm 18 while support arm 18 supports at least a portion of the undercarriage of the aircraft. In such examples, when lift mechanism 26 pivots support arm 18, support arm 18 correspondingly tilts the aircraft. As such, support arm 18 may be configured to tilt the aircraft among a level aircraft orientation and a plurality of tilted aircraft orientations, such as when lift mechanism 26 pivots support arm 18 among the plurality of tilted orientations. Similarly, support arm 18 also may be configured to operably support and selectively retain the aircraft in the level aircraft orientation and each of the plurality of tilted aircraft orientations.

As discussed herein, in some examples, first drive assembly 14 and second drive assembly 24 are configured to operate independently, such as to steer and/or rotate aircraft handler 400. Additionally or alternatively, in some examples, first drive assembly 14 and second drive assembly 24 are configured to operate in unison. As shown in FIG. 4, in some examples, first drive assembly 14 and/or second drive assembly 24 comprise one or more driven wheels 60, which support first drive assembly 14 and/or second drive assembly 24 on ground surface 16. Also as shown in FIG. 4, in some examples, first drive assembly 14 and/or second drive assembly 24 comprise one or more non-driven wheels 62.

In some examples, first drive assembly 14 and/or second drive assembly 24 are configured to facilitate lifting or transferring of at least a portion of the undercarriage of the aircraft from ground surface 16 onto support arm 18. In particular, first drive assembly 14 and/or second drive assembly 24 may move aircraft handler 10 to translate support arm 18 laterally beneath at least a portion of the undercarriage of the aircraft to lift, such as via transition portions 86, the portion of the undercarriage of the aircraft from contact with ground surface 16 and onto support region(s) 20.

As discussed in more detail herein with reference to FIG. 5, in some examples, support arm 18 has a deployed orientation 32, in which support arm 18 is configured to support the undercarriage of the aircraft, and a stowed orientation 34, in which support arm 18 is configured to occupy a smaller footprint or floor space than support arm 18 occupies in deployed orientation 32. More specifically, in the deployed orientation, distal end 30 of support arm 18 is spaced further away from body 12 than in stowed orientation 34. Stated differently, in stowed orientation 34, distal end 30 and/or second drive assembly 24 are positioned closer to body 12 than in deployed orientation 32.

In some examples, support arm 18 is configured to be selectively and repeatedly transitioned between the deployed orientation and the stowed orientation. In some such examples, support arm 18 comprises a plurality of members that are configured to move relative to one another when support arm 18 is selectively transitioned between deployed orientation 32 and stowed orientation 34. As examples, support arm 18 may include at least two, at least three, at least four, at least six, and/or at most ten members. As shown in FIG. 5, in some examples, support arm 18 comprises a first member 80 and a second member 82 that are configured to move relative to one another when support arm 18 is transitioned between deployed orientation 32 and stowed orientation 34. In some examples, first member 80 is operably coupled to lift mechanism 26 of front undercarriage support assembly 206 and/or comprises proximal end 28 of support arm 18. In some examples, second member 82 is operably coupled to distal undercarriage support assembly 210 and/or comprises distal end 30 of support arm 18. In the deployed orientation, first member 80 and second member 82 may be in an overlapping, collinear, and/or in an extended, orientation. In the stowed orientation, first member 80 and second member 82 may be in a folded, tilted, nested and/or condensed orientation.

First member 80 and second member 82 are configured to selectively move relative to one another in any suitable manner when support arm 18 is transitioned between the deployed orientation and the stowed orientation. As examples, first member 80 and second member 82 may be configured to selectively telescope, pivot, and/or slide relative to one another. As a more specific example, as shown in FIG. 4, support arm 18 may comprise a hinge mechanism 84 that hingedly or pivotally couples first member 80 to second member 82 and is configured to selectively permit first member 80 and second member 82 to pivot about hinge mechanism 84 when support arm 18 is transitioned between the deployed orientation and the stowed orientation.

Aircraft handlers 400 may include and/or utilize any suitable mechanism for moving distal end 30 of support arm 18 relative to body 12 when support arm 18 is transitioned between deployed orientation 32 and stowed orientation 34. In some examples, second drive assembly 24 is configured to move distal end 30 of support arm 18 relative to body 12 of front undercarriage support assembly 206 when support arm 18 is transitioned between deployed orientation 32 and stowed orientation 34. In some such examples, second drive assembly 24 is configured to move distal end 30 of support arm 18 to cause first member 80 and second member 82 to pivot about hinge mechanism(s) 84 and transition support arm 18 between the deployed orientation and the stowed orientation.

When included, each of first member 80 and second member 82 are positioned along support arm 18 with any suitable relationship relative to support region(s) 20. As an example, when support arm 18 comprises first member 80, second member 82, and one support region 20, support region 20 may be positioned along either or both first member 80 and second member 82. For example, support region 20 may be positioned along both of first member 80 and second member 82 when first member 80 and second member 82 overlap in deployed orientation 32. As another example, when support arm 18 comprises first member 80, second member 82, a first support region 20, and a second support region 20, the first support region 20 may be positioned along first member 80 and the second support region 20 may be positioned along second member 82.

With continued reference to FIG. 4, in some examples, aircraft handler 400 comprises a plurality of support arms 18, such as at least two, at least three, at least four, and/or at most six support arms 18. As shown in FIG. 4, each support arm 18 may include similar, or substantially similar, structures and/or elements and/or may be operably coupled to similar, or substantially similar, structures and/or elements, such as in a similar, or substantially similar, manner. Specifically, each support arm 18 may be operably coupled to body 12 of a respective undercarriage support assembly 200 in a similar, or at least substantially similar, manner, such as via a lift mechanism 26. Similarly, each support arm 18 may extend from body 12 of the respective undercarriage support assembly 200 in a similar direction as one or more other support arms 18 and/or may extend parallel to, or at least substantially parallel to one or more other support arms 18. That said, each support arm 18 may include a unique number, quantity, and/or distribution of support regions 20 and optionally transition portions 86. In this way, each support arm 18 may be configured to support, lift, suspend, and/or handle a different portion or region of the undercarriage of the aircraft. Similarly, each support arm 18 may comprise different placement of first member 80 and second member 82.

As shown in FIG. 4, in some examples, distal undercarriage support assembly 210 is a first distal undercarriage support assembly 209, support arm 18 is a first support arm 36, and aircraft handler 400 further includes a rear undercarriage support assembly 208, a pair of distal undercarriage support assemblies 210, which includes the first distal undercarriage support assembly 209 and a second distal undercarriage support assembly 211, and a pair of support arms 18, which includes first support arm 36 and a second support arm 38. In such examples, body 12 of front undercarriage support assembly 206 is referred to herein as a first body member 50, and body 12 of rear undercarriage support assembly 208 is referred to herein as second body member 52. As shown in FIG. 4, in some examples, first body member 50 and second body member 52 are operably coupled to one another. In some examples, second distal undercarriage support assembly 211 possesses similar, or at least substantially, similar components, functions, attributes, etc. as that discussed herein for first distal undercarriage support assembly 209.

First support arm 36 operably interconnects front undercarriage support assembly 206 to first distal undercarriage support assembly 210 as discussed herein. Support member 202 of rear undercarriage support assembly 208 and support member 202 of second distal undercarriage support assembly 211 collectively comprise second support arm 38. Second support arm 38 is operably coupled to second body member 52 of rear undercarriage support assembly 208 and to body 12 of second distal undercarriage support assembly 211 and interconnects rear undercarriage support assembly 208 with second distal undercarriage support assembly 211. In some examples, second distal undercarriage support assembly 211 is operably coupled to distal end 30 of second support arm 38 and rear undercarriage support assembly 208 is operably coupled to proximal end 28 of second support arm 38.

As mentioned, aircraft handlers 400 comprise a plurality of drive assemblies 212, which include first drive assembly 14 and second drive assembly 24. In some examples, second distal undercarriage support assembly 211 further includes a drive assembly 212 that is indicated at and referred to herein as third drive assembly 40. When included, third drive assembly 40 includes translation assembly 204 of second distal undercarriage support assembly 211 and is configured to move aircraft handler 400 along ground surface 16 together with the other drive assemblies 212, which include first drive assembly 14, second drive assembly 24, and optionally a fourth drive assembly 44.

Additionally or alternatively, in some examples, rear undercarriage support assembly 208 further includes a drive assembly 212 that is indicated at and referred to herein as fourth drive assembly 44. When included, fourth drive assembly 44 includes translation assembly 204 of rear undercarriage support assemblies 208 and is configured to move aircraft handler 400 along ground surface 16 together with the other drive assemblies 212, which include first drive assembly 14, second drive assembly 24, and optionally third drive assembly 40.

When included, third drive assembly 40 may comprise similar, or substantially similar, features, functions, and/or components and/or may be operably coupled to similar, or substantially similar, elements and/or structures to those discussed in detail herein for second drive assembly 24. Likewise, when included, fourth drive assembly 44 may comprise similar, or substantially similar, features, functions, and/or components, and/or may be operably coupled to similar, or substantially similar, elements and/or structures to those discussed in detail herein for first drive assembly 14. For example, as shown in FIG. 4, third drive assembly 40 and/or fourth drive assembly 44 each may comprise one or more driven wheels 60 and/or one or more non-driven wheels 62. Additionally, third drive assembly 40 and/or fourth drive assembly 44 may comprise chassis 64, and transition portion 86 may be operably coupled to chassis 64 of third drive assembly 40 and/or fourth drive assembly 44.

In some examples, first support arm 36 and second support arm 38 are configured to support different or discrete regions of an undercarriage of an aircraft. For example, first support arm 36 may be configured to support a forward portion of the undercarriage of the aircraft and second support arm 38 may be configured to support a rearward portion of the undercarriage of the aircraft or vice versa. Stated differently, in some examples, front undercarriage support assembly 206 and first distal undercarriage support assembly 209 collectively are configured to support the forward portion of the undercarriage of the aircraft, and rear undercarriage support assembly 208 together with second distal undercarriage support assembly 211 collectively are configured to support the rear portion of the undercarriage of the aircraft, or vice versa. In some examples, the undercarriage of the aircraft comprises a landing gear assembly having a front wheel assembly and one or more rear wheel assemblies. In such examples, first support arm 36 may be configured to support the front wheel assembly and second support arm 38 may be configured to support the one or more rear wheel assemblies or vice versa.

First support arm 36 and second support arm 38 each include any suitable number of support regions 20 for supporting respective portions of the undercarriage of the aircraft. For example, in some examples, the landing gear assembly of the aircraft includes one set of front wheels and two sets of spatially separated rear wheels. In such examples, first support arm 36 may include a single support region 20 for supporting the single set of front wheels, and second support arm 38 may include two spatially separated support regions 20 that are configured to support the two sets of rear wheels or vice versa.

In some examples, aircraft handler 10 includes a plurality of lift mechanisms 26, in which each lift mechanism 26 operably couples proximal end 28 of a particular support arm 18 to body 12 of an undercarriage support assembly 200. More specifically, in some examples, aircraft handler 400 includes a first lift mechanism 94 and a second lift mechanism 96, in which first lift mechanism 94 operably couples proximal end 28 of first support arm 36 to first body member 50 and is configured to selectively pivot first support arm 36, and second lift mechanism 96 operably couples proximal end 28 of second support arm 38 to second body member 52 and is configured to selectively pivot second support arm 38, such as discussed herein. In some examples, first lift mechanism 94 and second lift mechanism 96 are configured to pivot first support arm 36 and second support arm 38 in unison, and in some examples, first lift mechanism 94 and second lift mechanism 96 are configured to pivot first support arm 36 and second support arm 38 independently of one another. Likewise, in some examples, first lift mechanism 94 and second lift mechanism 96 comprise the same type of lift mechanism and in other examples, first lift mechanism 94 and second lift mechanism 96 comprise different types of lift mechanisms.

With continued reference to FIG. 4, in some examples, aircraft handler 400 comprises connecting member 216 that operably couples first body member 50 of front undercarriage support assembly 206 to second body member 52 of rear undercarriage support assembly 208. In some examples, connecting member 216 is, or includes, a frame 54 that is configured to support first body member 50 and second body member 52 spaced apart along ground surface 16. In some such examples, first body member 50 and second body member 52 support first support arm 36 and second support arm 38 spaced apart along ground surface 16. In such examples, first support arm 36 and second support arm 38 extend from first body member 50 and second body member 52 with a desired lateral spacing being defined therebetween.

In some examples, frame 54 includes a telescoping mechanism 58 that is configured to selectively and operably adjust the spacing between first body member 50 and second body member 52. Stated differently, in some examples, telescoping mechanism 58 is configured to selectively and operably adjust the spacing between first support arm 36 and second support arm 38. When frame 54 includes telescoping mechanism 58, frame 54 may be referred to as a telescoping frame 56.

In some examples, telescoping mechanism 58 is utilized to adjust the spacing between first support arm 36 and second support arm 38 to permit aircraft handler 400 to lift, move, and/or tilt aircraft having various undercarriage configurations. For example, telescoping mechanism 58 may be utilized to adjust the spacing between first support arm 36 and second support arm 38 to permit aircraft handler 400 to lift, move, and/or tilt aircraft having landing gear assemblies with various separations between the forward landing gear portion and the rear landing gear portion. In some examples, telescoping mechanism 58 is utilized to adjust the spacing between first support arm 36 and second support arm 38 when aircraft handler 400 lifts or transfers the undercarriage of the aircraft to and from ground surface 16. For example, to lift the undercarriage of the aircraft from the ground surface, telescoping mechanism 58 may increase the spacing between first support arm 36 and second support arm 38. Then, first support arm 36 may translate (such as via first drive assembly 14 and/or second drive assembly 24) to a position on ground surface 16 that is fore of a forward portion of the undercarriage of the aircraft, while second support arm 38 translates (such as via third drive assembly 40 and/or fourth drive assembly 44) to a position that is aft of a rearward portion of the undercarriage of the aircraft. Once positioned fore and aft of the undercarriage of the aircraft, telescoping mechanism 58 may be utilized to reduce the spacing between first support arm 36 and second support arm 38, such that first support arm 36 and second support arm 38 translate laterally beneath and lift (such as via transition portions 86) the forward and rear regions of the undercarriage from ground surface 16 onto respective support regions 20.

Telescoping mechanism 58 includes any suitable mechanism for adjusting the spacing between first body member 50 and second body member 52, and/or the spacing between first support arm 36 and second support arm 38. For example, telescoping frame 56 may include a first portion and a second portion that are configured to translate and/or telescope relative to one another, and telescoping mechanism 58 may be configured to facilitate translation and/or telescoping of the first portion and the second portion of telescoping frame 56. As examples, telescoping mechanism 58 may include a hydraulic telescoping mechanism, a mechanical telescoping mechanism, an electromechanical telescoping mechanism, a screw jack telescoping mechanism, a chain driven telescoping mechanism and/or a rotary driven telescoping mechanism. As a more specific example, telescoping mechanism 58 includes one or more rails and one or more rollers disposed on the first portion and the second portion of telescoping frame 56 that interface with one another to facilitate translation. In some examples, telescoping mechanism 58 is an active telescoping mechanism and may power translation of first body member 50 and first support arm 36 relative to second body member 52 and second support arm 38. As a more specific example, telescoping mechanism 58 may include powered rollers that power translation of the first and second portions of telescoping frame 56 relative to one another. In some such examples, telescoping mechanism 58 is configured to receive power from power source(s) 92 to adjust the spacing between first support arm 36 and second support arm 38. Alternatively, in some examples, telescoping mechanism 58 is a passive telescoping mechanism and one or more of first drive assembly 14, second drive assembly 24, third drive assembly 40, and/or fourth drive assembly 44 move first body member 50 and/or first support arm 36 relative to second body member 52 and/or second support arm 38.

As mentioned, in some examples, aircraft handler 400 has a deployed configuration and a stowed configuration, in which aircraft handler 400 is configured to occupy a smaller floor space or footprint in the stowed configuration relative to the deployed configuration. In some examples, support arm(s) 18 are in the deployed orientation when aircraft handler 400 is in the deployed configuration, and support arm(s) 18 are in the stowed orientation when aircraft handler 400 is in the stowed configuration. In some examples, aircraft handler 400 is configured to selectively transition between the deployed configuration and the stowed configuration. In some such examples, telescoping mechanism 58 is configured to control the spacing between first body member 50 and second body member 52 and/or the spacing between first support arm 36 and second support arm 38, to transition aircraft handler 400 between the deployed configuration and the stowed configuration.

As shown in FIG. 4, in some examples, aircraft handlers 400 comprise one or more power sources 92 for supplying power to various actuators and/or powered components of aircraft handler 400. In some examples, aircraft handler 400 further comprises controller 90 for regulating the various actuators and/or powered components such as by controlling the amount of power supplied to each component by power source(s) 92. Examples of actuators and/or powered components of aircraft handler 400 that may be supplied power by power source(s) 92 and/or regulated by controller 90 include lift mechanism(s) 26, first drive assembly 14, second drive assembly 24, third drive assembly 40, fourth drive assembly 44, and/or telescoping mechanism 58.

Turning to FIG. 5, illustrated therein is a schematic side view representing examples of aircraft handlers 400 with support arm 18 oriented in deployed orientation 32, stowed orientation 34, level orientation 100, and among tilted orientations 102. In particular, support arm 18 is illustrated in solid lines in level orientation 100, support arm 18 is illustrated in dot-dash lines in tilted orientation 102, and support arm 18 and second drive assembly 24 are illustrated in dot-dot-dash lines in stowed orientation 34.

Support arm 18 may be described as being in deployed orientation 32 while support arm 18 is in level orientation 100 and among tilted orientations 102. In particular, as shown in FIG. 2, support arm 18 may be configured to support at least a portion of an undercarriage 108 of the aircraft while oriented in level orientation 100 and among tilted orientations 102. Aircraft handler 400 comprises first drive assembly 14 that supports body 12 of front undercarriage support assembly 206 on ground surface 16. Aircraft handler 400 also includes distal undercarriage support assembly 210 that is operably coupled to distal end 30 of support arm 18 and supports support arm 18 on ground surface 16. Distal undercarriage support assembly 210 comprises second drive assembly 24 that supports distal undercarriage support assembly 210 on ground surface 16. As shown, first drive assembly 14 and second drive assembly 24 each may comprise one or more driven wheels 60, and optionally one or more non-driven wheels 62, that may support first drive assembly 14 and second drive assembly 24 on ground surface 16.

In level orientation 100, support arm 18 extends between body 12 of front undercarriage support assembly 206 and body 12 of distal undercarriage support assembly 210 substantially parallel to ground surface 16. Here, lift mechanism 26 supporting proximal end 28 of support arm 18 generally is aligned with, or at the same height as, distal end 30 of support arm 18. When support arm 18 is in level orientation 100, support region 20 may support undercarriage 108 of aircraft 22 and orient aircraft 22 in level aircraft orientation 104. For example, when support arm 18 is oriented in level orientation 100, support region 20 may provide a level surface, platform, or region for supporting undercarriage 108, such as one or more wheels of a landing gear assembly, of aircraft 22.

When support arm 18 is among tilted orientations 102, lift mechanism 26 supports proximal end 28 of support arm 18 spaced further above ground surface 16 than in level orientation 100. In other words, lift mechanism 26 supports proximal end 28 spaced further above ground surface 16 than distal end 30 to orient support arm 18 among tilted orientations 102. As shown in FIG. 5, in some examples, lift mechanism 26 comprises a pillar 97 that extends upwardly and/or generally normal to ground surface 16 and lift mechanism 26 is configured to selectively move proximal end 28 of support arm 18 up and down pillar 97 to selectively transition support arm 18 among level orientation 100 and tilted orientations 102.

In some examples, each tilted orientation 102 corresponds to lift mechanism 26 supporting proximal end 28 of support arm 18 and at a particular spacing above ground surface 16 and/or at a particular spacing above distal end 30, such as to orient support arm 18 with a particular tilt angle. Further shown in FIG. 5, in some examples, support region 20 is configured to support at least a portion of the undercarriage 108 of the aircraft 22 while support arm 18 is oriented in any desirable tilted orientation 102, such that support arm 18 supports or orients aircraft 22 in a corresponding tilted aircraft orientation 106. In this way, lift mechanism 26 and support arm 18 are configured to selectively tilt aircraft 22 among level aircraft orientation 104 and tilted aircraft orientations 106.

In some examples, aircraft handler 400 and/or support arm 18 comprise one or more securing mechanisms for engaging undercarriage 108 of aircraft 22 with support arm 18, such as while support arm 18 supports aircraft 22 among tilted aircraft orientations 106. As discussed herein, in some examples, support region 20 comprises one or more portions that are configured to engage with undercarriage 108, such as clamps and/or friction fits, while support arm 18 supports aircraft 22 among titled aircraft orientations 106. Additionally or alternatively, in some examples, one or more tie-down mechanisms are utilized to secure aircraft 22 to support arm 18 and/or support region 20 while support arm 18 orients aircraft 22 among tilted aircraft orientations 106.

With continued reference to FIG. 5, illustrated in dot-dot-dash lines is an example of support arm 18 oriented in stowed orientation 34. As shown, distal end 30 of support arm 18 is positioned closer to proximal end 28 and/or body 12 of front undercarriage support assembly 206 in stowed orientation 34 than in deployed orientation 32. Similarly, second drive assembly 24 and/or body 12 of distal undercarriage support assembly 210 is positioned closer to first drive assembly 14, body 12 of front undercarriage support assembly 206, and/or proximal end 28 of support arm 18 when support arm 18 is in stowed orientation 34. In this way, aircraft handler 400 occupies a smaller floor space or footprint when support arm 18 is oriented in stowed orientation 34.

In the specific example illustrated in FIG. 5, support arm 18 comprises first member 80, second member 82, and hinge mechanism 84 that hingedly couples first member 80 and second member 82 to one another. In some examples, when support arm 18 is in deployed orientation 32, first member 80 and second member 82 are substantially collinear and may be overlapping. When support arm 18 is in stowed orientation 34, first member 80 and second member 82 are tilted upwardly and pivoted relative to one another about hinge mechanism 84 to permit distal end 30, second drive assembly 24, and/or body 12 of distal undercarriage support assembly 210 to be positioned closer to proximal end 28, body 12 of front undercarriage support assembly 206 and/or first drive assembly 14.

Figure 6:
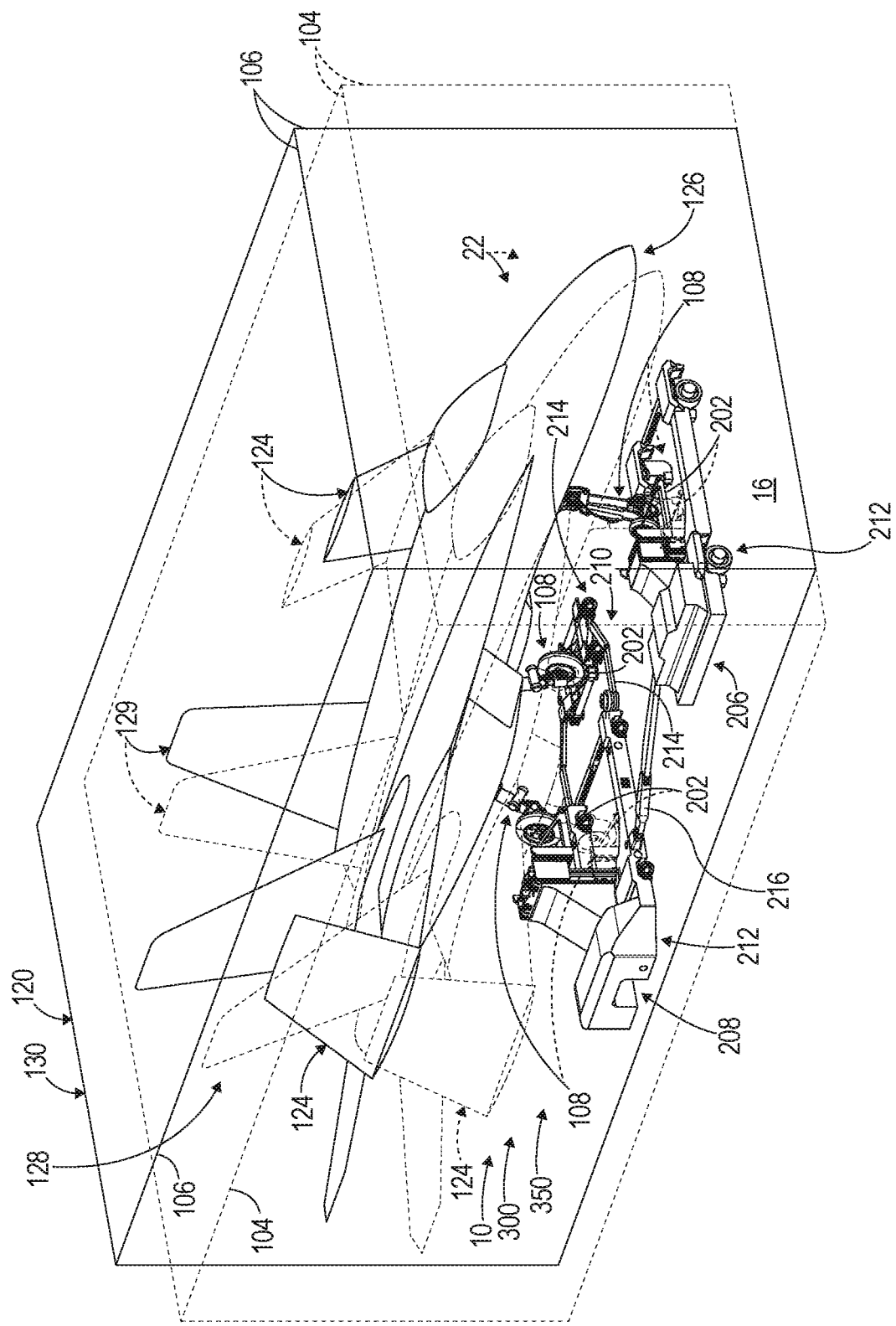
FIG. 6 is an isometric view illustrating an example aircraft handler supporting an aircraft, according to the present disclosure.
Figure 7:
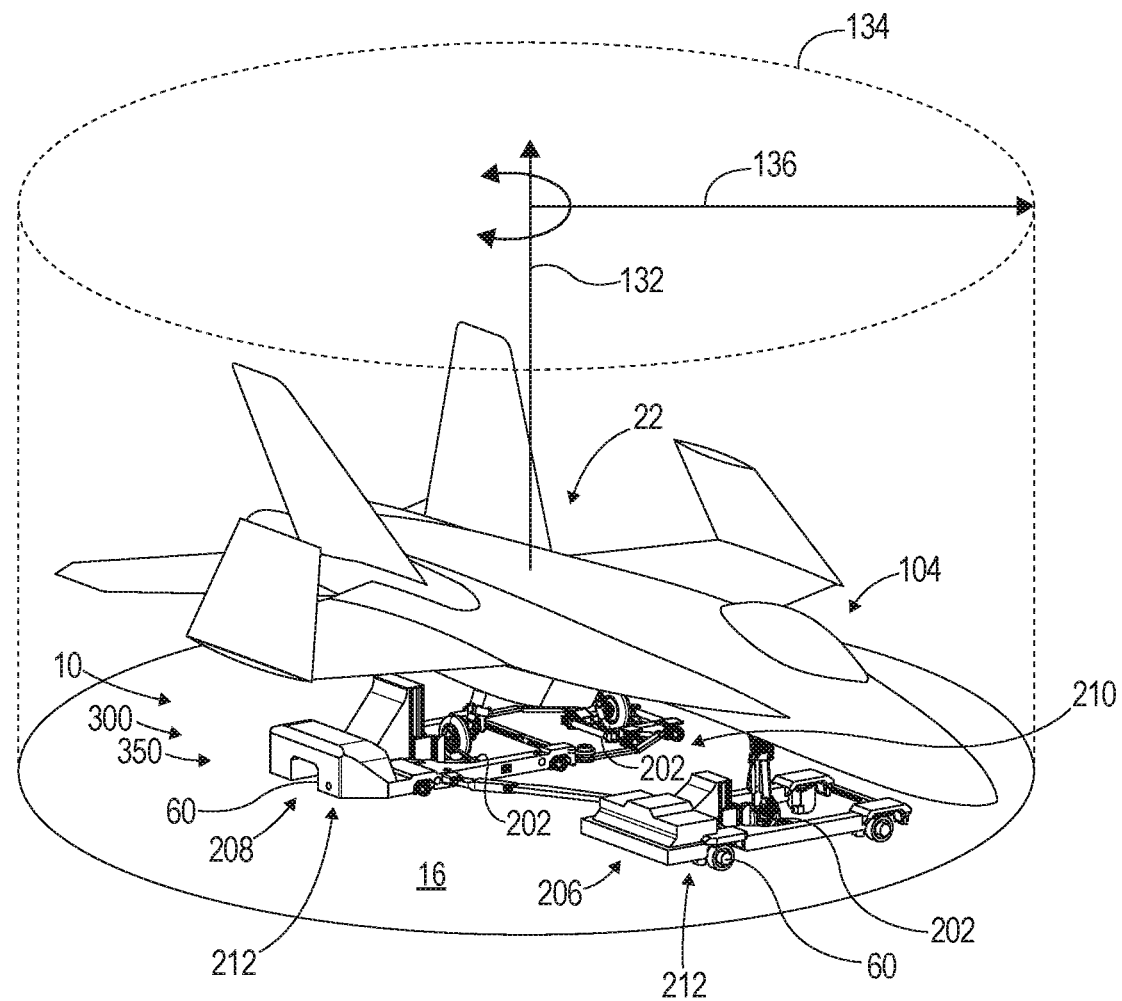
FIG. 7 is another isometric view illustrating the example aircraft handler of FIG. 6 supporting an aircraft.
Figure 8:
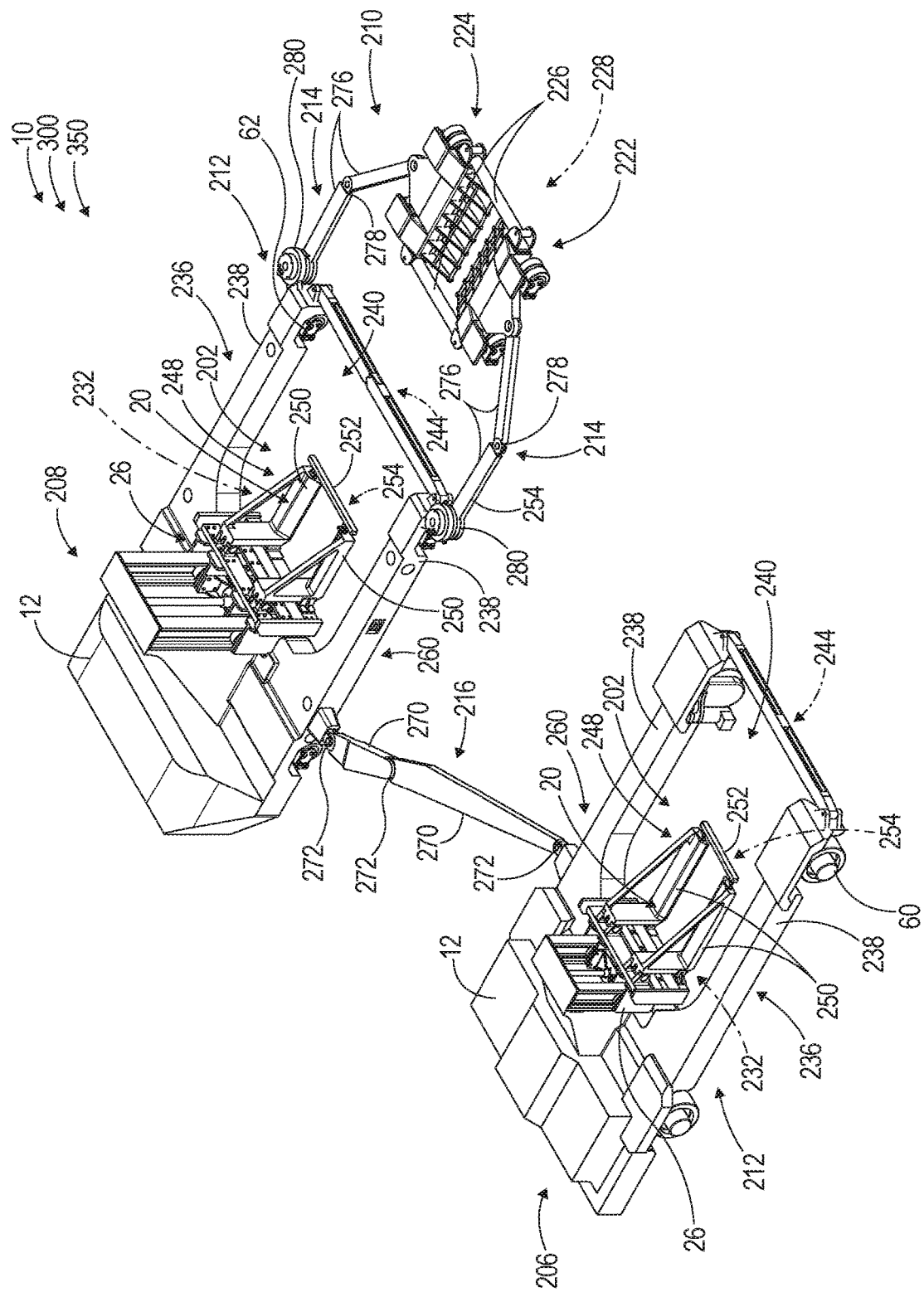
FIG. 8 is an isometric view of the example aircraft handler of FIG. 6.
Figure 9:
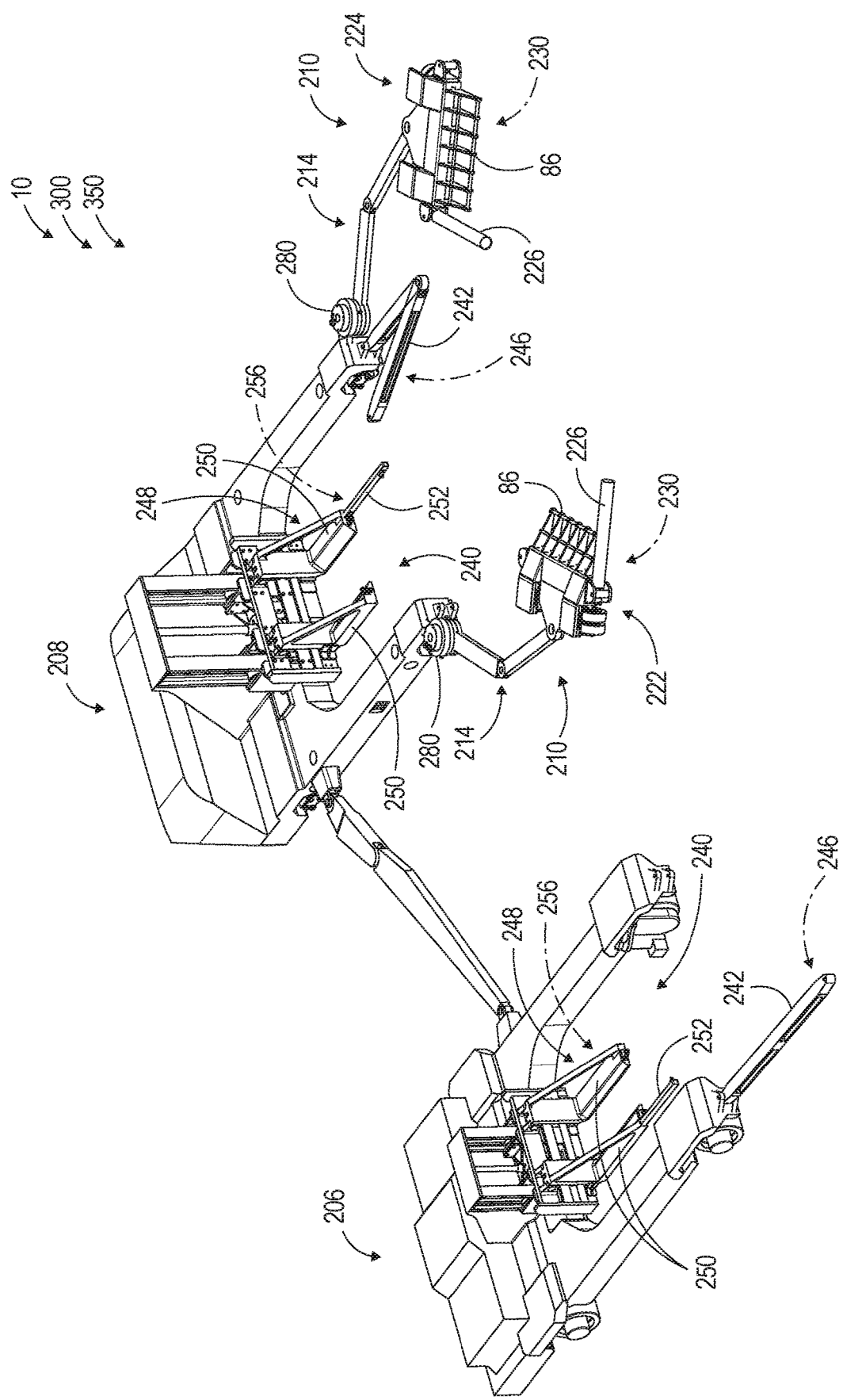
FIG. 9 is another isometric view of the example aircraft handler of FIG. 6.
Figure 10:
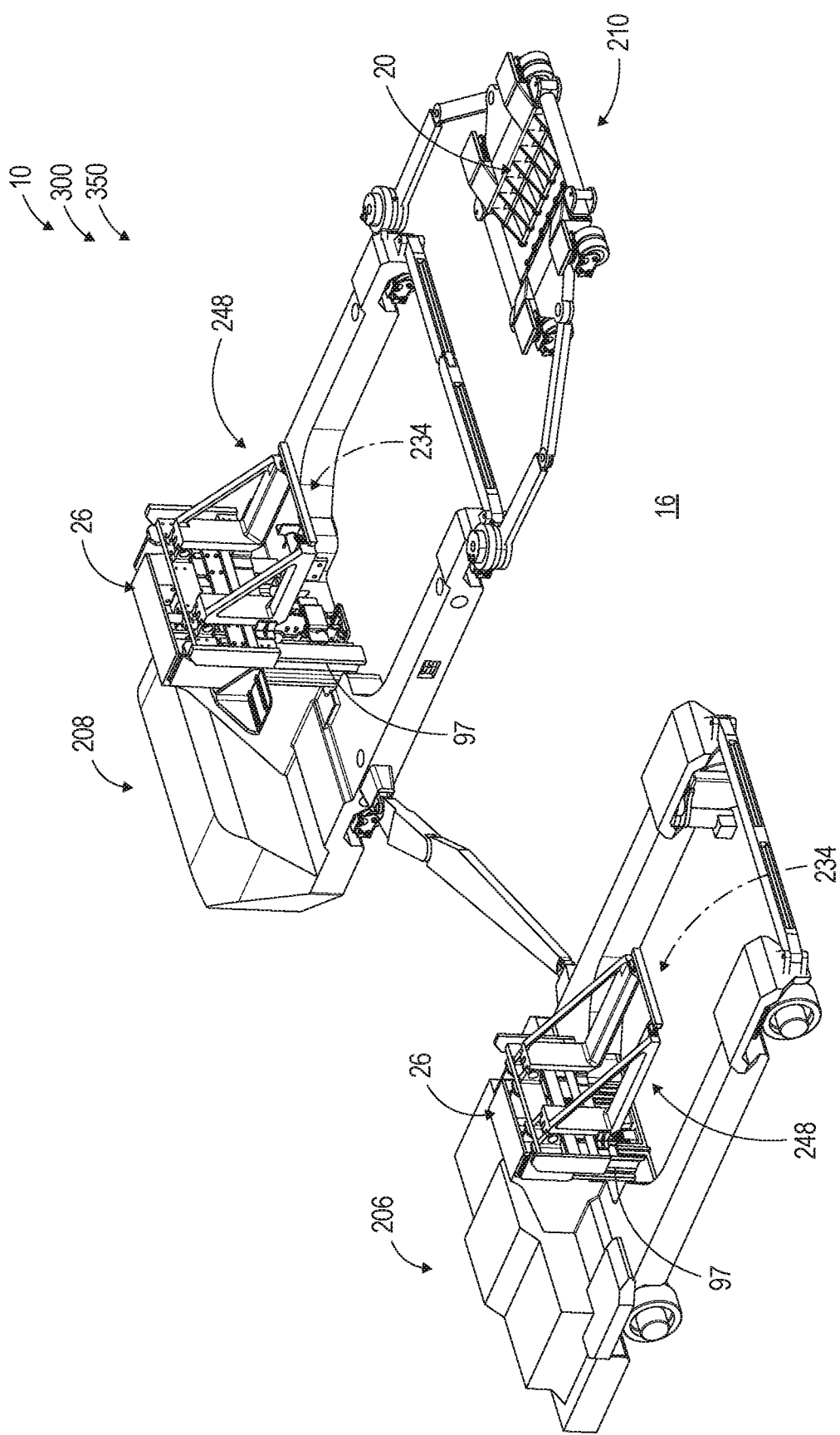
FIG. 10 is another isometric view of the example aircraft handler of FIG. 6.

FIGS. 6-10 provide an illustrative, non-exclusive example of aircraft handlers 300 that is indicated at and referred to herein as aircraft handler 350. In particular, FIGS. 6-7 illustrate examples of aircraft handler 350 supporting an aircraft 22, and FIGS. 8-10 illustrate various configurations of example aircraft handler 350. Where appropriate, the reference numerals from the schematic illustrations of FIGS. 1-3 are used to designate corresponding parts of the example aircraft handler 350 of FIGS. 6-10; however, aircraft handler 350 is non-exclusive and does not limit aircraft handlers 300 to the illustrated embodiments of FIGS. 6-10. That is, aircraft handlers 300 are not limited to the specific embodiment of FIGS. 6-10, and aircraft handlers 300 may incorporate any number of the various aspects, configurations, characteristics, properties, variants, options etc. of aircraft handlers 300 that are illustrated in and discussed with reference to the schematic representations of FIGS. 2-3 and/or the embodiment of FIGS. 6-10, as well as variations thereof, without requiring the inclusion of all such aspects, configurations, characteristics, properties, variants, options etc. Furthermore, any additional aspects, configurations, characteristics, properties, variants, options, etc. disclosed in connection with the example aircraft handler 300 of FIGS. 6-10 may be utilized with and/or otherwise included in other aircraft handlers 300, including aircraft handlers 300 according to FIGS. 2-3. For the purpose of brevity, each previously discussed component, part, portion, aspect, region, etc. or variants thereof may not be discussed, illustrated, and/or labeled again with respect to the examples of FIGS. 6-10; however, it is within the scope of the present disclosure that the previously discussed features, variants, etc. may be utilized with the examples of FIGS. 6-10.

With initial reference to FIG. 6, aircraft handler 350 is illustrated supporting aircraft 22 in level aircraft orientation 104 and among tilted aircraft orientations 106. In particular, aircraft 22, an envelope 120 defined by aircraft 22, and support members 202 of front undercarriage support assembly 206 and rear undercarriage support assembly 208 are illustrated in dashed lines when aircraft handler 350 supports aircraft 22 in level aircraft orientation 104. Aircraft 22, envelope 120, and support members 202 of front undercarriage support assembly 206 and rear undercarriage support assembly 208 are illustrated in solid lines when aircraft handler 350 supports aircraft 22 among tilted aircraft orientations 106.

As shown in FIG. 6, example aircraft handler 350 includes front undercarriage support assembly 206, rear undercarriage support assembly 208, and distal undercarriage support assembly 210. Distal undercarriage support assembly 210 is operably coupled to rear undercarriage support assembly 208 via connecting arms 214, and connecting member 216 operably couples front undercarriage support assembly 206 to rear undercarriage support assembly 208. Support member 202 of each undercarriage support assembly 200 operably engages and supports a respective portion of undercarriage 108 spaced above or apart from ground surface 16. More specifically, support member 202 of rear undercarriage support assembly 208 supports a first rear wheel assembly of undercarriage 108, and support member 202 supports a second rear wheel assembly of undercarriage 108 that is laterally spaced apart from the first wheel assembly. Support member 202 of front undercarriage support assembly 206 supports a front wheel assembly of undercarriage 108 that is spaced apart from the rear wheel assemblies along a longitudinal axis of aircraft 22, and positioned laterally between the rear wheel assemblies. Connecting member 216 supports front undercarriage support assembly 206 offset and laterally spaced apart from rear undercarriage support assembly 208 such that support member 202 of front undercarriage support assembly 206 is positioned to support the front wheel assembly.

Thus, in these examples, aircraft handler 350 supports or suspends the entire undercarriage 108 of aircraft 22 spaced above or spaced apart from ground surface 16. Front undercarriage support assembly 206 comprises front drive assembly 212 that supports front undercarriage support assembly 206 on ground surface 16, rear undercarriage support assembly 208 comprises rear drive assembly 212 that supports rear undercarriage support assembly 208 on ground surface 16, and distal undercarriage support assembly 210 is supported on ground surface 16 by the respective translation assembly 204.

As shown in FIG. 6, the envelopes 120 occupied or defined by aircraft 22 in level aircraft orientation 104 and in tilted aircraft orientations 106 may be described herein as rectangular prisms that encompass aircraft 22. More specifically, the bottom side or base of the rectangular prisms are defined by ground surface 16 and each other side of the rectangular prism has a point that contacts, abuts, or is defined by a maximal extent of aircraft 22 in that particular direction. In the specific example represented in FIG. 6, aircraft 22 is a fixed wing aircraft and the maximal extent of the wings 124 of aircraft 22, the fore-most point 126 of aircraft 22, and the aft-most point 128 of aircraft 22 abut, contact, or define the four vertical sides of the rectangular prisms of envelopes 120. The top side or upper side of the rectangular prisms of envelopes 120 may abut, contact, or be defined by the highest waterline or highest vertical extent of aircraft 22, such as the empennage 129 shown in the specific example of FIG. 6. The bottom side or base of the rectangular prisms of envelopes 120 may abut, contact, or be defined by the ground contact points of undercarriage 108 of aircraft 22 when aircraft 22 is supported directly on ground surface 16. When aircraft 22 is supported by aircraft handler 350, the base of the rectangular prism and abuts, contacts, or is defined by drive assembly 212 and translation assemblies 204 of aircraft handler 350.

The width of each envelope 120 is defined by the distance between the opposing sides or surfaces of the rectangular prism that abut, contact, or are defined by the maximal extent of wings 124. In the specific example of FIG. 6, aircraft 22 includes wingtips that are configured to fold upwardly, such as to reduce the width of envelope 120. However, this is not a requirement of the present disclosure. The height of envelopes 120 is defined by the distance between the top and bottom sides or surfaces of the rectangular prisms, and the length of envelopes 120 may be defined as the distance between the opposing sides or surfaces of the rectangular prisms that abut, contact, or are defined by the fore-most point 126 and aft-most point 128 of aircraft 22.

As shown in the example of FIG. 6, aircraft handler 350 is configured to fit completely within envelope 120 of aircraft 22 when aircraft handler 350 supports aircraft 22 in level aircraft orientation 104 and/or among tilted aircraft orientations 106. Stated differently, in some examples, aircraft handler 350 is configured to support aircraft 22 without extending beyond, or expanding, the four sidewalls of the rectangular prism of envelope 120 and/or extending above the upper side or surface of the rectangular prism of envelope 120. In this way, aircraft handler 10 may support aircraft 22 without increasing the width or length of envelope 120.

As shown in dashed lines in FIG. 6, envelope 120 of aircraft 22 in level aircraft orientation 104 comprises different dimensions than envelope 120 of aircraft 22 among tilted aircraft orientations 106. In other words, aircraft handler 350 may be described as being configured to selectively alter the dimensions of envelope 120 by selectively tilting aircraft 22 between level aircraft orientation 104 and tilted aircraft orientations 106. More specifically, as shown in the example of FIG. 6, when aircraft handler 350 supports aircraft 22 in level aircraft orientation 104, or when aircraft 22 is supported on ground surface 16, wings 124 of aircraft 22 extend generally horizontally or generally parallel to ground surface 16. When aircraft handler 350 tilts aircraft 22 or supports aircraft 22 among tilted aircraft orientations 106, wings 124 of aircraft 22 are tilted relative to ground surface 16. In this way, aircraft handler 10 orients wings 124 to extend upwardly or partially traverse relative to ground surface 16 or level aircraft orientation 104, such that the projection of wings 124 onto ground surface 16 is smaller when aircraft handler 10 tilts aircraft 22 among tilted aircraft orientations 106. Consequently, as shown in the example of FIG. 6, envelope 120, and/or the width thereof, of aircraft 22 in tilted aircraft orientations 106 is smaller or narrower than envelope 120, and/or the width thereof, of aircraft 22 in level aircraft orientation 104. Stated differently, when aircraft handler 350 tilts, supports, or orients aircraft 22 among tilted aircraft orientations 106, the width of envelope 120 is smaller or narrower than the width of envelope 120 of aircraft 22 in level aircraft orientation 104 and/or when aircraft 22 is supported directly on ground surface 16. Stated another way, in some examples, aircraft handler 350 is configured to reduce the width of envelope 120 of aircraft 22 by tilting aircraft 22 to among tilted aircraft orientations 106. Stated yet another way, in some examples, aircraft handler 350 is configured to reduce the footprint of aircraft 22, or floor space occupied by aircraft 22, by tilting aircraft 22 to among tilted aircraft orientations 106. As more specific examples, aircraft handler 350 may be configured to tilt aircraft 22 to among tilted aircraft orientations 106 to reduce the width of envelope 120 of aircraft 22 by at least 0.5%, at least 1%, at least 2%, at least 3%, at most 6%, and/or at most 10% the width of envelope 120 of aircraft 22 in level aircraft orientation 104 or supported directly on ground surface 16.

In some examples, aircraft handler 350 is configured to tilt aircraft 22 to fit aircraft 22 within a defined volume 130, an external volume 130, or a confined volume 130, that is smaller or narrower than envelope 120 of aircraft 22 in level aircraft orientation 104 and/or envelope 120 of aircraft 22 supported directly on ground surface 16. Stated differently, aircraft handler 350 may be configured to fit aircraft 22 to within defined volume 130 that aircraft 22, or envelope 120 of aircraft 22, cannot fit within defined volume 130 when aircraft 22 is oriented in level aircraft orientation 104 and/or when aircraft 22 is supported on ground surface 16. More specifically, in some examples, aircraft handler 350 is configured to tilt aircraft 22 to among tilted aircraft orientations 106 to fit aircraft 22 within defined volume 130 having a width that is smaller than the width of envelope 120 of aircraft 22 in level aircraft orientation 104 and/or the envelope 120 of aircraft 22 directly supported on ground surface 16.

As discussed herein, in some examples, aircraft handler 350 is configured to move aircraft 22 while supporting aircraft 22 among tilted aircraft orientations 106. As such, in some examples, aircraft handler 350 is configured to move aircraft 22 to within, and from within, defined volume 130 that is smaller than envelope 120 of aircraft 22 in level aircraft orientation 106 and/or envelope 120 of aircraft 22 supported on ground surface 16. As examples, aircraft handler 350 may be configured to fit aircraft 22 within, and/or move aircraft 22 to within, or from within, a defined volume 130 that is defined by a rectangular space that is surrounded by six walls, the internal space of a building, the internal space of a shipping container, the internal space of an elevator, and/or the internal space of an aircraft hangar.

As another example, aircraft handler 350 may be configured to fit aircraft 22 within a parking space having an defined volume 130, and/or a width thereof, that is smaller than envelope 120 of aircraft 22, or width thereof, of aircraft 22 in level aircraft orientation 104 or supported on ground surface 16. In some examples, defined volume 130 of the parking space is defined by adjacently parked aircraft and/or one or more access lanes surrounding the parking space. In some examples, aircraft handler 350 is configured to park aircraft 22 in the parking space while orienting aircraft 22 among tilted aircraft orientations 106 such that wings 124 of aircraft 22 overlap or extend above and below the wings of adjacently parked aircraft. In this way, aircraft handler 350 may be configured to park aircraft 22 with envelope 120 of aircraft 22 extending beyond defined volume 130 of the parking space and overlapping with the envelopes of adjacently parked aircraft, such as to permit more aircraft to be parked within a given area.

In some examples, when aircraft handler 350 tilts or supports aircraft 22 among tilted aircraft orientations 106, an aircraft tilt angle is formed between a line extending between the wing tips of, or the maximal extents of, wings 124 and the ground surface 16. Stated another way, in some examples, aircraft handler 350 is configured to tilt aircraft 22 to among a plurality of aircraft tilt angles relative to level aircraft orientation 104, in which the plurality of aircraft tilt angles may be from −5° to 25°. In some examples, the aircraft tilt angle corresponds to the tilt angle of support arms 18.

While FIG. 3 illustrates an example in which aircraft 22 is a fixed wing aircraft, aircraft handler 350 also may be configured to support, tilt, and alter the dimensions of the envelope of other types of aircraft, with examples including rotorcraft and/or helicopters. In some examples, the width of the envelope of a helicopter is defined by the diameter of, or a rectangle surrounding, the blades of the helicopter. In such examples, aircraft handler 350 may be configured to tilt the helicopter with the blades of the helicopter tilted relative to ground surface 16 and/or relative to the horizontal or level positon of the helicopter to reduce the width or size of the envelope of the helicopter, such as discussed herein.

Turning to FIG. 7, illustrated therein is an example in which aircraft handler 350 is configured to rotate aircraft 22. As discussed herein with reference to FIG. 3, support member 202 of front undercarriage support assembly 206 supports the front wheel assembly of undercarriage 108, support member 202 of rear undercarriage support assembly 208 supports the first rear wheel assembly of undercarriage 108, and support member 202 of distal undercarriage support assembly 210 supports the second wheel assembly of undercarriage 108. In this way, aircraft handler 350 supports or suspends the entire undercarriage of aircraft 22 spaced apart from ground surface 16. More specifically, aircraft handler 350 supports or suspends aircraft 22 spaced above ground surface 16 while being positioned completely within the envelope of aircraft 22.

As illustrated in FIG. 7, aircraft handler 350 is configured to rotate aircraft 22 about a yaw axis 132 of aircraft 22. In other words, in some examples, aircraft handler 350 is configured to rotate aircraft 22 without moving yaw axis 132 of aircraft 22 along ground surface 16. Stated another way, in some examples, aircraft handler 350 is configured to rotate aircraft 22 within a cylindrical volume 134, in which the radius 136 of the cylindrical volume 134 is a threshold fraction of a distance between yaw axis 132 and a maximum extent 122 of aircraft 22 from yaw axis 132. As examples, radius 136 may be at least 100%, at most 110%, at most 120%, and/or at most 130% of the distance between yaw axis 132 and the maximum extent 122 of aircraft 22 from yaw axis 132. As, in some examples, aircraft handler 350 is configured to fit completely within the envelope 120 of aircraft 22, aircraft handler 350 also may be configured to rotate aircraft 22 while aircraft handler 350 remains completely within cylindrical volume 134. In view of the above, aircraft handler 350 may be configured to rotate aircraft 22 with aircraft handler 350 and aircraft 22 requiring a minimal volume within which to rotate, which may be beneficial to relocating aircraft 22 within crowded or confined spaces. Additionally, while FIG. 7 illustrates an example in which aircraft handler 350 is configured to rotate aircraft 22 in level aircraft orientation 104, aircraft handler 350 also may be configured to rotate aircraft 22 while aircraft handler 350 supports aircraft among tilted aircraft orientations 106.

Aircraft handler 350 may be configured to rotate aircraft 22 in any suitable direction of rotation, such as a clockwise rotation and/or a counter-clockwise rotation, and through any suitable angle of rotation, such as through 10°, through 30°, through 90°, through 180° and/or through 360°, such as while aircraft 22 and/or aircraft handler 350 remains within cylindrical volume 134. In some examples, drive assembly 212 of front undercarriage support assembly 206 and/or drive assembly 212 of rear undercarriage support assembly 208 are utilized to rotate aircraft 22. In some such examples, one or more driven wheels 60 of drive assembly 212 are configured to selectively pivot to a particular pivot angle and provide motive force along the pivot angle to rotate aircraft handler 350 and aircraft 22 about ground surface 16.

FIGS. 8-10 are isometric views of example aircraft handler 350 with FIGS. 8-10 each showing various components of aircraft handler 350 in different configurations. In particular, FIG. 8 illustrates an example of aircraft handler 350 in a configuration to support aircraft 22 in level aircraft orientation 104, FIG. 9 illustrates an example of aircraft handler 350 in a configuration to translate laterally beneath aircraft 22 to be operably positioned to support aircraft 22, and FIG. 10 illustrates an example of aircraft handler 350 in a configuration to support aircraft 22 among tilted aircraft orientations 106.

With initial reference to FIG. 8, front undercarriage support assembly 206 and rear undercarriage support assembly 208 are operably interconnected with one another via connecting member 216. Connecting member 216 comprises a pair of sections 270 that are operably coupled to one another via articulated connection 272. Connecting member 216 also includes two additional articulated connections 272 that are configured to hingedly couple sections 270 to front undercarriage support assembly 206 and rear undercarriage support assembly 208. Front undercarriage support assembly 206 and rear undercarriage support assembly 208 are offset from one another such that connecting member 216 extends from articulated connections 272 at an off-normal angle relative to first side 260 of front undercarriage support assembly 206 and first side 260 of rear undercarriage support assembly 208. In the example shown in FIG. 8, connecting member 216 selectively secures front undercarriage support assembly 206 and rear undercarriage support assembly 208 offset from one another by selectively retaining articulated connections 272 in the illustrated pivot angles. In some examples, each articulated connection 272 comprises a corresponding actuator that is configured to selectively permit and restrict pivotal movement about articulated connection 272.

In some examples, the articulated connection 272 that interconnects sections 270 is configured to selectively permit sections 270 to fold relative another, thereby allowing first side 260 of front undercarriage support assembly 206 to be positioned closer to first side 260 of rear undercarriage support assembly 208. In some examples, articulated connection 272 that interconnects sections 270 is configured to selectively permit sections 270 to fold relative another to permit aircraft handler 350 to transition from the deployed configuration illustrated in FIG. 8 to the stowed configuration, in which aircraft handler 350 occupies a smaller footprint, as discussed herein.

With continued reference to FIG. 8, front undercarriage support assembly 206 and rear undercarriage support assembly 208 each include a respective lift mechanism 26. Front undercarriage support assembly 206 and rear undercarriage support assembly 208 each also include a respective fork assembly 248 that is operably coupled to the respective body 12 via lift mechanism 26. Each lift mechanism 26 is configured to move the respective fork assembly 248 relative to ground surface 16, such as to tilt aircraft 22 as discussed herein with reference to FIG. 6. In FIG. 8, lift mechanism 26 positons the respective fork assembly 248 in lowered position 232. Each fork assembly 248 comprises a pair of prongs 250 that at least partially define the respective support region 20, and a respective prong gate 252. In FIG. 8, both prong gates 252 are in prong gate closed configuration 254 and extend between and interconnect the distal ends of the respective prongs 250.

Front undercarriage support assembly 206 and rear undercarriage support assembly 208 each further include a respective ground support chassis 236, which includes pair of projections 238 defining open region 240 therebetween. Both fork assemblies 248 are positioned laterally within the respective open regions 240, such that projections 238 may enhance load distribution of the weight of the aircraft from fork assemblies 248 across ground surface 16. Each projection 238 is supported on ground surface 16 by a portion of drive assembly 212 and/or translation assembly 204, such as one or more driven wheels 60 and/or non-driven wheels 62. Front undercarriage support assembly 206 further comprises gate 242 that is shown in FIG. 8 in closed configuration 244, in which gate 242 is operably coupled to, and interconnects the distal ends of projections 238. Similarly, rear undercarriage support assembly 208 further comprises gate 242 that is shown in FIG. 8 in closed configuration 244.

As mentioned, distal undercarriage support assembly 210 is operably coupled to rear undercarriage support assembly 208 via connecting arms 214. In particular, each connecting arm 214 is coupled to a projection 238 of rear undercarriage support assembly 208 via a respective connecting arm actuator 280 such that connecting arms 214 extend from projections 238 laterally spaced apart from one another. Distal undercarriage support assembly 210 comprises first portion 222 and second portion 224 that are operably coupled to rear undercarriage support assembly 208 by separate connecting arms 214. Distal undercarriage support assembly 210 further comprises distal coupling mechanism 226, which in FIG. 8, operably interconnects first portion 222 and second portion 224 with one another. Stated differently, in FIG. 8, distal coupling mechanism 226 supports first portion 222 and second portion 224 in supporting configuration 228.

Also shown in FIG. 8, in some examples, each connecting arm 214 comprises two articulated portions 276 that are interconnected with one another via a connecting arm articulated connection 278. In some examples, connecting arm articulated connections 278 are configured to permit articulated portions 276 to fold relative to one another to permit distal undercarriage support assembly 210 to move towards rear undercarriage support assembly 208. In some examples, distal undercarriage support assembly 210 is moved from the position shown in FIG. 8 towards rear undercarriage support assembly 208, and optionally at least partially within open region 240 to transition aircraft handler 350 from the deployed configuration shown in FIG. 8 to the stowed configuration discussed herein.

FIG. 9 illustrates various components of aircraft handler 350 transitioned from the configurations shown in FIG. 8. More specifically, in FIG. 9, prong gates 252 are transitioned to the prong gate open configuration 256, in which prong gate 252 is pivoted outwardly and is operably coupled to only one prong 250. In prong gate open configuration 256, prong gate 252 provides access to the lateral spacing between prongs 250, such that each fork assembly 248 may be translated beneath the respective portion of the undercarriage of the aircraft. Similarly, each gate 242 is transitioned from the closed configuration of FIG. 8 to open configuration 246. In open configuration 246, gates 242 provide access to open regions 240, such that front undercarriage support assembly 206 and rear undercarriage support assembly 208 are configured to translate laterally beneath the respective portions of the undercarriage of the aircraft.

Likewise, distal undercarriage support assembly 210 is transitioned from the supporting configuration of FIG. 8 to positioning configuration 230. In positioning configuration 230, distal coupling mechanism 226 disengages first portion 222 and second portion 224 from one another and connecting arm actuators 280 have pivoted connecting arms 214 together with the respective portions away from one another. In this way, distal undercarriage support assembly 210 is configured to provide access to open region 240 of rear undercarriage support assembly 208 and may be translated laterally beneath the first aft portion and the second aft portion of the undercarriage of the aircraft during operable positioning of aircraft handler 350.

In some examples, distal undercarriage support assembly 210 is configured to lift the second aft portion of the undercarriage of the aircraft from direct contact with ground surface 16 by transitioning from positioning configuration 230 of FIG. 9 to supporting configuration 228 of FIG. 8. More specifically, in some examples, connecting arm actuators 280 are configured to pivot first portion 222 and second portion 224 towards one another once distal undercarriage support assembly 210 is positioned beneath or adjacent the second aft portion of the undercarriage of the aircraft in positioning configuration 230. In particular, connecting arm actuators 280 may move first portion 222 and second portion 224 to be in contact with opposing sides of the ground-contacting region of the second aft portion, such as either side of the second rear wheel assembly in the examples of FIG. 6. Once connecting arm actuators 280 bring first portion 222 and second portion 224 in proximity to one another, distal coupling mechanism 226 engages first portion 222 with second portion 224 with one another and pulls first portion 222 towards second portion 224 to reduce the lateral spacing therebetween. In this way, distal coupling mechanism 226 urges first portion 222 with second portion 224 beneath the ground-contacting region of the second aft portion of the undercarriage of the aircraft such that first portion 222, with second portion 224, lift the second aft portion of the undercarriage of the aircraft from contact with ground surface 16. As shown in FIGS. 8 and 9, in some examples, first portion 222 and second portion 224 each include a transition portion 86, such as ramp, that is configured to facilitate lifting of the second aft portion of the undercarriage of the aircraft from contact with ground surface 16.

FIG. 10 illustrates an example of aircraft handler 350 configured to support aircraft 22 among tilted aircraft orientations 106. As shown, each lift mechanism 26 comprises a pillar 97 along which lift mechanism 26 moves the respective fork assembly 248 relative to ground surface 16. In FIG. 10, lift mechanisms 26 have transitioned fork assemblies 248 from the lowered positions 232 of FIG. 8, and support fork assemblies 248 spaced above ground surface 16 in raised positions 234. In particular, fork assembly 248 of front undercarriage support assembly 206 and fork assembly 248 of rear undercarriage support assembly 208 each are positioned further above ground surface 16 than support region 20 of distal undercarriage support assembly 210. Thus, when aircraft handler 350 supports the undercarriage 108 of aircraft 22 in this configuration, front undercarriage support assembly 206 and rear undercarriage support assembly 208 support the respective portions of the undercarriage 108 spaced further above ground surface 16 than does distal undercarriage support assembly 210 such that aircraft handler 350 tilts aircraft 22. In some examples, lift mechanism 26 of rear undercarriage support assembly 208 is configured to support the respective fork assembly 248 spaced further above ground surface 16 than does lift mechanism 26 of front undercarriage support assembly 206. In such examples, aircraft handler 350 is configured to support the second aft portion of undercarriage 108 aircraft 22 spaced further above ground surface 16 than the forward portion of undercarriage 108 when aircraft handler 350 tilts aircraft 22 such as shown in FIG. 6.

Figure 11:
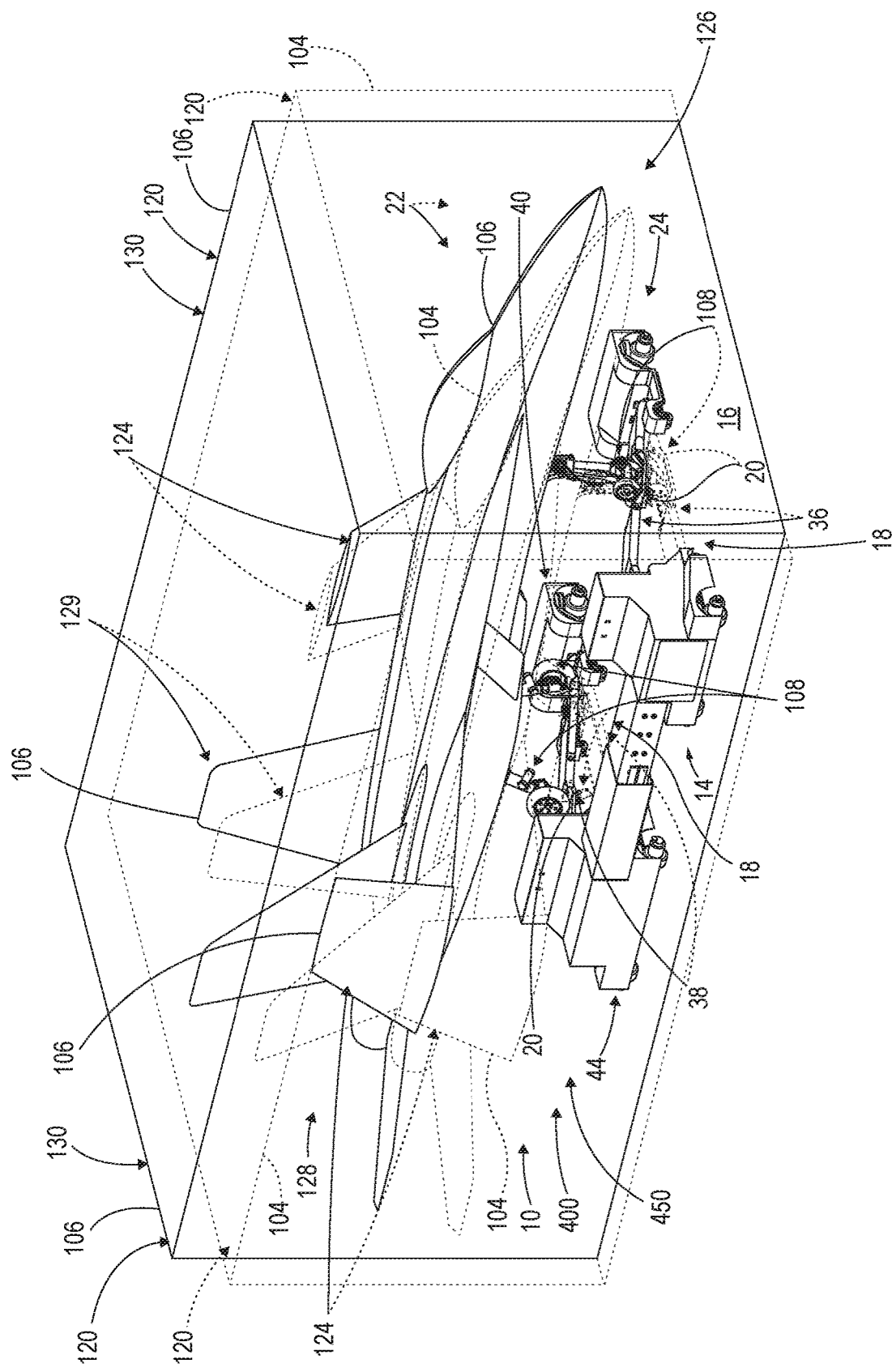
FIG. 11 is an isometric view showing another example aircraft handler supporting an aircraft, according to the present disclosure.
Figure 12:
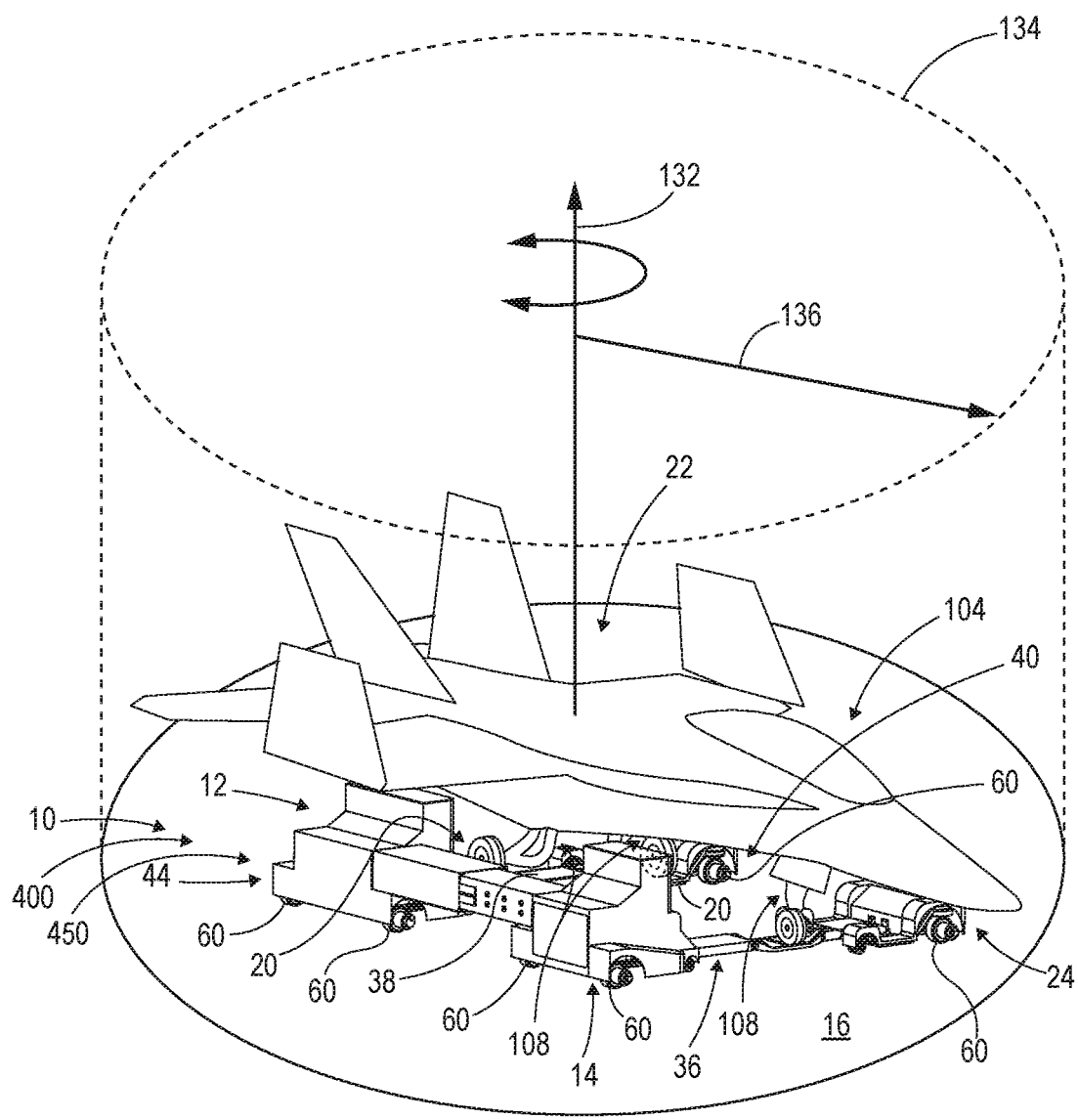
FIG. 12 is another isometric view of the example aircraft handler of FIG. 11 supporting an aircraft.

FIGS. 11-16 provide an illustrative, non-exclusive example of aircraft handlers 400 that is indicated at and referred to herein as aircraft handler 450. In particular, FIGS. 11-12 illustrate examples of aircraft handler 450 supporting an aircraft 22, and FIGS. 13-16 illustrate various configurations of example aircraft handler 450. Where appropriate, the reference numerals from the schematic illustrations of FIGS. 1 and 4-5 are used to designate corresponding parts of the example aircraft handler 450 of FIGS. 11-16; however, aircraft handler 450 is non-exclusive and does not limit aircraft handlers 400 to the illustrated embodiments of FIGS. 11-16. That is, aircraft handlers 400 are not limited to the specific embodiment of FIGS. 11-16, and aircraft handlers 400 may incorporate any number of the various aspects, configurations, characteristics, properties, variants, options etc. of aircraft handlers 400 that are illustrated in and discussed with reference to the schematic representations of FIGS. 1 and 4-5 and/or the embodiment of FIGS. 11-16, as well as variations thereof, without requiring the inclusion of all such aspects, configurations, characteristics, properties, variants, options etc. Furthermore, any additional aspects, configurations, characteristics, properties, variants, options, etc. disclosed in connection with the example aircraft handler 450 of FIGS. 11-16 may be utilized with and/or otherwise included in other aircraft handlers 400, including aircraft handlers 400 according to FIGS. 4-5. For the purpose of brevity, each previously discussed component, part, portion, aspect, region, etc. or variants thereof may not be discussed, illustrated, and/or labeled again with respect to the examples of FIGS. 11-16; however, it is within the scope of the present disclosure that the previously discussed features, variants, etc. may be utilized with the examples of FIGS. 11-16.

With initial reference to FIG. 11, aircraft handler 450 is illustrated as supporting aircraft 22 in level aircraft orientation 104 and among tilted aircraft orientations 106. Similarly to FIG. 6, aircraft 22, envelope 120 defined by aircraft 22, and support arms 18 of aircraft handler 450 are illustrated in dashed lines when aircraft handler 450 supports aircraft 22 in level aircraft orientation 104. Support arms 18 of aircraft handler 450, aircraft 22, and envelope 120 defined by aircraft 22 are illustrated in solid lines when aircraft handler 450 supports aircraft 22 among tilted aircraft orientations 106.

In the specific example shown in FIG. 11, aircraft handler 450 comprises first support arm 36 and second support arm 38 that are supporting discrete regions of undercarriage 108 of aircraft 22 spaced above or spaced apart from ground surface 16. In particular, first support arm 36 comprises support region 20 that supports the front wheel assembly of undercarriage 108 and second support arm 38 comprises a pair of support regions 20 that support the rear wheel assembly of undercarriage 108. As such, in this example, aircraft handler 450 supports or suspends the entirety of undercarriage 108 of aircraft 22 spaced above or spaced apart from ground surface 16. Aircraft handler 450 further comprises first drive assembly 14, second drive assembly 24, third drive assembly 40, and fourth drive assembly 44 that support aircraft handler 450 and aircraft 22 on ground surface 16, such as discussed herein.

Envelopes 120 illustrated in FIG. 11 may be defined similarly, or at least substantially similarly, to the envelopes 120 illustrated and discussed herein with reference to FIG. 6. As shown in FIG. 11, aircraft handler 450 is configured to fit completely within envelope 120 of aircraft 22 when aircraft handler 450 supports aircraft 22 in level aircraft orientation 104 and/or among tilted aircraft orientations 106. Stated differently, in some examples, aircraft handler 10 is configured to support aircraft 22 without extending beyond, or expanding, the four sidewalls of the rectangular prism of envelope 120 and/or extending above the upper side or surface of the rectangular prism of envelope 120. In this way, aircraft handler 450 may support aircraft 22 without increasing the width or length of envelope 120.

Similarly to that discussed herein with reference to FIG. 6, aircraft handler 450 may be described as being configured to selectively alter the dimensions of envelope 120 by selectively tilting aircraft 22 between level aircraft orientation 104 and tilted aircraft orientations 106. More specifically, as shown in the example of FIG. 11, when aircraft handler 450 supports aircraft 22 in level aircraft orientation 104, or when aircraft 22 is supported on ground surface 16, wings 124 of aircraft 22 extend generally horizontally or generally parallel to ground surface 16. When aircraft handler 450 tilts aircraft 22 or supports aircraft 22 among tilted aircraft orientations 106, wings 124 of aircraft 22 are tilted relative to ground surface 16. In this way, aircraft handler 10 orients wings 124 to extend upwardly or partially traverse relative to ground surface 16 or level aircraft orientation 104, such that the projection of wings 124 onto ground surface 16 is smaller when aircraft handler 450 tilts aircraft 22 among tilted aircraft orientations 106. Consequently, as shown in the example of FIG. 11, envelope 120, and/or the width thereof, of aircraft 22 in tilted aircraft orientations 106 is smaller or narrower than envelope 120, and/or the width thereof, of aircraft 22 in level aircraft orientation 104. As more specific examples, aircraft handler 450 may be configured to tilt aircraft 22 to among tilted aircraft orientations 106 to reduce the width of envelope 120 of aircraft 22 by at least 0.5%, at least 1%, at least 2%, at least 3%, at most 6%, and/or at most 10% the width of envelope 120 of aircraft 22 in level aircraft orientation 104 or supported directly on ground surface 16.

As discussed herein with reference to FIG. 6, in some examples, aircraft handler 450 is configured to tilt aircraft 22 to fit aircraft 22 within a defined volume 130, an external volume 130, or a confined volume 130, that is smaller or narrower than envelope 120 of aircraft 22 in level aircraft orientation 104 and/or envelope 120 of aircraft 22 supported directly on ground surface 16. Stated differently, aircraft handler 450 may be configured to fit aircraft 22 to within defined volume 130 that aircraft 22, or envelope 120 of aircraft 22, cannot fit within when aircraft 22 is oriented in level aircraft orientation 104 and/or when aircraft 22 is supported on ground surface 16. In some examples, aircraft handler 10 is configured to move aircraft 22 while supporting aircraft 22 among tilted aircraft orientations 106. As such, in some examples, aircraft handler 10 is configured to move aircraft 22 to within, and from within, defined volume 130 that is smaller than envelope 120 of aircraft 22 in level orientation and/or envelope 120 of aircraft 22 supported on ground surface 16.

In some examples, when aircraft handler 450 tilts or supports aircraft 22 among tilted aircraft orientations 106, an aircraft tilt angle is formed between a line extending between the wing tips of, or the maximal extents of, wings 124 and the ground surface 16. Stated another way, in some examples, aircraft handler 10 is configured to tilt aircraft 22 to among a plurality of aircraft tilt angles relative to level aircraft orientation 104, in which the plurality of aircraft tilt angles may be from −5° to 25°. In some examples, the aircraft tilt angle corresponds to the tilt angle of support arms 18.

While FIG. 11 illustrates an example in which aircraft 22 is a fixed wing aircraft, aircraft handler 450 also may be configured to support, tilt, and alter the dimensions of the envelope of other types of aircraft such as discussed herein with reference to FIG. 6.

Turning now to FIG. 12, illustrated therein is an example of aircraft handler 450 rotating aircraft 22 along ground surface 16. As shown, aircraft handler 450 supports undercarriage 108 of aircraft 22 spaced above ground surface 16 while being positioned completely within the envelope of aircraft 22. In some examples, aircraft handler 450 is configured to rotate aircraft 22 about yaw axis 132 of aircraft 22 without moving yaw axis 132 of aircraft 22 along ground surface 16. Stated another way, in some examples, aircraft handler 450 is configured to rotate aircraft 22 within a cylindrical volume 134, in which the radius 136 of the cylindrical volume 134 is a threshold fraction of a distance between yaw axis 132 and a maximum extent 122 of aircraft 22 from yaw axis 132. As examples, radius 136 may be at least 100%, at most 110%, at most 120%, and/or at most 130% of the distance between yaw axis 132 and the maximum extent 122 of aircraft 22 from yaw axis 132.

In some examples, aircraft handler 450 also is configured to rotate aircraft 22 while aircraft handler 450 remains completely within cylindrical volume 134. In view of the above, aircraft handler 450 may be configured to rotate aircraft 22 with aircraft handler 450 and aircraft 22 requiring a minimal volume within which to rotate, which may be beneficial to relocating aircraft 22 within crowded or confined spaces. Additionally, while FIG. 12 illustrates examples in which aircraft handler 450 is configured to rotate aircraft 22 in level aircraft orientation 104, aircraft handler 450 also may be configured to rotate aircraft 22 while aircraft handler 450 supports aircraft among tilted aircraft orientations 106.

Aircraft handler 450 may be configured to rotate aircraft 22 in any suitable direction of rotation and/or through any suitable angle, such as that discussed herein with reference to aircraft handler 350. In some examples, first drive assembly 14, second drive assembly 24, third drive assembly 40, and/or fourth drive assembly 44 are utilized to rotate aircraft 22. In some such examples, one or more driven wheels 60 of first drive assembly 14, second drive assembly 24, third drive assembly 40, and/or fourth drive assembly 44 are configured to selectively pivot to a particular pivot angle and provide motive force along the pivot angle to rotate aircraft handler 450 and aircraft 22 about ground surface 16.

Figure 13:
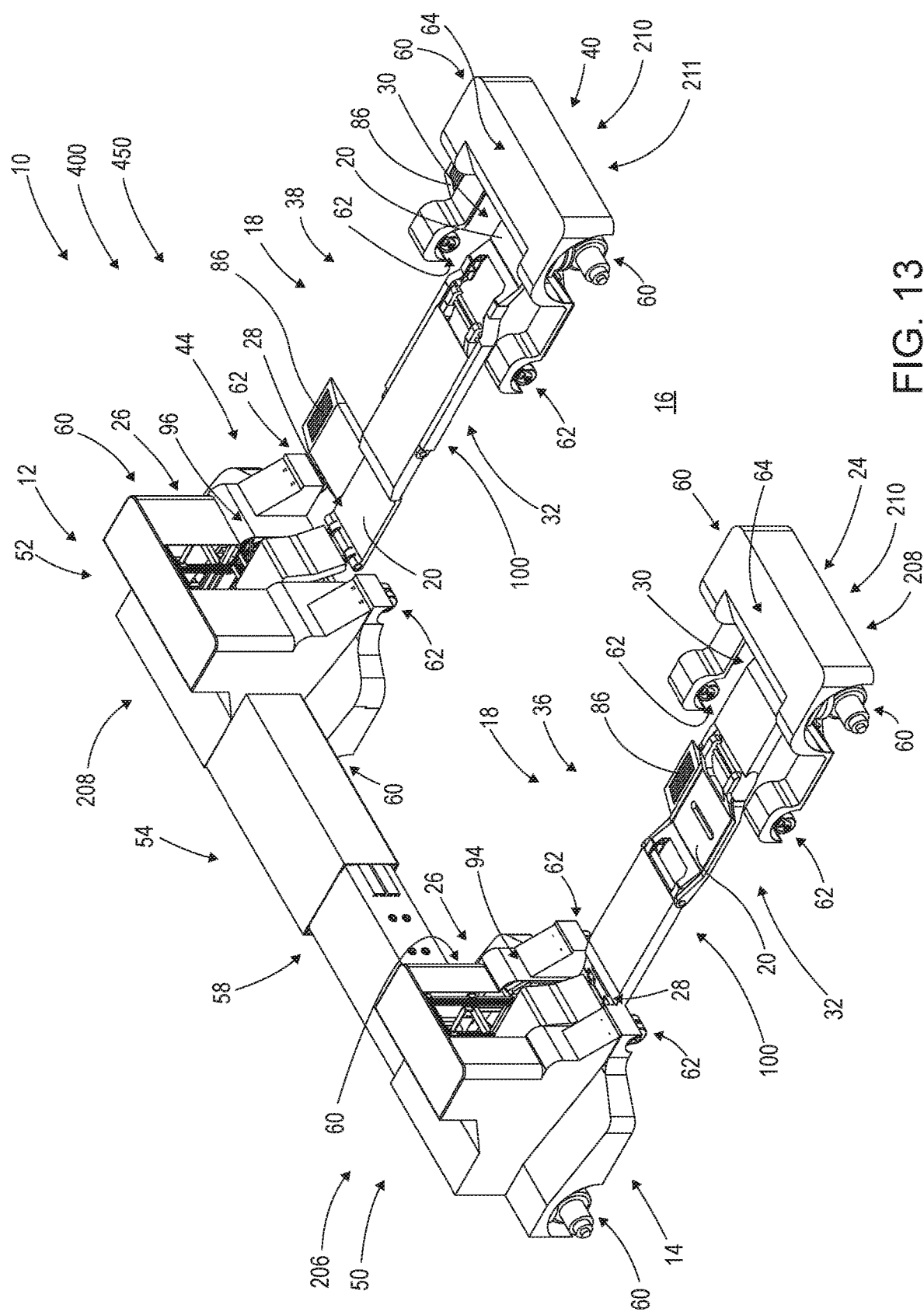
FIG. 13 is an isometric view of the example aircraft handler of FIG. 11 according to the present disclosure.

Now with reference to FIG. 13, aircraft handler 450 is illustrated in the deployed configuration with support arms 18 in deployed orientation 32. As shown, aircraft handler 450 comprises first support arm 36 and first lift mechanism 94, in which first lift mechanism 94 operably couples first support arm 36 to first body member 50 of front undercarriage support assembly 206 and orients first support arm 36 in level orientation 100. Aircraft handler 450 also comprises second support arm 38 and second lift mechanism 96, in which second lift mechanism 96 operably couples second support arm 38 to second body member 52 of rear undercarriage support assembly 208 and supports second support arm 38 in level orientation 100. Aircraft handler 450 comprises frame 54 that extends between first body member 50 of front undercarriage support assembly 206 and second body member 52 of rear undercarriage support assembly 208. Frame 54 supports first body member 50 and second body member 52 spaced apart along ground surface 16, such that first support arm 36 and second support arm 38 are spaced apart along ground surface 16. As shown, frame 54 includes telescoping mechanism 58 that is configured to telescope to adjust the spacing between first support arm 36 and second support arm 38.

With continued reference to FIG. 13, first support arm 36 includes a single support region 20 while second support arm 38 includes a pair of support regions 20 that are spaced apart along the length of second support arm 38. Support regions 20 form recessed platforms along support arms 18 and are positioned along support arms 18 to operably support discrete regions of the undercarriage of the aircraft. In particular, second support arm 38 includes a first support region 20 positioned proximate to, or that abuts, proximal end 28 and a second support region 20 that is positioned proximate to, or that abuts, distal end 30. Chassis 64 of first distal undercarriage support assembly 209 overlaps with distal ends 30 of first support arm 36, and chassis 64 of second distal undercarriage support assembly 211 overlaps with distal ends 30 of second support arm 38. In this way, the second support region 20 of second support arm 38 overlaps with chassis 64 of third drive assembly 40.

Aircraft handler 450 further comprises transition portions 86 that are positioned proximate, or coupled to, each support region 20, in which each transition portion 86 includes a ramp, or a wedge, that is inclined upwardly from ground surface 16 towards, or to, support region 20. In particular, the transition portion 86 leading to the second support region 20 of second support arm 38 may be operably coupled to chassis 64 of second distal undercarriage support assembly 211. Each other transition portion 86 is operably coupled to a support region 20. As shown, transition portions 86 are positioned on the same side of first support arm 36 as second support arm 38, such that transition portions 86 may facilitate lifting of the undercarriage of the aircraft onto first support arm 36 and second support arm 38 when first support arm 36 and second support arm 38 translate in the same direction laterally beneath the aircraft.

With continued reference to FIG. 13, first drive assembly 14, second drive assembly 24, third drive assembly 40, and fourth drive assembly 44 each include a pair of driven wheels 60 and a pair of non-driven wheels 62 that are operably coupled to chassis 64. In particular, non-driven wheels 62 are positioned inside of driven wheels 60, such that driven wheels 60 define the outside-most ground-contacting points of aircraft handler 450.

Figure 16:
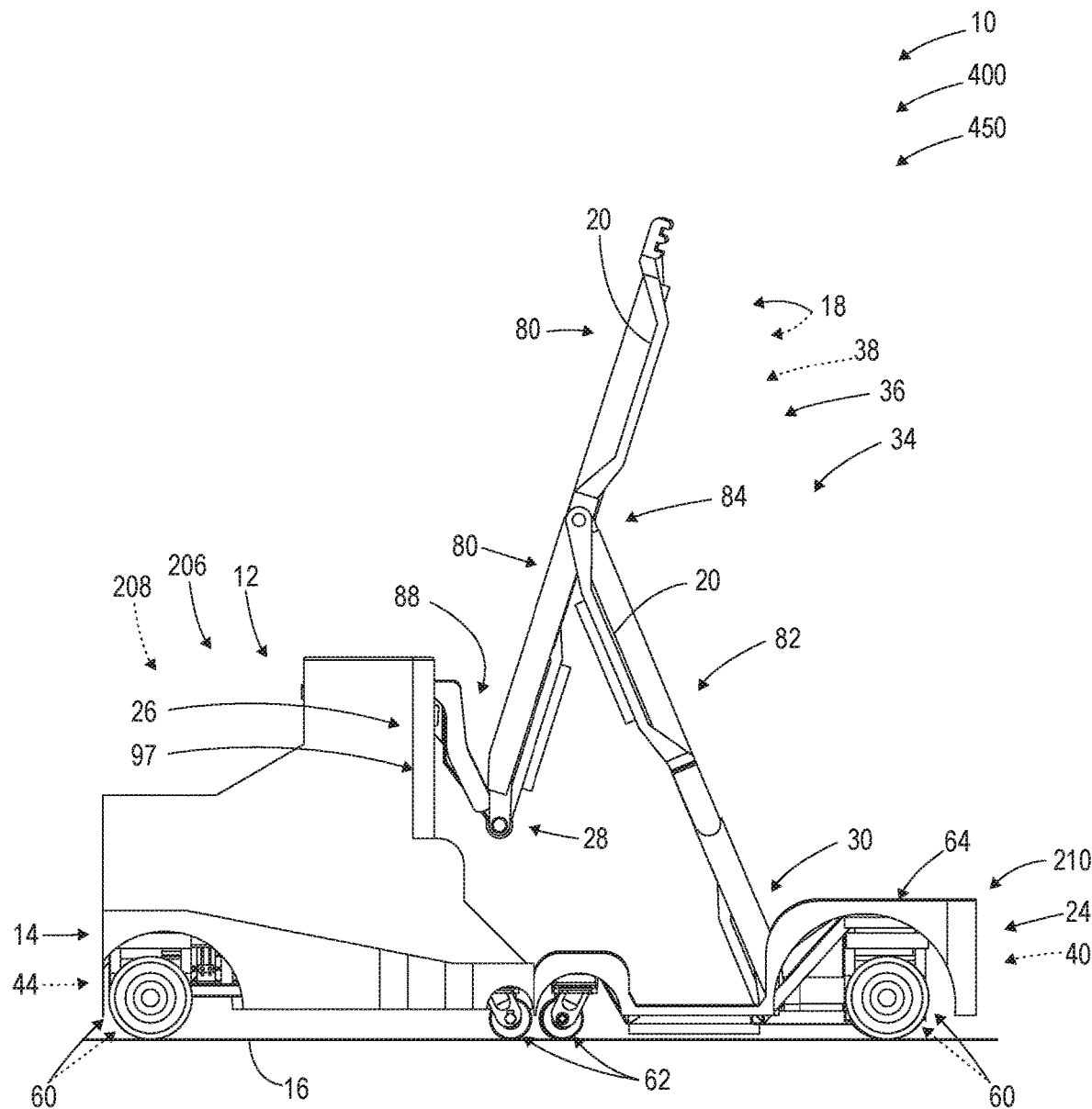
FIG. 16 is a side view illustrating the example aircraft handler of FIG. 11, with the support arms illustrated in a stowed orientation.

Turning to FIGS. 14-16, shown therein are side profile views of aircraft handler 450 showing examples in which support arms 18 have a deployed orientation 32 and a stowed orientation 34. In particular, FIGS. 14-15 illustrate aircraft handler 450 with support arms 18 in deployed orientation 32, while FIG. 16 illustrates aircraft handler 450 with support arms 18 in stowed orientation 34. FIGS. 14-16 are side profile views taken, or viewed, perpendicular to the length of support arms 18, such that only a single support arm 18, such as first support arm 36, is shown.

With initial reference to FIG. 14, aircraft handler 450 is illustrated with support arms 18 in level orientation 100. As shown, proximal end 28 of support arm 18 is operably coupled to body 12 of front undercarriage support assembly 206 via lift mechanism 26, and distal end 30 of support arm 18 is operably coupled to chassis 64 of distal undercarriage support assembly 210. Support arm 18 is oriented in level orientation 100 and extends parallel, or substantially parallel, to ground surface 16, with proximal end 28 and distal end 30 being level, or substantially level, with one another. Support arm 18 comprises a single support region 20 that defines a recessed region, or a depression, within the upper surface of support arm 18, such that the upper surface of support region 20 is positioned closer to ground surface 16. Support arm 18 also comprises first member 80, second member 82, and hinge mechanism 84 that hingedly couples first member 80 and second member 82 to one another. As shown, first member 80 extends beyond hinge mechanism 84 towards distal end 30 to overlap with at least a portion of second member 82, such that a lower surface of first member 80 operably contacts at least a portion of an upper surface of second member 82 when support arm 18 is in deployed orientation 32 and/or level orientation 100. In this way, first member 80 and second member 82 are prevented from pivoting downwardly, or towards ground surface 16, about hinge mechanism 84. In other words, first member 80 and second member 82 may remain collinear, fixedly positioned relative to one another, and/or are non-pivotal about hinge mechanism 84 while support arm 18 supports at least a portion of the undercarriage of the aircraft. As further shown in FIG. 14, support region 20 is positioned along support arm 18 to be overlapping with first member 80 and second member 82. In other words, in some examples, first member 80 and second member 82 both comprise portions of support region 20.

FIG. 15 is another side view of aircraft handler 450 with support arms 18 oriented among tilted orientations 102. As shown, lift mechanism 26 supports proximal end 28 of support arm 18 higher above, or spaced further from, ground surface 16 relative to distal end 30 than that shown in FIG. 14. In this way, lift mechanism 26 tilts support arm 18 relative to ground surface 16 and/or orients support arm 18 with a particular tilt angle relative to ground surface 16. In other words, lift mechanism 26 moves proximal end 28 of support arm 18 further above ground surface 16 to transition support arm 18 from level orientation 100 shown in FIG. 14 to among tilted orientations 102 of FIG. 15.

In some examples, lift mechanism 26 comprises pillar 97 and lift mechanism 26 is configured to move proximal end 28 of support arm 18 up and down along pillar 97 to transition support arm 18 among level orientation 100 and tilted orientations 102. In some examples, support arm 18 is pivotally coupled to lift mechanism 26 and distal undercarriage support assembly 210 to permit support arm 18 to be pivoted by lift mechanism 26. As shown in FIG. 15, in some examples, lift mechanism 26 comprises a lever arm 88 that is operably coupled to pillar 97 and proximal end 28 of support arm 18, and lever arm 88 is configured to selectively move up and down pillar 97 to pivot support arm 18.

As further shown in FIG. 15, first member 80 and second member 82 of support arm 18 engage with one another when support arm 18 is oriented among tilted orientations 102, such that first member 80 and second member 82 are collinear, and/or do not pivot downwardly about hinge mechanism 84, such as while supporting the undercarriage of the aircraft.

FIG. 16 illustrates an example of aircraft handler 450 in the stowed configuration with support arms 18 oriented in stowed orientation 34. As shown, first member 80 and second member 82 are pivoted upwardly about hinge mechanism 84, such that first member 80 extends downwardly from hinge mechanism 84 to operably couple to lift mechanism 26, such as lever arm 88 thereof, and second member 82 extends downwardly from hinge mechanism 84 to operably couple to second drive assembly 24 (or third drive assembly 40 in the case of second support arm 38). In particular, first member 80 is pivotally coupled to lift mechanism 26 and second member 82 is pivotally coupled to second drive assembly 24 to permit first member 80 and second member 82 to pivot about hinge mechanism 84 and when support arm 18 transitions between deployed orientation 32 and stowed orientation 34. Further shown, lift mechanism 26 may support proximal end 28 higher above ground surface 16 than distal end 30 when support arm 18 is in stowed orientation 34.

With continued reference to FIG. 16, distal end 30 of support arm 18 or first drive assembly 14 are positioned closer to body 12 of front undercarriage support assembly 206 or proximal end 28 of support arm 18 when support arm 18 is in stowed orientation 34 relative to when support arm 18 is in deployed orientation 32. In this way, aircraft handler 450 occupies a smaller floor space, or possesses a smaller footprint, in the stowed configuration of FIG. 16 relative to the deployed configurations of FIGS. 6 and 7. Thus, the stowed configuration of aircraft handler 450 and/or stowed orientation 34 of support arms 18 may permit aircraft handler 450 to be stored within a smaller stowage area. In particular, the area of the footprint of aircraft handler 450 when support arm(s) 18 are in stowed orientation 34 may be at most 30%, at most 40%, at most 50%, at most 55%, and/or at most 60% the area of the footprint of aircraft handler 450 when support arm(s) 18 are in deployed orientation 32.

In some examples, first drive assembly 14 and/or second drive assembly 24 (or third drive assembly 40 and/or fourth drive assembly 44 in the case of second support arm 38) are configured to move relative to one another to transition support arm 18 between deployed orientation 32 and stowed orientation 34. In some such examples, second drive assembly 24 (or third drive assembly 40 in the case of second support arm 38) is configured to move towards and away from body 12 of front undercarriage support assembly 206 (or body 12 of rear undercarriage support assembly 208 in the case of second support arm 38) to transition support arm 18 between deployed orientation 32 and stowed orientation 34, and/or to selectively pivot first member 80 and second member 82 about hinge mechanism 84.

Figure 17:
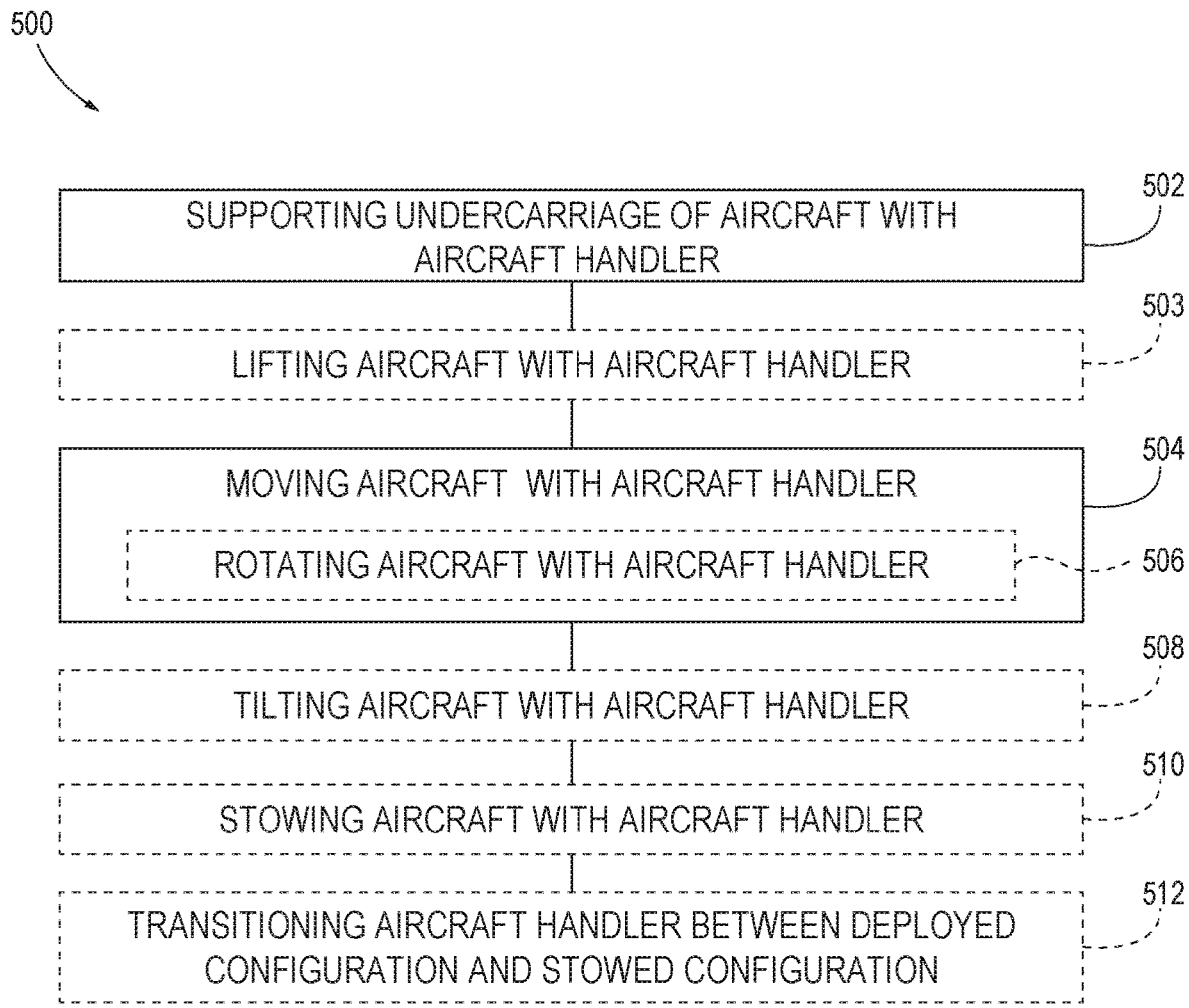
FIG. 17 is a flowchart that schematically represents methods, according to the present disclosure.

FIG. 17 is a flowchart that schematically represents illustrative, non-exclusive examples of methods 500, according to the present disclosure. In FIG. 17, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein. Furthermore, methods 500 are not limited to the order of steps illustrated in FIG. 17, and each step of methods 500 may be performed with any suitable sequence or timing relative to any other step of methods 500, including prior to, subsequent to, simultaneously with, and/or substantially simultaneously with any other step of methods 500. Each step or portion of methods 500 may be performed with utilizing aircraft handlers 10, portions thereof, and/or the example aircraft handlers thereof including example aircraft handlers 300, example aircraft handler 350, example aircraft handlers 400, and/or example aircraft handler 450 discussed in detail herein with reference to FIGS. 1-16. Likewise, any of the features, functions, and/or structures of aircraft handlers 10 discussed herein with reference to FIG. 17 may be included in and/or utilized with aircraft handlers 10 of FIGS. 1-16 without departing from the scope of the present disclosure.

In some examples, controller 90, as discussed above, is programmed to perform or otherwise facilitate or implement one or more of the methods and/or steps illustrated in FIG. 17 and/or discussed herein. In some examples, instructions for performing the various steps and/or methods described herein are stored as computer-readable instructions on the non-transitory memory of controller 90. The processing unit of controller 90 is configured to execute the computer-readable instructions to perform the one or more steps and methods illustrated in FIG. 17. In other examples, instructions for performing the various steps and/or methods described herein are stored remotely from aircraft handler 10, such as in the example of an aircraft handler 10 that is configured to be remotely controlled. In other examples, one or more steps or portions of methods 500 are executed responsive to control by an operator or one or more people that may control aircraft handler 10 remotely.

As seen in FIG. 17, methods 500 include supporting an undercarriage 108 of an aircraft 22 with an aircraft handler 10 at 502 and moving the aircraft 22 along a ground surface 16 with the aircraft handler 10 at 504. In some examples, the moving the aircraft at 504 includes rotating the aircraft with the aircraft handler 10 at 506. Methods 500 also may include tilting the aircraft with the aircraft handler 10 at 508, stowing the aircraft 22 with the aircraft handler 10 at 510, and/or transitioning the aircraft handler 10 between a deployed orientation and a stowed orientation at 512.

The supporting the undercarriage 108 of the aircraft 22 with the aircraft handler 10 at 502 includes supporting any suitable portion of the undercarriage 108 of the aircraft 22 with the aircraft handler 10. In some examples, the supporting at 502 comprises supporting or suspending at least a portion of, some of, most of, or the entirety of the undercarriage 108 of the aircraft 22 spaced above, or apart from, contact with the ground surface 16. When the supporting at 502 comprises supporting the entirety of the undercarriage 108 of the aircraft 22, the supporting at 502 may include supporting the entire weight of the aircraft 22 with the aircraft handler 10.

The supporting at 502 comprises supporting the undercarriage of the aircraft with a plurality of support members 202 of aircraft handler 10, as discussed herein. In some examples, the supporting at 502 comprises supporting the undercarriage of the aircraft with the support member 202 of a front undercarriage support assembly 206, the support member 202 of a rear undercarriage support assembly 208, and/or the support member of at least one distal undercarriage support assembly 210, as discussed herein. In more specific examples, the supporting at 502 comprises supporting a forward portion of the undercarriage of the aircraft, such as a front wheel assembly, with the support member 202 of the front undercarriage support assembly 206, optionally together with the support member 202 of a first distal undercarriage support assembly 209. Additionally or alternatively, the supporting at 502 comprises supporting a first aft portion of the undercarriage 108 of the aircraft, such as a first rear wheel assembly, with the support member 202 of the rear undercarriage support assembly 208, and/or supporting a second aft portion of the undercarriage 108 of the aircraft, such as a second rear wheel assembly, with the distal undercarriage support assembly 210, which in some examples, is a second distal undercarriage support assembly 211.

For some examples in which the supporting at 502 is performed with aircraft handlers 300, the supporting at 502 comprises supporting the forward portion of the undercarriage of the aircraft with a fork assembly 248 of the front undercarriage support assembly 206, supporting the first aft portion of the undercarriage of the aircraft 22 with the fork assembly 248 of the rear undercarriage support assembly 208, and supporting the second aft portion of the undercarriage of the aircraft with a support region 20 of the distal undercarriage support assembly 210. In some such examples, the supporting is performed with prong gate(s) 252 in a prong gate closed configuration 254, gates 242 in a closed configuration 244, and/or with the distal undercarriage support assembly 210 in a supporting configuration 228, as discussed herein.

For some examples in which the supporting at 502 is performed with aircraft handlers 400, the supporting at 502 comprises supporting at least a portion of the undercarriage of the aircraft with at least one support arm 18 of the aircraft handler 400. As discussed herein, the at least one support arm 18 comprises one or more support regions 20, each of which being configured to support at least a portion of the undercarriage of the aircraft. In some examples, the supporting at 502 comprises supporting one or more portions of the undercarriage 108 of the aircraft 22 with the one or more support regions 20. In some examples, aircraft handlers 400 comprises a plurality of support arms 18, and the supporting at 502 comprises supporting the undercarriage 108 of the aircraft at 502 with the plurality of support arms 18. In some such examples, aircraft handlers 400 comprises a first support arm 36 and a second support arm 38, each being configured to support a discrete region of the undercarriage of the aircraft, and the supporting at 502 comprises supporting at least two discrete regions of the undercarriage 108 of the aircraft with the first support arm 36 and the second support arm 38.

The supporting the aircraft at 502 comprises supporting the aircraft in any suitable orientation. In some examples, the supporting at 502 comprises supporting the aircraft in a level aircraft orientation 104. Additionally or alternatively, the supporting the aircraft at 502 comprises supporting the aircraft among, and/or in any desirable tilted aircraft orientation 106.

The supporting the aircraft at 502 is performed with any suitable sequence or timing within methods 500, such as subsequent to or substantially simultaneously with lifting at 503. Additionally or alternatively, in some examples, the supporting at 502 is performed be performed prior to, substantially simultaneously with, and/or subsequent to moving at 504 and/or tilting at 508. As more examples, the supporting at 502 may be performed prior to, or substantially simultaneously with, the stowing at 510. The supporting at 502 also may be performed prior to, or subsequent to, transitioning at 512.

In some examples, methods 500 comprise lifting the undercarriage of the aircraft from direct contact with the ground surface 16 at 503. For some examples in which the lifting at 503 is performed with aircraft handlers 300, the lifting at 503 comprises operably positioning each undercarriage support assembly 200 under the respective portion of the undercarriage of the aircraft such as with gates 242 in an open configuration 246, prong gates 252 in a prong gate open configuration 256, the fork assemblies 248 positioned in a translation position, and/or distal undercarriage support assembly 210 in a positioning configuration 230, as discussed herein. In some examples, the lifting at 503 subsequently includes transitioning the fork assemblies 248 to a lowered position 232 and/or a raised position 234 with the lift mechanisms 26, transitioning the gates 242 to the closed configuration 244, transitioning prong gates 252 to the prong gate closed configuration 254, and/or transitioning the distal undercarriage support assembly 210 to the supporting configuration 228, as discussed herein.

For some examples in which the lifting at 503 is performed with aircraft handlers 400, the lifting at 503 comprises translating each support arm 18 laterally beneath the respective portion of the undercarriage of the aircraft with each support arm 18 positioned in a level orientation 100, as discussed herein. In some such examples, the lifting at 503 comprises urging each respective portion of the undercarriage of the aircraft from the ground surface 16 onto a respective support region 20 utilizing transition portions 86, as discussed herein. In some such examples, the lifting at 503 comprises utilizing one or more drive assemblies 212 of the aircraft handler 400 to facilitate lifting or transitioning the undercarriage of the aircraft from the ground surface 16 onto the support regions 20. In particular, in some examples, the lifting at 503 comprises moving, with the one or more drive assemblies 212, the one or more support regions 20 and/or the respective transition portions 86 laterally beneath the undercarriage of the aircraft and urging, such as utilizing the transition portions 86, the undercarriage from contact with the ground surface 16 and onto the support regions 20.

The lifting at 503 is performed with any suitable sequence or timing within methods 500, such as prior to or at least substantially simultaneously with the supporting at 502 and/or prior to any other step of methods 500.

With continued reference to FIG. 17, methods 500 comprise moving the aircraft along the ground surface with the aircraft handler at 504. In some examples, the moving at 504 comprises moving the aircraft while each support member 202 of the aircraft handler 10 supports the respective portion of the undercarriage 108 of the aircraft 22.

For some examples in which the moving at 504 is performed with aircraft handlers 300, the moving is performed while fork assembly 248 of front undercarriage support assembly 206, fork assembly 248 of rear undercarriage support assembly 208, and the support region 20 of the distal undercarriage support assembly 210, each supporting the respective portion of the undercarriage of the aircraft, are spaced apart from the ground surface 16. For some examples in which the moving at 504 is performed with aircraft handlers 400, the moving is performed while the one or more support arms 18 of the aircraft handler 400 each support at least a portion of the undercarriage of the aircraft spaced apart from the ground surface 16.

The moving at 504 comprises moving the aircraft along any suitable or desirable ground surface, such as a level ground surface, a sloped ground surface, an even ground surface, and/or an uneven ground surface. The moving at 504 also may comprise moving the aircraft along a ground that is included in any suitable one or more environments, such as a runway, an aircraft hangar, a nautical ship, an aircraft carrier, an aircraft parking area, a shipping container, and/or an elevator. In some examples, the moving at 504 is performed to relocate the aircraft from an initial location to a final location. With this in mind, in some examples, the moving at 504 comprises moving the aircraft along a plurality of ground surfaces and/or within a plurality of environments.

In some examples, the moving at 504 comprises moving the aircraft to within and/or from within a defined volume, as discussed herein, such as during relocation of the aircraft. In some examples, the moving at 504 may comprise moving the aircraft to within and/or from within a defined volume defined by a shipping container, a parking space, and/or an elevator, as discussed herein.

The moving at 504 comprises moving the aircraft while the aircraft handler supports the aircraft in any suitable orientation, such as in a level aircraft orientation 104 and/or among a plurality of tilted aircraft orientations. In some examples, the moving the aircraft at 504 comprises moving the aircraft to within and/or 106 from within a defined volume 130 that is smaller than an envelope 120 of the aircraft in the level orientation and/or a defined volume that comprises a width that is narrower than a width of the envelope of the aircraft in the level aircraft orientation. In some such examples, the moving at 504 is performed while the aircraft handler supports the aircraft tilted among the plurality of the aircraft tilted orientations, such that the envelope of the aircraft is smaller than the defined volume and/or the width of the envelope of the aircraft is narrower than the width of the defined volume, while the aircraft handler moves the aircraft to within, and/or from within the defined volume.

In some examples, the moving at 504 comprises moving the aircraft with one or more drive assemblies 212 of the aircraft handler 10. In some examples, the moving at 504 comprises utilizing the one or more driven wheels 60 included at least one drive assembly 212, as discussed herein. For some examples in which the moving at 504 is performed with aircraft handlers 400, the moving at 504 comprises moving the aircraft 22 with one or more of a first drive assembly 14, a second drive assembly 24, a third drive assembly 40, and/or a fourth drive assembly 44 of the aircraft handler 400.

In some examples, the moving at 504 comprises moving the aircraft along a plurality of directions of travel. In some examples, the moving at 504 comprises moving the aircraft along one or more straight paths. Additionally or alternatively, the moving at 504 comprises moving the aircraft 22 along one or more curved paths, such as between the one or more straight paths. In some examples, the moving at 504 comprises steering the aircraft 22, such as along the one or more straight paths and/or along the one or more curved paths. In some such examples, the moving the aircraft at 504 comprises selectively pivoting the one or more driven wheels 60 to steer the aircraft along the one or more straight paths and/or the one or more curved paths.

The moving at 504 is performed with any suitable sequence or timing within methods 500. In some examples, the moving at 504 is performed substantially simultaneously with the supporting at 502 and/or subsequent to the lifting at 503. As more examples, the moving at 504 may be performed prior to tilting at 508, stowing at 510, and/or transitioning at 512. Additionally or alternatively, in some examples, the moving at 504 is performed substantially simultaneously with or, subsequent to, tilting at 508, such as when the moving at 504 comprises moving the aircraft to within and/or from within the defined volume.

With continued reference to FIG. 17, in some examples, the moving at 504 comprises rotating the aircraft with the aircraft handler 10 at 506. In some examples, the rotating at 506 is performed to reorient the aircraft and/or the aircraft handler 10 between a first direction of movement and a second direction of movement. In some examples, the rotating at 506 is performed to orient the aircraft and/or the envelope 120 of the aircraft to be aligned with and/or such as to fit within the defined volume 130. With this in mind, the rotating at 506 may be performed while the aircraft handler 10 supports the aircraft in the level aircraft orientation 104 and/or while the aircraft handler 10 supports the aircraft 22 among the tilted aircraft orientations 106.

In some examples, the rotating at 506 comprises rotating the aircraft 22 about a yaw axis 132 of the aircraft 22, as discussed herein. In some such examples, the rotating at 506 comprises rotating the aircraft 22 within a cylindrical volume 134 having a radius 136 that is at most a threshold fraction of a distance between the yaw axis 132 and a maximum extent 122 of the aircraft 22 from the yaw axis 132. In some such examples, the threshold fraction of the radius 136 of the cylindrical volume 134 to the distance between the yaw axis 132 to the maximum extent 122 is at most 105%, at most 110%, at most 120%, and/or at most 130%. In this way, the rotating at 506 may be performed within a minimum volume and permit the aircraft and aircraft handler to be rotated, reoriented, and/or turned without extending beyond the cylindrical volume 134.

The rotating at 506 may comprise rotating the aircraft in a clockwise direction of rotation and/or in a counter-clockwise direction of rotation. The rotating at 506 also may include rotating the aircraft through any suitable degree angle of rotation, such as through 30°, through 90°, through 180°, and/or through 360°, such as while aircraft 22 and/or aircraft handler 10 remains within cylindrical volume 134.

In some examples, the rotating at 506 comprises rotating the aircraft and the aircraft handler 10 with one or more of the drive assemblies 212 discussed herein with reference to the moving at 504. In some such examples, the rotating at 506 comprises selectively pivoting one or more driven wheels 60 to a particular pivot angle and providing motive force with the one or more driven wheels 60 along the pivot angle to rotate the aircraft 22 along the ground surface 16.

When included, the rotating at 506 is performed with any suitable sequence or timing within the moving at 504. In some examples, the rotating at 506 is performed prior to and/or subsequent to moving the aircraft to within and/or from within the defined volume. Additionally or alternatively, in some examples, the rotating at 506 is performed between moving the aircraft along a first direction of travel and a second direction of travel. As more examples, the rotating at 506 may be performed subsequent to, or substantially simultaneously with, the supporting at 502, and/or tilting at 508. Additionally or alternatively, in some examples, the rotating at 506 is performed subsequent to tilting at 508, and/or prior to stowing at 510.

With continued reference to FIG. 17, in some examples, methods 500 comprise tilting the aircraft relative to the ground surface with the aircraft handler at 508. In some examples, the tilting at 508 comprises tilting the aircraft between the level aircraft orientation 104 and the plurality of tilted aircraft orientations 106. More specifically, in some examples, the tilting at 508 comprises tilting the aircraft from the level aircraft orientation 104 to among the plurality of tilted aircraft orientations 106 and/or a particular tilted aircraft orientation 106. Additionally or alternatively, the tilting at 508 comprises tilting the aircraft from among the plurality of tilted aircraft orientations 106, or from a particular tilted aircraft orientation 106, to the level aircraft orientation 104. In some examples, the tilting at 508 comprises tilting the aircraft to and/or from a particular aircraft tilt angle relative to the ground surface 16 or the level aircraft orientation 104, such as in the range of −5° to 25°.

In some examples, the tilting at 508 comprises altering the dimensions of the envelope 120 of the aircraft 22, as discussed herein. More specifically, for some examples in which the tilting at 508 comprises tilting the aircraft from the level aircraft orientation 104 to among the tilted aircraft orientations 106, the tilting at 508 comprises reducing the width of the envelope 120 of the aircraft 22, as discussed herein.

When included, the tilting at 508 is performed while each support member 202 of aircraft handler 10 supports the respective portion of the undercarriage 108 of aircraft 22. In some examples, the tilting at 508 comprises selectively raising and lowering at least one support member 202 relative to the ground surface 16. For some examples in which the tilting at 508 is performed with aircraft handlers 300, the tilting at 508 comprises selectively raising and/or lowering the fork assembly 248 of the front undercarriage support assembly 206 with the lift mechanism 26 of the front undercarriage support assembly 206 and/or selectively raising and/or lowering the fork assembly 248 of the rear undercarriage support assembly 208 with the lift mechanism 26 of the rear undercarriage support assembly 208, as discussed herein. In some such examples, the tilting at 508 comprises raising the fork assembly 248 of the rear undercarriage support assembly 208 spaced further above the ground 16 than the fork assembly 248 of the front undercarriage support assembly 206, as discussed herein.

For examples in which the tilting at 508 is performed with aircraft handlers 400, the tilting at 508 is performed while at least one support arm 18 of the aircraft handler 400 supports at least a portion of the undercarriage 108 of the aircraft 22 spaced apart from the ground surface 16. For examples in which the tilting at 508 is performed with aircraft handlers 400, the tilting at 508 comprises pivoting the at least one support arm 18 with the lift mechanism 26 while the at least one support arm 18 supports at least a portion of the undercarriage of the aircraft. More specifically, in some examples, the tilting at 508 comprises raising the proximal end 28 of the at least one support arm 18 to tilt or pivot the at least one support arm 18 from the level orientation 100 to among the tilted orientations 102 and/or to tilt the aircraft from the level aircraft orientation 104 to among the tilted aircraft orientations 106. Additionally or alternatively, in some examples, the tilting at 508 comprises lowering the proximal end 28 of the at least one support arm 18 to tilt or pivot the at least one support arm 18 from among the tilted orientations 102 to the level orientation 100 and/or to tilt the aircraft 22 from among the tilted aircraft orientations 106 to the level aircraft orientation 104. For some examples in which aircraft handlers 400 comprise the first support arm 36 and the second support arm 38, the tilting at 508 comprises tilting the first support arm 36 and the second support arm 38 with the respective lift mechanisms 26.

When included, the tilting at 508 is performed with any suitable sequence or timing within methods 500. In some examples, the tilting at 508 is performed substantially simultaneously with or subsequent to the supporting at 502 and/or the moving at 504. Additionally or alternatively, in some examples, the tilting at 508 is performed prior to the moving at 504.

As shown in FIG. 17, in some examples, methods 500 include stowing the aircraft with the aircraft handler at 510. The stowing at 510 may include stowing the aircraft in any suitable stowage location and/or within any suitable environment. In some examples, the stowing at 510 includes stowing the aircraft in a parking space, within a defined volume 130, within an aircraft hangar, on a ship deck, and/or within a shipping container. In some examples, the stowing at 510 comprises transferring the aircraft from operable support by the plurality of support members 202 of the aircraft handler 10 to the ground surface 16. In some examples, the stowing at 510 comprises moving the aircraft handler 10 laterally from beneath the aircraft and/or from supporting the undercarriage of the aircraft to transfer the aircraft to the ground surface 16.

In some examples, the stowing at 510 comprises transferring the aircraft from the plurality of support members 202 to the ground surface 16 at the stowage location, which may be described as parking the aircraft with the aircraft handler. In some examples, the stowing at 510 comprises orienting, such as rotating, and/or moving the aircraft with the aircraft handler 10 to fit the aircraft 22 within the stowage location. In other examples, the stowing at 510 comprises transferring the aircraft 22 from the plurality of support members 202 at a location other than the stowage location, and subsequently taxiing the aircraft 22 to the stowage location.

When included, the stowing at 510 is performed with any suitable sequence or timing within methods 500. As examples, the stowing at 510 may be performed substantially simultaneously with, or subsequent to the moving at 504, the rotating at 506, and/or the tilting at 508. Additionally or alternatively, the stowing at 510 may be performed prior to transitioning at 512 and/or subsequent to the supporting at 502.

With continued reference to FIG. 17, in some examples, methods 500 comprise transitioning the aircraft handler 10 between the deployed orientation and the stowed orientation at 512. In some examples, the transitioning at 512 comprises transitioning the aircraft handler 10 from the deployed configuration to the stowed configuration, which is referred to herein as stowing the aircraft handler 10. Additionally or alternatively, in some examples, the transitioning at 512 comprises transitioning the aircraft handler 10 from the stowed configuration to the deployed configuration, which is referred to herein as deploying the aircraft handler 10. For some examples in which the transitioning at 512 comprises stowing the aircraft handler 10, the transitioning at 512 comprises reducing the footprint of the aircraft handler 10.

For some examples in which the transiting at 512 is performed with aircraft handlers 400, the transitioning at 512 comprises transitioning the one or more support arms 18 from the deployed orientation 32 to the stowed orientation 34. Additionally or alternatively, in some examples, the transitioning at 512 comprises transitioning the one or more support arms 18 from the stowed orientation 34 to the deployed orientation 32.

For some examples in which the transitioning at 512 comprises stowing the aircraft handler 400, the transitioning at 512 comprises reducing a length of the one or more support arms 18, such as discussed herein. More specifically, in some such examples, the transitioning at 512 comprises moving the proximal end 28 and the distal end 30 of the one or more support arms 18, closer to one another. In some such examples, the transitioning at 512 comprises moving the second drive assembly 24 towards the first drive assembly 14, such as to bring the proximal end 28 and the distal end 30 of the first support arm 36 closer to one another and/or reduce the length of the first support arm 36. Additionally or alternatively, in some such examples, the transitioning at 512 comprises moving the third drive assembly 40 towards the fourth drive assembly 44, such as to move the proximal end 28 and the distal end 30 of the second support arm 38 closer to one another and/or reduce the length of the second support arm 38.

In some examples, the transitioning at 512 comprises pivoting a first member 80 and a second member 82 of each support arm 18 relative to one another about a hinge mechanism 84 to move the proximal end 28 and the distal end 30 of each support arm 18 relative to one another, as discussed herein. In particular, when the transitioning at 512 comprises transitioning the one or more support arms 18 from the deployed orientation 32 to the stowed orientation 34, the transitioning at 512 may comprise pivoting the first member 80 and the second member 82 upwardly about the hinge mechanism 84, such as to bring the proximal end 28 and the distal end 30 of the support arm 18 closer to one another.

For some examples in which the transitioning at 512 is performed with aircraft handlers 300, the transitioning at 512 comprises adjusting a spacing between the front undercarriage support assembly 206 and the rear undercarriage support assembly 208 along the ground surface 16, and/or adjusting a spacing between the rear undercarriage support assembly 208 and the distal undercarriage support assembly 210. More specifically, for some examples in which the transitioning at 512 comprises stowing the aircraft handler 300, the transitioning at 512 comprises moving the body 12 of front undercarriage support assembly 206 closer to the body 12 of rear undercarriage support assembly 208. In some such examples, the transitioning at 512 comprises folding sections 270 of connecting member 216 about an articulated connection 272 to bring front undercarriage support assembly 206 and rear undercarriage support assembly 208 closer to one another, as discussed herein. Additionally or alternatively, for some examples in which the transitioning at 512 comprises stowing the aircraft handler 300, the transitioning at 512 comprises moving the body 12 of distal undercarriage support assembly 210 closer to the body 12 of rear undercarriage support assembly 208. In some such examples, the transitioning at 512 comprises folding articulated portions 276 of each connecting arm 214 relative to one another about the respective connecting arm articulated connection 278 to bring the body 12 of distal undercarriage support assembly 210 closer to the body 12 of rear undercarriage support assembly, as discussed herein.

Illustrative, non-exclusive examples of inventive subject matter according to the present disclosure are described in the following enumerated paragraphs:

A. An aircraft handler (10), comprising:
  a plurality of undercarriage support assemblies (200), each comprising:
    a body (12);
    a support member (202) operably coupled to and extending from the body (12), wherein the support member (202) comprises at least one support region (20) configured to engage and operably support at least a respective portion of an undercarriage (108) of an aircraft (22); and
    a translation assembly (204) operably coupled to the body (12) and configured to support a respective undercarriage support assembly (200) on a ground surface (16) and permit the respective undercarriage support assembly (200) to translate along the ground surface (16); and
  one or more drive assemblies (212) configured to move the aircraft handler (10) along the ground surface (16), wherein each drive assembly (212) comprises the translation assembly (204) of an undercarriage support assembly (200) of the plurality of undercarriage support assemblies (200).

A1. The aircraft handler (10) of paragraph A, wherein the aircraft handler (10) is configured to support the aircraft (22) in a level aircraft orientation (104) and in a plurality of tilted aircraft orientations (106).

A2. The aircraft handler (10) of any of paragraphs A-A1, wherein the aircraft handler (10) is configured to suspend the entire undercarriage (108) of the aircraft (22) spaced apart from the ground surface (16) when the support member (202) of each undercarriage support assembly (200) supports at least the respective portion of the undercarriage (108) of the aircraft (22).

A3. The aircraft handler (10) of any of paragraphs A-A2, wherein the aircraft handler (10) is configured to rotate the aircraft (22) about a yaw axis (132) of the aircraft (22).

A3.1. The aircraft handler (10) of any of paragraphs A-A3, wherein the aircraft handler (10) further is configured to rotate the aircraft (22) within a cylindrical volume (134), and wherein a radius (136) of the cylindrical volume (134) is 110% or less of a distance between a/the yaw axis (132) of the aircraft (22) and a maximum extent (122) of the aircraft (22), as measured radially from the yaw axis (132).

A4. The aircraft handler (10) of any of paragraphs A-A3.1, wherein the support member (202) of each undercarriage support assembly (200) is configured to lift at least the respective portion of the undercarriage (108) of the aircraft (22) from direct contact with the ground surface (16).

A5. The aircraft handler (10) of any of paragraphs A-A4, further comprising one or more lift mechanisms (26) each being included in a respective undercarriage support assembly (200) of the plurality of undercarriage support assemblies (200), wherein each lift mechanism (26) operably couples the support member (202) of the respective undercarriage support assembly (200) to the body (12) of the respective undercarriage support assembly (200), and wherein each lift mechanism (26) is configured to selectively raise and lower a respective support member (202) relative to the ground surface (16).

A5.1 The aircraft handler (10) of paragraph A5, wherein the aircraft handler (10) is configured to tilt the aircraft (22) from a/the level aircraft orientation (104) to among a/the plurality of tilted aircraft orientations (106) when each lift mechanism (26) selectively raises the respective support member (202) relative to the ground surface (16).

A6. The aircraft handler (10) of any of paragraphs A-A5.1, wherein the one or more drive assemblies (212) are configured to move the aircraft handler (10) together with the aircraft (22) along the ground surface (16) when each support member (202) of the plurality of undercarriage support assemblies (200) each support at least the respective portion of the undercarriage (108) of the aircraft (22).

A7. The aircraft handler (10) of any of paragraphs A-A6, wherein each drive assembly (212) comprises one or more driven wheels (60) that are configured to receive power from one or more power sources (92) and facilitate movement of the aircraft handler (10) along the ground surface (16).

A7.1. The aircraft handler (10) of paragraph A7, wherein at least one of the one or more driven wheels (60) is configured to steer the aircraft handler (10).

A7.2. The aircraft handler (10) of any of paragraphs A7-A7.1, wherein the at least one driven wheel (60) of the one or more driven wheels (60) is configured to selectively pivot to steer the aircraft handler (10).

A7.3. The aircraft handler (10) of any of paragraphs A7-A7.2, wherein each of the one or more driven wheels (60) is configured to be independently operated.

A8. The aircraft handler (10) of any of paragraphs A-A7.3, wherein the translation assembly (204) of at least one undercarriage support assembly (200) of the plurality of undercarriage support assemblies (200) comprises one or more non-driven wheels (62).

A9. The aircraft handler (10) of any of paragraphs A-A8, wherein the aircraft handler (10) is configured to fit within an envelope (120) of the aircraft (22) when the plurality of undercarriage support assemblies (200) support the respective portions of the undercarriage (108) of the aircraft (22).

A10. The aircraft handler (10) of any of paragraphs A-A9, wherein the aircraft handler (10) comprises a deployed configuration and a stowed configuration, wherein the aircraft handler (10) occupies a footprint on the ground surface (16), wherein the footprint of the aircraft handler (10) is smaller in the stowed configuration than the footprint of the aircraft handler (10) in the deployed configuration.

B. The aircraft handler (10) of any of paragraphs A-A10, wherein the plurality of undercarriage support assemblies (200) comprises a front undercarriage support assembly (206) and a rear undercarriage support assembly (208);

wherein the front undercarriage support assembly (206) is configured to support a forward portion of the undercarriage (108) of the aircraft (22), and wherein the rear undercarriage support assembly (208) is configured to support an aft portion of the undercarriage (108) of the aircraft (22); and wherein one or more of the front undercarriage support assembly (206) and the rear undercarriage support assembly (208) comprise the one or more drive assemblies (212).

B1. The aircraft handler (10) of paragraph B, wherein the plurality of undercarriage support assemblies (200) further comprises a distal undercarriage support assembly (210), and wherein the aircraft handler (10) further comprises at least one connecting arm (214) that operably couples the distal undercarriage support assembly (210) to the rear undercarriage support assembly (208); and wherein the aft portion of the undercarriage (108) of the aircraft (22) is a first aft portion, and wherein the distal undercarriage support assembly (210) is configured to engage and support a second aft portion of the undercarriage (108) of the aircraft (22).

B2. The aircraft handler (10) of paragraph B1, wherein the aircraft hander (10) comprises two connecting arms (214) including a first connecting arm (214) and a second connecting arm (214), and wherein the distal undercarriage support assembly (210) comprises a first portion (222) operably coupled to the first connecting arm (214), and a second portion (224) operably coupled to the second connecting arm (214).

B2.1. The aircraft handler (10) of paragraph B2, wherein the first portion (222) and the second portion (224) collectively comprise the support member (202) and the support region (20) of the distal undercarriage support assembly (210).

B2.1.1. The aircraft handler (10) of paragraph B2.1, further comprising a first connecting arm actuator (280) that operably couples the first connecting arm (214) to the rear undercarriage support assembly (208) and a second connecting arm actuator (280) that operably couples the second connecting arm (214) to the rear undercarriage support assembly (208), wherein the first connecting arm actuator (280) is configured to move the first connecting arm (214) together with the first portion (222) along the ground surface (16) and the second connecting arm actuator (280) is configured to move the second connecting arm (214) together with the second portion (224) relative to the ground surface (16).

B2.1.1.1. The aircraft handler (10) of paragraph B2.1.1, wherein the first connecting arm actuator (280) and the second connecting arm actuator (280) collectively are configured to adjust a spacing between the first portion (222) and the second portion (224) along the ground surface (16).

B2.2. The aircraft handler (10) of any of paragraphs B2-62.1.1.1, wherein the distal undercarriage support assembly (210) comprises a distal coupling mechanism (226) configured to selectively couple the first portion (222) and the second portion (224) to one another.

B2.2.1. The aircraft handler (10) of paragraph B2.2, wherein the first portion (222) and the second portion (224) are configured to collectively support the second aft portion of the undercarriage (108) of the aircraft (22) when the distal coupling mechanism (226) couples the first portion (222) and the second portion (224) to one another.

B2.3. The aircraft handler (10) of any of paragraphs B2.2-B2.2.1, when depending from paragraph B2.1.1, wherein the distal undercarriage support assembly (210) comprises a supporting configuration (228) in which the distal coupling mechanism (226) operably couples the first portion (222) and the second portion (224) to one another for operative support of the second aft portion of the undercarriage (108), and a positioning configuration (230) in which the distal coupling mechanism (226) disengages the first portion (222) from the second portion (224) and the first connecting arm actuator (280) and the second connecting arm actuator (280) position the first portion (222) and the second portion (224) spaced apart from one another along the ground surface (16).

B2.3.1. The aircraft handler (10) of paragraph B2.3, wherein the distal undercarriage support assembly (210) is configured to translate beneath the second aft portion of the undercarriage (108) of the aircraft (22) in the positioning configuration (230).

B3. The aircraft handler (10) of any of paragraphs B-B2.3.1, when depending from paragraph A5, wherein the aircraft handler (10) comprises a plurality of lift mechanisms (26), wherein the front undercarriage support assembly (206) and the rear undercarriage support assembly (208) each comprise a respective lift mechanism (26) of the plurality of lift mechanisms (26).

B3.1. The aircraft handler (10) of paragraph B3, wherein each lift mechanism (26) is configured to selectively position the respective support member (202) among a lowered position (232) and a plurality of raised positions (234).

B3.1.1. The aircraft handler (10) of paragraph B3.1, when depending from paragraph A1, wherein the aircraft handler (10) is configured to support the aircraft (22) in the level aircraft orientation (104) when the support member (202) of the front undercarriage support assembly (206) and the support member (202) of the rear undercarriage support assembly (208) are positioned in the lowered position (232) by the respective lift mechanisms (26), and wherein the aircraft handler (10) is configured to support the aircraft (22) among the plurality of tilted aircraft orientations (106) when the support member (202) of the front undercarriage support assembly (206) and the support member (202) of the rear undercarriage support assembly (208) are among the plurality of raised positions (234).

B4. The aircraft handler (10) of any of paragraphs B-B3.1.1, wherein the front undercarriage support assembly (206) comprises a front drive assembly (212) of the one or more drive assemblies (212), and wherein the front drive assembly (212) is configured to move the front undercarriage support assembly (206) along the ground surface (16).

B4.1. The aircraft handler (10) of paragraph B4.1, wherein the front drive assembly (212) is configured to move the aircraft handler (10) along the ground surface (16).

B4.2. The aircraft handler (10) of any of paragraphs B4-B4.1, wherein the rear undercarriage support assembly (208) comprises a rear drive assembly (212) of the one or more drive assemblies (212), and wherein the rear drive assembly (212) is configured to move the rear undercarriage support assembly (208) along the ground surface (16).

B4.2.1. The aircraft handler (10) of paragraph B4.2, when depending from paragraph B4.1, wherein the front drive assembly (212) and the rear drive assembly (212) are configured to move the aircraft handler (10) along the ground surface (16).

B4.2. The aircraft handler (10) of any of paragraphs B4.2-B4.2.1, when depending from paragraph B1, wherein the rear drive assembly (212) is configured to move the distal undercarriage support assembly (210) together with the rear undercarriage support assembly (208).

B5. The aircraft handler (10) of any of paragraphs B-B4.2, wherein the front undercarriage support assembly (206) further comprises a front ground support chassis (236) operably coupled to the body (12) of the front undercarriage support assembly (206), wherein the front ground support chassis (236) comprises a front pair of projections (238) that extend from the body (12) of the front undercarriage support assembly (206) laterally spaced apart from one another and that form a front open region (240) therebetween, and wherein a portion of the translation assembly (204) of the front undercarriage support assembly (206) supports the front pair of projections (238) above the ground surface (16).

B5.1. The aircraft handler (10) of paragraph B5, wherein the support member (202) of the front undercarriage support assembly (206) is positioned laterally within the front open region (240).

B5.2. The aircraft handler (10) of any of paragraphs B5-B5.2, wherein the front ground support chassis (236) further comprises a gate (242), wherein the gate (242) has a closed configuration (244) in which the gate (242) is operably coupled to and interconnects the front pair of projections (238) and an open configuration (246) in which the gate (242) is operably coupled to only one projection (238) of the front pair of projections (238) and provides access to the front open region (240).

B6. The aircraft handler (10) of any of paragraphs B-B5.2, wherein the rear undercarriage support assembly (208) further comprises a rear ground support chassis (236) operably coupled to the body (12) of the rear undercarriage support assembly (208), wherein the rear ground support chassis comprises (236) comprises a rear pair of projections (238) that extend from the body (12) of the rear undercarriage support assembly (208) laterally spaced apart from one another and that form a rear open region (240) therebetween, wherein a portion of the translation assembly (204) of the rear undercarriage support assembly (208) supports the rear pair of projections (238) above the ground surface (16).

B6.1. The aircraft handler (10) of paragraph B6, wherein the rear ground support chassis (236) further comprises a/the gate (242), wherein the gate (242) has a closed configuration (244) in which the gate (242) is operably coupled to and interconnects the rear pair of projections (238) and an open configuration (246) in which the gate (242) is operably coupled to only one projection (238) of the rear pair of projections (238) and provides access to the rear open region (240).

B7. The aircraft handler (10) of any of paragraphs B-B6.1, wherein the support member (202) of one or more of the front undercarriage support assembly (206) and the rear undercarriage support assembly (208) comprises a fork assembly (248), wherein the fork assembly (248) comprises a plurality of prongs (250) projecting outward from the respective body (12), wherein the plurality of prongs (250) are spaced laterally apart from one another, and wherein the plurality of prongs (250) include the support region (20) of the respective support member (202).

B7.1. The aircraft handler (10) of paragraph B7, wherein the fork assembly (248) further comprises a prong gate (252) having a prong gate closed configuration (254), in which the prong gate (252) is operably coupled to and interconnects the plurality of prongs (250), and a prong gate open configuration (256) in which the prong gate (252) is operably coupled to only one prong (250) of the plurality of prongs (250).

B7.1.1. The aircraft handler (10) of paragraph B7.1, wherein, the fork assembly (248) is configured to translate laterally beneath the respective portion of the undercarriage (108) of the aircraft (22) when the prong gate (252) is in the prong gate open configuration (256).

B7.1.2. The aircraft handler (10) of any of paragraphs B7.1-B7.1.2, wherein the prong gate (252) is configured to reinforce the fork assembly (248) when the prong gate (252) is in the prong gate closed configuration (254).

B7.2. The aircraft handler (10) of any of paragraphs B7-B7.1.2, wherein the fork assembly (248) is one of a plurality of fork assemblies (248), and wherein the support member (202) of the front undercarriage support assembly (206) and the support member (202) of the rear undercarriage support assembly (208) each comprise a respective fork assembly (248) of the plurality of fork assemblies (248).

B8. The aircraft handler (10) of any of paragraphs B-B7.2, wherein the front undercarriage support assembly (206) and the rear undercarriage support assembly (208) are spaced apart from one another, and wherein the aircraft handler (10) further comprises a connecting member (216) configured to operably interconnect the front undercarriage support assembly (206) with the rear undercarriage support assembly (208).

B8.1. The aircraft hander (10) of paragraph B8, wherein the front undercarriage support assembly (206) and the rear undercarriage support assembly (208) each comprise a connecting member receiver (258) configured to selectively interconnect with and disconnect from the connecting member (216).

B8.1.1. The aircraft handler (10) of paragraph B8.1, wherein the front undercarriage support assembly (206) and the rear undercarriage support assembly (208) each comprise a respective plurality of connecting member receivers (258), wherein each respective plurality of connecting member receivers (258) comprises a first connecting member receiver (258) positioned on a first side (260) of the respective undercarriage support assembly (200), and a second connecting member receiver (258) positioned on a second side (262) of the respective undercarriage support assembly (200) that is opposed to the first side (260).

B8.1.1.1. The aircraft handler (10) of paragraph B8.1.1, wherein the connecting member (216) is configured to interconnect the front undercarriage support assembly (206) with the rear undercarriage support assembly (208) via the first connecting member receiver (258) of the front undercarriage support assembly (206) and the first connecting member receiver (258) of the rear undercarriage support assembly (208), and wherein the connecting member (216) is configured to interconnect the front undercarriage support assembly (206) and the rear undercarriage support assembly (208) via the second connecting member receiver (258) of the front undercarriage support assembly (206) and the second connecting member receiver (258) of the rear undercarriage support assembly (208).

B8.2. The aircraft handler (10) of any of paragraphs B8-B8.1.1.1, wherein the connecting member (216) is configured to permit adjustment of a spacing between the front undercarriage support assembly (206) and the rear undercarriage support assembly (208).

B8.2.1. The aircraft handler (10) of paragraph B8.2, wherein the connecting member (216) is an articulated connecting member and comprises two or more sections (270) and a plurality of articulated connections (272) that interconnect adjacent sections (270) of the two or more sections (270) to one another and that interconnect the two or more sections (270) to front undercarriage support assembly (206) and rear undercarriage support assembly (208), wherein plurality of articulated connections (272) are configured to selectively permit the two or more sections (270) to pivot relative one another and relative to front undercarriage support assembly (206) and rear undercarriage support assembly (208) to permit adjustment of the spacing of the front undercarriage support assembly (206) and the rear undercarriage support assembly (208).

C. The aircraft handler (10) of any of paragraphs A-A10, wherein the plurality of undercarriage support assemblies (200) comprises a front undercarriage support assembly (206) and a distal undercarriage support assembly (210) operably coupled to the front undercarriage support assembly (206);

wherein the one or more drive assemblies (212) comprises a first drive assembly (14) and a second drive assembly (24), wherein the first drive assembly (14) comprises the translation assembly (204) of the front undercarriage support assembly (206), and the second drive assembly (24) comprises the translation assembly (204) of the distal undercarriage support assembly (210), and wherein the first drive assembly (14) and the second drive assembly (24) are configured to move the aircraft handler (10) along the ground surface (16); and wherein the support member (202) of the front undercarriage support assembly (206) and the support member (202) of the distal undercarriage support assembly (210) collectively comprise a support arm (18), wherein the support arm (18) is operably coupled to the body (12) of the front undercarriage support assembly (206) and to the body (12) of the distal undercarriage support assembly (210), and wherein distal undercarriage support assembly (210) is configured to support support arm (18) on ground surface (16).

C1. The aircraft handler (10) of paragraph C, when depending from paragraph A1, wherein the support arm (18) is configured to support the aircraft (22) in the level aircraft orientation (104) and in the plurality of tilted aircraft orientations (106).

C2. The aircraft handler (10) of paragraph C1, wherein the first drive assembly (14) and the second drive assembly (24) are configured to move the aircraft handler (10) together with the aircraft (22) along the ground surface (16) when the support arm (18) supports the aircraft (22) among the plurality of tilted aircraft orientations (106).

C3. The aircraft handler (10) of any of paragraphs C-C2, when depending from paragraph A5, wherein the front undercarriage support assembly (206) further comprises a lift mechanism (26) of the one or more lift mechanisms (26), wherein the support arm (18) has a proximal end (28) and a distal end (30), wherein the second drive assembly (24) of distal undercarriage support assembly (210) is operably coupled to the distal end (30) and the lift mechanism (26) operably couples the proximal end (28) to the body (12) and is configured to selectively raise and lower the proximal end (28) relative to the ground surface (16) to operably pivot the support arm (18) relative to the ground surface (16).

C3.1. The aircraft handler (10) of paragraph C3, wherein the lift mechanism (26) is configured to pivot the support arm (18) among a level orientation (100) and a plurality of tilted orientations (102) relative to the ground surface (16).

C3.1.1. The aircraft handler (10) of paragraph C3.1, wherein the support arm (18) is configured to support at least the portion of the undercarriage (108) of the aircraft (22) when the support arm (18) is pivoted among the plurality of tilted orientations (102).

C3.1.2. The aircraft handler (10) of any of paragraphs C3.1—C3.1.1, wherein the support arm (18) is configured to tilt the aircraft (22) when the lift mechanism (26) pivots the support arm (18) from the level orientation (100) to among the plurality of tilted orientations (102).

C3.2. The aircraft handler (10) of any of paragraphs C3-C3.1.2, wherein the lift mechanism (26) is configured to pivot the support arm (18) among a plurality of tilt angles relative to the ground surface (16), wherein the plurality of tilt angles are from −5° to 25°.

C4. The aircraft handler (10) of any of paragraphs C1-C3.2, wherein the support arm (18) has a/the proximal end (28) and a/the distal end (30), wherein the second drive assembly (24) of distal undercarriage support assembly (210) is operably coupled to the distal end (30) and the body (12) and front undercarriage support assembly (206) is operably coupled to the proximal end (28), and wherein the support arm (18) has a deployed orientation (32) and a stowed orientation (34), wherein the distal end (30) is spaced further away from the body (12) in the deployed orientation (32) than in the stowed orientation (34), and wherein the support arm (18) is configured to be transitioned between the deployed orientation (32) and the stowed orientation (34).

C4.1. The aircraft handler (10) of paragraph C4, wherein the support arm (18) comprises a first member (80) and a second member (82) that are configured to move relative to one another when the support arm (18) transitions between the deployed orientation (32) and the stowed orientation (34).

C4.1.1. The aircraft handler (10) of paragraph C4.1, wherein the first member (80) is hingedly coupled to the second member (82), wherein the first member (80) and the second member (82) pivot relative to one another about a hinge mechanism (84) when the support arm (18) transitions between the deployed orientation (32) and the stowed orientation (34).

C4.1.2. The aircraft handler (10) of any of paragraphs C4.1-C4.1.1, wherein the second drive assembly (24) moves the distal end (30) of the support arm (18) relative to the body (12) when the support arm (18) transitions between the deployed orientation (32) and the stowed orientation (34).

C5. The aircraft handler (10) of any of paragraphs C-C4.1.2, wherein the first drive assembly (14) and the second drive assembly (24) are configured to move the aircraft handler (10) along the ground surface (16) independently of one another.

C5.1 The aircraft handler (10) of any of paragraphs C-C4.1.2, wherein the first drive assembly (14) together with the second drive assembly (24) are configured to move the aircraft handler (10) along the ground surface (16).

C5.2. The aircraft handler (10) of any of paragraphs C-C5.1, when depending from paragraph A7, wherein the first drive assembly (14) and the second drive assembly (24) each comprise the one or more driven wheels (60) that are configured to receive power from one or more power sources (92) and facilitate movement of the aircraft handler (10) along the ground surface (16).

C5.3. The aircraft handler (10) of any of paragraphs C-C5.2, wherein at least one of the first drive assembly (14) and the second drive assembly (24) further comprises the one or more non-driven wheels (62).

C.6. The aircraft handler (10) of any of paragraphs C-C5.3, wherein the at least one support region (20) of the support arm (18) is configured to translate laterally beneath at least the portion of the undercarriage (108) of the aircraft (22) to move at least the portion of the undercarriage (108) onto the at least one support region (20) and lift at least the portion of the undercarriage (108) of the aircraft (22) from direct contact with the ground surface (16).

C6.1. The aircraft handler (10) of paragraph C6, wherein the support arm (18) comprises one or more transition portions (86) positioned proximate each support region (20) that are configured to facilitate movement of at least the respective portion of the undercarriage (108) of the aircraft (22) from the ground surface (16) onto the at least one support region (20).

C7. The aircraft handler (10) of any of paragraphs C-C6.1, wherein the support arm (18) is a first support arm (36), wherein the body (12) of the front undercarriage support assembly (206) comprises a first body member (50) and a second body member (52), wherein the first body member (50) is operably coupled to the first support arm (36) and the first drive assembly (14), wherein the distal undercarriage support assembly (210) is a first distal undercarriage support assembly (209), wherein the portion of the undercarriage (108) of the aircraft (22) is a first portion, and wherein the aircraft handler (10) further comprises:
  a rear undercarriage support assembly (208), wherein the body (12) of the rear undercarriage support assembly (208) is a second body member (52) that is operably coupled to the first body member (50);
  a second support arm (38) operably coupled to the second body member (52) of the body (12), wherein the second support arm (38) comprises at least one support region (20) configured to operably support at least a second portion of the undercarriage (108) of the aircraft (22);
  a second distal undercarriage support assembly (211) and a third drive assembly (40) operably coupled to the second support arm (38) and configured to support the second support arm (38) on the ground surface (16), wherein the support member (202) of the rear undercarriage support assembly (208) and the support member (202) of the second distal undercarriage support assembly (211) collectively comprise the second support arm (38); and
  the third drive assembly (40), wherein the third drive assembly (40) comprises the translation assembly (204) of the second distal undercarriage support assembly (211), and wherein the third drive assembly (40) is configured to move the aircraft handler (10) along the ground surface (16), together with the first drive assembly (14) and the second drive assembly (24).

C7.1. The aircraft handler (10) of paragraph C7, wherein the aircraft handler (10) further comprises a fourth drive assembly (44) that includes the translation assembly (204) of the rear undercarriage support assembly (208) and is operably coupled to the second body member (52) of the body (12).

C7.1.1 The aircraft handler (10) of paragraph C7.1, wherein the first drive assembly (14) is configured to support the first body member (50) on the ground surface (16) and the fourth drive assembly (44) is configured to support the second body member (52) on the ground surface (16), and wherein the fourth drive assembly (44) is configured to move the aircraft handler (10) along the ground surface (16), together with the first drive assembly (14), the second drive assembly (24), and the third drive assembly (40).

C7.2. The aircraft handler (10) of any of paragraphs C7-C7.1.1, wherein the body (12) further comprises a frame (54), wherein the first body member (50) of the body (12) and the second body member (52) of the body (12) are spaced apart and the frame (54) operably interconnects the first body member (50) and the second body member (52).

C7.2.1. The aircraft handler (10) of paragraph C7.2, wherein the frame (54) is a telescoping frame (56) that is configured to adjust a spacing between the first body member (50) and the second body member (52).

C7.2.1.1. The aircraft handler (10) of paragraph C7.2.1, wherein the first support arm (36) and the second support arm (38) are spaced apart by the telescoping frame (56), and wherein the telescoping frame (56) is configured to adjust a spacing between the first support arm (36) and the second support arm (38).

D. A method (500), comprising:
  supporting (502) an undercarriage (108) of an aircraft (22) with an aircraft handler (10); and
  moving (504) the aircraft (22) along a ground surface (16) with the aircraft handler (10).

D1. The method (500) of paragraph D, further comprising tilting (508) the aircraft (22) relative to the ground surface (16) with the aircraft handler (10).

D1.1. The method (500) of any of paragraphs D-D1, wherein the tilting (508) the aircraft (22) comprises changing one or more dimensions of an envelope (120) of the aircraft (22).

D1.2. The method (500) of any of paragraphs D1-D1.1, wherein the tilting (508) comprises tilting the aircraft (22) among a level aircraft orientation (104) and a plurality of tilted aircraft orientations (106).

D1.2.1. The method (500) of paragraph D1.2, wherein the tilting (508) comprises tilting the aircraft from the level aircraft orientation (104) to one of the plurality of tilted aircraft orientations (106).

D1.2.1.1. The method (500) of paragraph D1.2.1, wherein the tilting (508) comprises decreasing a width of a/the envelope (120) of the aircraft (22).

D1.2.2. The method (500) of any of paragraphs D1.2-D1.2.1.1, wherein the moving (504) is performed while the aircraft (22) is in one of the plurality of tilted aircraft orientations (106).

D1.2.3. The method (500) of any of paragraphs D1.2-D1.2.2, wherein the moving (504) comprises moving the aircraft (22) to within a defined volume (130), wherein the defined volume (130) comprises a width that is smaller than the width of a/the envelope (120) of the aircraft (22) when the aircraft (22) is oriented in the level aircraft orientation (104).

D2. The method (500) of any of paragraphs D-D1.2.3, wherein the moving (504) comprises rotating (506) the aircraft (22) within a cylindrical volume (134) having a radius (136) that is no longer than 110% of a distance between a yaw axis (132) of the aircraft (22) and a maximum extent (122) of the aircraft (22).

D3. The method (500) of any of paragraphs D-D2, further comprising stowing (510) the aircraft (22) in a desired location.

D4. The method (500) of any of paragraphs D-D3, further comprising transitioning (512) the aircraft handler (10) from a deployed configuration (264) to a stowed configuration (266).

D4.1 The method (500) of paragraph D4, wherein the transitioning (512) the aircraft handler (10) from the deployed configuration (264) to the stowed configuration (266) comprises decreasing a footprint of the aircraft handler (10).

D4.2 The method (500) of any of paragraphs D4-D4.1, wherein the transitioning (512) comprises decreasing a spacing along the ground surface (16) between a front undercarriage support assembly (206) of the aircraft handler (10) and a rear undercarriage support assembly (208) of the aircraft handler (10).

D4.2.1 The method (500) of paragraph D4.2, wherein the decreasing the spacing comprises folding sections (270) of a connecting member (216) about an articulated connection (272) of the connecting member (216), and wherein the connecting member (216) operably interconnects the front undercarriage support assembly (206) and the rear undercarriage support assembly (208).

D4.2.2 The method (500) of any of paragraphs D4.1-D4.2.1, wherein the transitioning (512) comprises decreasing a spacing between a rear undercarriage support assembly (208) of the aircraft handler (10) and a distal undercarriage support assembly (210) of the aircraft handler (10).

D4.2.2.1 The method (500) of paragraph D4.2.2, wherein the decreasing the spacing between the rear undercarriage support assembly (208) and the distal undercarriage support assembly (210) comprises folding articulated portions (276) of a connecting arm (214) about a connecting arm articulated connection (278), wherein the connecting arm (214) operably interconnects the rear undercarriage support assembly (208) and the distal undercarriage support assembly (210).

D4.3. The method (500) of any of paragraph D4-D4.2, wherein the transitioning (512) comprises transitioning at least one support arm (18) of the aircraft handler (10) from a deployed orientation (32) to a stowed orientation (34).

D4.3.1 The method (500) of paragraph D4.3, wherein the transitioning the at least one support arm (18) comprises moving a proximal end (28) and a distal end (30) of the support arm (18) closer to one another.

D4.3.1.1. The method (500) of paragraph D4.3.1, wherein the transitioning the at least one support arm (18) comprises moving a second drive assembly (24) that is operably attached to the distal end (30) of the support arm (18) towards the proximal end (28) of the support arm (18).

D.4.3.2 The method (500) of any of paragraphs D4.3-D4.3.1.1, wherein the transitioning the at least one support arm (18) comprises pivoting a first member (80) and a second member (82) of the at least one support arm (18) relative to one another.

D5. The method (500) of any of paragraphs D-D4.3.2, wherein the aircraft handler (10) comprises the aircraft handler (10) of any of paragraphs A-C7.2.1.1.

E. The aircraft handler (10) of any of paragraphs A-C7.2.1.1, further comprising a controller (90), the controller (90) comprising:
non-transitory memory comprising computer-readable instructions for executing the methods of any of paragraphs D-D5; and
a processor for executing the computer-readable instructions to perform the methods of any of paragraphs D-D5.

A controller may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious.

Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An aircraft handler, comprising:
a plurality of undercarriage support assemblies, each comprising:
  a body;
  a support member operably coupled to and extending from the body, wherein the support member comprises at least one support region configured to engage and operably support at least a respective portion of an undercarriage of an aircraft; and
  a translation assembly operably coupled to the body and configured to support a respective undercarriage support assembly on a ground surface and permit the respective undercarriage support assembly to translate along the ground surface; and
one or more drive assemblies configured to move the aircraft handler along the ground surface, wherein each drive assembly comprises the translation assembly of an undercarriage support assembly of the plurality of undercarriage support assemblies;

wherein the aircraft handler is configured to support the aircraft in a level aircraft orientation and in a plurality of tilted aircraft orientations;

wherein the plurality of undercarriage support assemblies comprises a front undercarriage support assembly and a rear undercarriage support assembly;

wherein the front undercarriage support assembly is configured to support a forward portion of the undercarriage of the aircraft, and wherein the rear undercarriage support assembly is configured to support an aft portion of the undercarriage of the aircraft;

wherein one or more of the front undercarriage support assembly and the rear undercarriage support assembly comprise the one or more drive assemblies;

wherein the plurality of undercarriage support assemblies further comprises a distal undercarriage support assembly, and wherein the aircraft handler further comprises at least one connecting arm that operably couples the distal undercarriage support assembly to the rear undercarriage support assembly;

wherein the aft portion of the undercarriage of the aircraft is a first aft portion, and wherein the distal undercarriage support assembly is configured to engage and support a second aft portion of the undercarriage of the aircraft; and wherein the aircraft handler comprises two connecting arms including a first connecting arm and a second connecting arm, and wherein the distal undercarriage support assembly comprises a first portion operably coupled to the first connecting arm, and a second portion operably coupled to the second connecting arm.

2. The aircraft handler of claim 1, wherein the aircraft handler is configured to rotate the aircraft about a yaw axis of the aircraft.

3. The aircraft handler of claim 1, wherein the aircraft handler further is configured to rotate the aircraft within a cylindrical volume, and wherein a radius of the cylindrical volume is 110% or less of a distance between a yaw axis of the aircraft and a maximum extent of the aircraft, as measured radially from the yaw axis.

4. The aircraft handler of claim 1, further comprising one or more lift mechanisms each being included in a respective undercarriage support assembly of the plurality of undercarriage support assemblies, wherein each lift mechanism operably couples the support member of the respective undercarriage support assembly to the body of the respective undercarriage support assembly, and wherein each lift mechanism is configured to selectively raise and lower a respective support member relative to the ground surface.

5. The aircraft handler of claim 4, wherein the aircraft handler is configured to tilt the aircraft from the level aircraft orientation to among the plurality of tilted aircraft orientations when each lift mechanism selectively raises the respective support member relative to the ground surface.

6. The aircraft handler of claim 1, wherein each drive assembly comprises one or more driven wheels that are configured to receive power from one or more power sources and facilitate movement of the aircraft handler along the ground surface, wherein at least one of the one or more driven wheels is configured to steer the aircraft handler, wherein the at least one driven wheel of the one or more driven wheels is configured to selectively pivot to steer the aircraft handler, and wherein each of the one or more driven wheels is configured to be independently operated.

7. The aircraft handler of claim 6, wherein the translation assembly of at least one undercarriage support assembly of the plurality of undercarriage support assemblies comprises one or more non-driven wheels.

8. The aircraft handler of claim 1, wherein the aircraft handler is configured to fit within an envelope of the aircraft when the plurality of undercarriage support assemblies support the respective portions of the undercarriage of the aircraft.

9. The aircraft handler of claim 1, wherein the aircraft handler comprises a deployed configuration and a stowed configuration, wherein the aircraft handler occupies a footprint on the ground surface, wherein the footprint of the aircraft handler is smaller in the stowed configuration than the footprint of the aircraft handler in the deployed configuration.

10. The aircraft handler of claim 1, wherein the first portion and the second portion collectively comprise the support member and the support region of the distal undercarriage support assembly.

11. The aircraft handler of claim 10, further comprising a first connecting arm actuator that operably couples the first connecting arm to the rear undercarriage support assembly and a second connecting arm actuator that operably couples the second connecting arm to the rear undercarriage support assembly, wherein the first connecting arm actuator is configured to move the first connecting arm together with the first portion along the ground surface and the second connecting arm actuator is configured to move the second connecting arm together with the second portion relative to the ground surface.

12. The aircraft handler of claim 11, wherein the first connecting arm actuator and the second connecting arm actuator collectively are configured to adjust a spacing between the first portion and the second portion along the ground surface.

13. The aircraft handler of claim 11,
wherein the distal undercarriage support assembly comprises a distal coupling mechanism configured to selectively couple the first portion and the second portion to one another;
wherein the first portion and the second portion are configured to collectively support the second aft portion of the undercarriage of the aircraft when the distal coupling mechanism couples the first portion and the second portion to one another;
wherein the distal undercarriage support assembly comprises a supporting configuration in which the distal coupling mechanism operably couples the first portion and the second portion to one another for operative support of the second aft portion of the undercarriage, and a positioning configuration in which the distal coupling mechanism disengages the first portion from the second portion and the first connecting arm actuator and the second connecting arm actuator position the first portion and the second portion spaced apart from one another along the ground surface.

14. The aircraft handler of claim 13, wherein the distal undercarriage support assembly is configured to translate beneath the second aft portion of the undercarriage of the aircraft in the positioning configuration.

15. The aircraft handler of claim 1, further comprising:
a plurality of lift mechanisms each being included in a respective undercarriage support assembly of the plurality of undercarriage support assemblies;
wherein each lift mechanism operably couples the support member of the respective undercarriage support assembly to the body of the respective undercarriage support assembly, and wherein each lift mechanism is configured to selectively raise and lower a respective support member relative to the ground surface;

wherein the front undercarriage support assembly and the rear undercarriage support assembly each comprise a respective lift mechanism of the plurality of lift mechanisms;

wherein each lift mechanism is configured to selectively position the respective support member among a lowered position and a plurality of raised positions;

wherein the aircraft handler is configured to support the aircraft in the level aircraft orientation when the support member of the front undercarriage support assembly and the support member of the rear undercarriage support assembly are positioned in the lowered position by the respective lift mechanisms; and wherein the aircraft handler is configured to support the aircraft among the plurality of tilted aircraft orientations when the support member of the front undercarriage support assembly and the support member of the rear undercarriage support assembly are among the plurality of raised positions.

16. The aircraft handler of claim 1, wherein the front undercarriage support assembly comprises a front drive assembly of the one or more drive assemblies, wherein the front drive assembly is configured to move the front undercarriage support assembly along the ground surface;

wherein the rear undercarriage support assembly comprises a rear drive assembly of the one or more drive assemblies, and wherein the rear drive assembly is configured to move the rear undercarriage support assembly along the ground surface; and wherein the front drive assembly and the rear drive assembly are configured to move the aircraft handler along the ground surface.

17. The aircraft handler of claim 1, wherein the front undercarriage support assembly further comprises a front ground support chassis operably coupled to the body of the front undercarriage support assembly, wherein the front ground support chassis comprises a front pair of projections that extend from the body of the front undercarriage support assembly laterally spaced apart from one another and that form a front open region therebetween, and wherein a portion of the translation assembly of the front undercarriage support assembly supports the front pair of projections above the ground surface.

18. The aircraft handler of claim 1, wherein the rear undercarriage support assembly further comprises a rear ground support chassis operably coupled to the body of the rear undercarriage support assembly, wherein the rear ground support chassis comprises a rear pair of projections that extend from the body of the rear undercarriage support assembly laterally spaced apart from one another and that form a rear open region therebetween, wherein a portion of the translation assembly of the rear undercarriage support assembly supports the rear pair of projections above the ground surface, wherein the rear ground support chassis further comprises a gate, wherein the gate has a closed configuration in which the gate is operably coupled to and interconnects the rear pair of projections and an open configuration in which the gate is operably coupled to only one projection of the rear pair of projections and provides access to the rear open region.

19. The aircraft handler of claim 1, wherein the support member of one or more of the front undercarriage support assembly and the rear undercarriage support assembly comprises a fork assembly, wherein the fork assembly comprises a plurality of prongs projecting outward from the respective body, wherein the plurality of prongs are spaced laterally apart from one another, and wherein the plurality of prongs include the support region of the respective support member.

20. The aircraft handler of claim 1, wherein the front undercarriage support assembly and the rear undercarriage support assembly are spaced apart from one another, wherein the aircraft handler further comprises a connecting member configured to operably interconnect the front undercarriage support assembly with the rear undercarriage support assembly, and wherein the connecting member is configured to permit adjustment of a spacing between the front undercarriage support assembly and the rear undercarriage support assembly.

21. A method of using the aircraft handler of claim 1 to move the aircraft, the method comprising:

supporting the undercarriage of the aircraft with the aircraft handler;

tilting the aircraft relative to the ground surface with the aircraft handler; and moving the aircraft along the ground surface with the aircraft handler.

22. An aircraft handler, comprising:

a plurality of undercarriage support assemblies, each comprising:
  a body;
  a support member operably coupled to and extending from the body, wherein the support member comprises at least one support region configured to engage and operably support at least a respective portion of an undercarriage of an aircraft; and
  a translation assembly operably coupled to the body and configured to support a respective undercarriage support assembly on a ground surface and permit the respective undercarriage support assembly to translate along the ground surface; and one or more drive assemblies configured to move the aircraft handler along the ground surface, wherein each drive assembly comprises the translation assembly of an undercarriage support assembly of the plurality of undercarriage support assemblies;

wherein the aircraft handler is configured to support the aircraft in a level aircraft orientation and in a plurality of tilted aircraft orientations;

wherein the plurality of undercarriage support assemblies comprises a front undercarriage support assembly and a rear undercarriage support assembly;

wherein the front undercarriage support assembly is configured to support a forward portion of the undercarriage of the aircraft, and wherein the rear undercarriage support assembly is configured to support an aft portion of the undercarriage of the aircraft; and wherein one or more of the front undercarriage support assembly and the rear undercarriage support assembly comprise the one or more drive assemblies; and wherein the rear undercarriage support assembly further comprises a rear ground support chassis operably coupled to the body of the rear undercarriage support assembly, wherein the rear ground support chassis comprises a rear pair of projections that extend from the body of the rear undercarriage support assembly laterally spaced apart from one another and that form a rear open region therebetween, wherein a portion of the translation assembly of the rear undercarriage support assembly supports the rear pair of projections above the ground surface, wherein the rear ground support chassis further comprises a gate, wherein the gate has a closed configuration in which the gate is operably coupled to and interconnects the rear pair of projections and an open configuration in which the gate is operably coupled to only one projection of the rear pair of projections and provides access to the rear open region.

23. The aircraft handler of claim 22, wherein the aircraft handler is configured to fit within an envelope of the aircraft when the plurality of undercarriage support assemblies support the respective portions of the undercarriage of the aircraft.

24. The aircraft handler of claim 22, wherein the aircraft handler comprises a deployed configuration and a stowed configuration, wherein the aircraft handler occupies a footprint on the ground surface, wherein the footprint of the aircraft handler is smaller in the stowed configuration than the footprint of the aircraft handler in the deployed configuration.

25. The aircraft handler of claim 22, wherein the front undercarriage support assembly and the rear undercarriage support assembly are spaced apart from one another, wherein the aircraft handler further comprises a connecting member configured to operably interconnect the front undercarriage support assembly with the rear undercarriage support assembly, and wherein the connecting member is configured to permit adjustment of a spacing between the front undercarriage support assembly and the rear undercarriage support assembly.

26. A method of using the aircraft handler of claim 22 to move the aircraft, the method comprising:
- supporting the undercarriage of the aircraft with the aircraft handler;
- tilting the aircraft relative to the ground surface with the aircraft handler; and
- moving the aircraft along the ground surface with the aircraft handler.

\* \* \* \* \*